United States Patent
Ham et al.

(10) Patent No.: US 10,678,267 B2
(45) Date of Patent: *Jun. 9, 2020

(54) METHOD AND SYSTEM FOR PROVIDING ROUTE OF UNMANNED AIR VEHICLE

(71) Applicant: Thinkware Corporation, Seongnam-si, Gyeonggi-do (KR)

(72) Inventors: Young-Kuk Ham, Suwon-si (KR); Tae Kyu Han, Seoul (KR)

(73) Assignee: Thinkware Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,886

(22) Filed: Aug. 21, 2018

(65) Prior Publication Data

US 2019/0011935 A1 Jan. 10, 2019

Related U.S. Application Data

(63) Continuation of application No. 15/443,514, filed on Feb. 27, 2017, now Pat. No. 10,082,803.

(30) Foreign Application Priority Data

Feb. 29, 2016 (KR) .................. 10-2016-0024523
Jan. 25, 2017 (KR) .................. 10-2017-0011772

(51) Int. Cl.
*G05D 1/00* (2006.01)
*B64C 39/02* (2006.01)
(Continued)

(52) U.S. Cl.
CPC ........... *G05D 1/101* (2013.01); *B64C 39/024* (2013.01); *G01C 5/005* (2013.01); *G01S 17/86* (2020.01);
(Continued)

(58) Field of Classification Search
CPC .... G05D 1/101; G05D 1/0088; B64C 39/024; G01C 5/005; G01S 17/9333;
(Continued)

(56) References Cited

U.S. PATENT DOCUMENTS 10,082,803 B2    9/2018  Ham et al.
2017/0199647 A1  7/2017  Richman et al.
(Continued)

FOREIGN PATENT DOCUMENTS

CN    102541066 A    7/2012
CN    104386249 A    3/2015

OTHER PUBLICATIONS

Chinese National Intellectual Property Administration, Office Action, Chinese Application No. 201710107591.6, dated Dec. 13, 2019, 10 pages (with concise explanation of relevance).

*Primary Examiner* — Tan Q Nguyen
(74) *Attorney, Agent, or Firm* — Fenwick & West LLP

(57) ABSTRACT

A method and a system for establishing a route of an unmanned aerial vehicle are provided. The method includes identifying an object from surface scanning data and shaping a space, which facilitates autonomous flight, as a layer, collecting surface image data for a flight path from the shaped layer, and analyzing a change in image resolution according to a distance from the object through the collected surface image data and extracting an altitude value on a flight route.

20 Claims, 57 Drawing Sheets

(51) Int. Cl.
*G05D 1/10* (2006.01)
*G01S 17/933* (2020.01)
*G08G 5/00* (2006.01)
*G08G 5/02* (2006.01)
*G01S 17/86* (2020.01)
*G01C 5/00* (2006.01)
*G01S 17/89* (2020.01)

(52) U.S. Cl.
CPC ............ *G01S 17/89* (2013.01); *G01S 17/933* (2013.01); *G05D 1/0088* (2013.01); *G05D 1/106* (2019.05); *G08G 5/006* (2013.01); *G08G 5/0013* (2013.01); *G08G 5/0021* (2013.01); *G08G 5/0034* (2013.01); *G08G 5/0039* (2013.01); *G08G 5/0052* (2013.01); *G08G 5/0056* (2013.01); *G08G 5/0065* (2013.01); *G08G 5/0069* (2013.01); *G08G 5/0082* (2013.01); *G08G 5/0086* (2013.01); *G08G 5/025* (2013.01); *B64C 2201/127* (2013.01); *B64C 2201/141* (2013.01)

(58) Field of Classification Search
CPC .. G08G 5/0013; G08G 5/0021; G08G 5/0034; G08G 5/0039; G08G 5/0052; G08G 5/0056
USPC .......................................................... 701/11
See application file for complete search history.

(56) References Cited

U.S. PATENT DOCUMENTS

| | | | |
|---|---|---|---|
| 2018/0224869 A1* | 8/2018 | Paduano | G05D 1/042 |
| 2019/0144114 A1* | 5/2019 | Chen | B64C 39/024 |
| 2019/0253673 A1* | 8/2019 | Gornik | A01B 79/005 |
| 2019/0265705 A1* | 8/2019 | Zhang | B64C 39/024 |

\* cited by examiner

METHOD AND SYSTEM FOR PROVIDING ROUTE OF UNMANNED AIR VEHICLE

CROSS-REFERENCE TO RELATED APPLICATIONS

This patent application is a continuation of U.S. patent application Ser. No. 15/443,514 filed on Feb. 27, 2017 which claims priority under 35 U.S.C. § 119 to Korean Patent Application No. 10-2016-0024523 filed Feb. 29, 2016 and Korean Patent Application No. 10-2017-0011772 filed Jan. 25, 2017, in the Korean Intellectual Property Office, each of which is incorporated by reference in its entirety.

BACKGROUND

Embodiments of the inventive concepts described herein relate to a method and system for establishing a route of an unmanned aerial vehicle, and more particularly, relate to a method and system for establishing a route of an unmanned aerial vehicle to provide an autonomous flight route of an invisible area.

Unmanned aerial vehicles such as drones have performed ill-judged flight on free flight zones of a minimum flight altitude or less (a minimum altitude or less for avoiding collision with obstacles on the earth's surface) of manned aerial vehicles. As a result, recently, the necessity of regulation associated with safety and security about flight of unmanned aerial vehicles, such as collisions between passenger aircrafts and drones, accidents according to the violation of military security areas, and collisions between manned firefighting helicopters and unmanned imaging devices, have become an issue. Thus, regulation methods for the protection of no-fly zones and safe distance maintenance (horizontal separation and vertical separation) between aerial vehicles on airspaces of a minimum flight altitude or less have been reviewed in international civil aviation organization (ICAO).

Current safety regulation of unmanned aerial vehicles describes that pilots who have qualifications operate their unmanned aerial vehicles in a range which may be visually inspected by them, that is, on visible areas. However, if unmanned aerial vehicles are used in densely populated areas and areas for disaster prevention and crime prevention, there is a need for situation control for invisible areas (e.g., night, fog, smoke, shadow (blind areas) of downtown areas, and the like) and recognition impossible areas (e.g., military security areas, airport areas, and the like).

Particularly, in case of unmanned aerial vehicles, there are technical limits to use cognitive capabilities by five senses of pilots. Contrary to manned aerial vehicles, unmanned aerial vehicle may have the relatively higher risk of accidents based on situational awareness problems. These problems are reflected in details of current safety regulation. However, if industrial demands and complexity for using unmanned aerial vehicles are increased, safety of autonomous flight for flight of invisible areas of pilots should be first ensured and verified systematically.

Korean Patent Laid-open Publication No. 10-2013-0002492 describes technologies about a flight control system of an unmanned aerial vehicle.

SUMMARY

Embodiments of the inventive concepts provide a method and system for establishing a route of an unmanned aerial vehicle, particularly, technologies about a method and system for establishing a route of an unmanned aerial vehicle to provide an autonomous flight route of an invisible area.

Embodiments of the inventive concepts provide a method and system for establishing a route of an unmanned aerial vehicle to establish a safe autonomous flight route of the unmanned aerial vehicle by extracting height information of an elevation and an obstacle using scanning data, analyzing a change in image resolution of surface image data, and correcting calibration verification and a value measured by a radio altitude sensor of the unmanned aerial vehicle using extracted height information of a ground object.

According to an aspect of an embodiment, a method for establishing a route of an unmanned aerial vehicle may include identifying an object from surface scanning data and shaping a space, which facilitates autonomous flight of the unmanned aerial vehicle, as a layer, collecting surface image data for a flight path from the shaped layer, and analyzing a change in image resolution according to a distance from the object through the collected surface image data and extracting an altitude value on a flight route.

The method may further include correcting a value measured by a radio altitude sensor of the unmanned aerial vehicle through route verification from the extracted altitude value.

The shaping of the space, which facilitates the autonomous flight, as the layer may include obtaining a point cloud of the object scanned by a surface scanning device loaded into an aircraft which captures the earth's surface, identifying the object by analyzing the collected point cloud, extracting height values of specific points of the object identified using terrain altitude data, and shaping an area and altitude, which facilitates autonomous flight of the unmanned aerial vehicle, as the layer on a space by connecting the extracted height values of the points of the object.

The obtaining of the point cloud may include obtaining the point cloud of the object onto which a light detection and ranging (LiDAR) pulse is projected via a LiDAR device loaded into the aircraft which captures the earth's surface.

The shaping of the space, which facilitates the autonomous flight, as the layer may include generating a plurality of two-dimensional (2D) layers on the space.

The collecting of the surface image data may include obtaining the surface image data via an imaging device in which a calibration value is set at an altitude, the imaging device being loaded into an aircraft which captures the earth's surface.

The collecting of the surface image data may include verifying spatial geographic information and scanning a safe path for flight and generating a flight path by reflecting the safe path, and collecting the surface image data for the flight path.

The collecting of the surface image data may include setting a flight altitude restriction value and verifying a value measured by a radio altitude sensor through an object which facilitates verification of a flight altitude restriction height.

The collecting of the surface image data may include verifying calibration information of an imaging device and verifying flight information recorded in a flight data recorder (FDR) loaded into the unmanned aerial vehicle.

The extracting of the altitude value on the flight route may include matching at least one of coordinate, altitude, attitude, and time information from an FDR loaded into the unmanned aerial vehicle with the surface image data and calculating the altitude value on the flight route through distortion correction of an image and the analysis of the change in image resolution with reference to calibration information of the imaging device.

The correcting of the value measured by the radio altitude sensor may include extracting an altitude value from an object which exists on a route, substituting the altitude value into a route coordinate of the unmanned aerial vehicle at a constant interval, and if the unmanned aerial vehicle arrives at the route coordinate, recognizing a resolution height of an image corresponding to a coordinate which is in contact with the object and correcting the value measured by the radio altitude sensor of the unmanned aerial vehicle based on the resolution height.

The correction of the value measured by the radio altitude sensor may support an offline image processing scheme to minimize a risk to a communication and fuselage infrastructure environment upon autonomous flight The correcting of the value measured by the radio altitude sensor may include repeatedly collecting the surface image data through autonomous flight of the unmanned aerial vehicle and generating or verifying a new route by reflecting the collected surface image data in route control, ground control, and route map data through an analysis of a change in resolution.

According to another aspect of an embodiment, a system for establishing a route of an unmanned aerial vehicle may include a layer shaping unit configured to identify an object from surface scanning data and shape a space, which facilitates autonomous flight of the unmanned aerial vehicle, as a layer, a data collecting unit configured to collect surface image data for a flight path from the shaped layer, and an altitude calculating unit configured to analyze a change in image resolution according to a distance from the object through the collected surface image data and extract an altitude value of a flight route coordinate.

The system may further include a verification unit configured to correct a value measured by a radio altitude sensor of the unmanned aerial vehicle through route verification from the extracted altitude value.

The layer shaping unit may include a collection unit configured to obtain a point cloud of the object scanned by a surface scanning device loaded into an aircraft which captures the earth's surface, an identification unit configured to identify the object by analyzing the collected point cloud, an extraction unit configured to extract height values of specific points of the object identified using terrain altitude data, and a layer unit configured to shape an area and altitude, which facilitates autonomous flight of the unmanned aerial vehicle, as the layer on a space by connecting the extracted height values of the points of the object.

The data collecting unit may verify spatial geographic information and scans a safe path for flight, may generate a flight path by reflecting the safe path and collects the surface image data for the flight path, and may obtain the surface image data via an imaging device in which a calibration value is set at an altitude, the imaging device being loaded into an aircraft which captures the earth's surface.

The data collecting unit may set a flight altitude restriction value and may verify a value measured by a radio altitude sensor through an object which facilitates verification of a flight altitude restriction height.

The data collecting unit may verify calibration information of an imaging device and may verify flight information recorded in a flight data recorder (FDR) loaded into the unmanned aerial vehicle. The altitude calculating unit may match at least one of coordinate, altitude, attitude, and time information from the FDR loaded into the unmanned aerial vehicle with the surface image data and may calculate an altitude value on the flight route through distortion correction of an image and the analysis of the change in image resolution with reference to calibration information of the imaging device.

The verification unit may extract an altitude value from an object which exists on a route, may substitute the altitude value into a route coordinate of the unmanned aerial vehicle at a constant interval, and if the unmanned aerial vehicle arrives at the route coordinate, may recognize a resolution height of an image corresponding to a coordinate which is in contact with the object and corrects the value measured by the radio altitude sensor of the unmanned aerial vehicle based on the resolution height.

The verification unit may repeatedly collect the surface image data through autonomous flight of the unmanned aerial vehicle and may generate or verifies a new route by reflecting the collected surface image data in route control, ground control, and route map data through an analysis of a change in resolution.

According to another aspect of an embodiment, a method for establishing a route of an unmanned aerial vehicle may include identifying an object from surface scanning data and shaping a space, which facilitates autonomous flight of the unmanned aerial vehicle, as a layer, determining way points for generating a route of the unmanned aerial vehicle on the shaped layer, collecting surface image data for the way points from the shaped layer, analyzing a change in image resolution according to a distance from the object through the collected surface image data and extracting altitude values on the way points, and generating flight path information of the unmanned aerial vehicle, including at least one of the shaped layer, the way points, the altitude values, and a flight path which is a line of connecting the way points.

Each of the way points may indicate a point of a ground object which exists on the earth's surface of a point where the unmanned aerial vehicle performs autonomous flight on the layer or may indicate a location where the unmanned aerial vehicle performs a mission.

The generating of the flight path information of the unmanned aerial vehicle may include, if it is necessary for the unmanned aerial vehicle to move from a departure layer which is an initially assigned layer to another layer, determining an arrival layer to which the unmanned aerial vehicle will move and generating layer movement information for moving from the departure layer to the arrival layer.

The layer movement information may include at least one of a layer changeable zone, including a way point zone for changing a layer in a route for autonomous flight of the unmanned aerial vehicle, a layer movement time, a change zone entry time, and a change zone entry angle.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
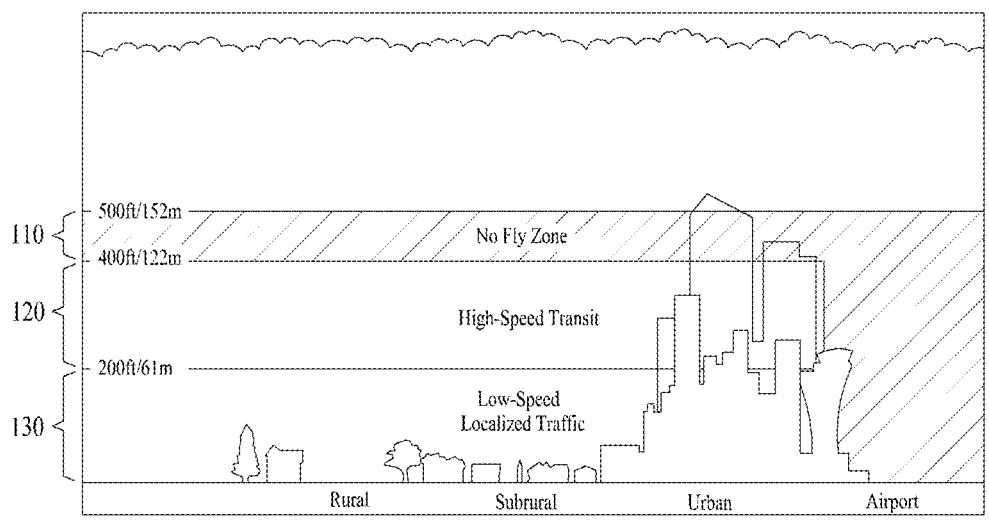
FIG. 1 is a drawing illustrating a limit to a flight altitude for operating an unmanned aerial vehicle.

Hereinafter, embodiments will be described in detail with reference to the accompanying drawings. Embodiments described herein are intended to cover various modifications, and the scope of the inventive concept is not limited to embodiments described below. Further, various embodiments are provided to more perfectly explain the inventive concept to those skilled in the art. In the drawings, shapes and sizes of elements may be exaggerated for more clear description.

FIG. 1 is a drawing illustrating a limit to a flight altitude for operating an unmanned aerial vehicle.

Depending on a drone highway idea by an unmanned aerial system traffic management (UASTM) plane of national aeronautics and space administration (NASA), the drone highway is an ideal about drone usage (e.g., a delivery service) and drone control (e.g., system establishment for obtaining safety such as collision avoidance), in which about 120 related institutions and enterprises of the United States, such as Amazon, Google, NASA, and federal aviation administration (FAA).

A no-fly zone 110 is formed in the range from 400 feet to 500 feet in rural, subrural, and urban areas, but all altitude ranges around airports are included in no-fly zones due to takeoff and landing of manned vehicles. An unmanned aerial vehicle according to an embodiment is prohibited to fly on no-fly zones, it may fail to fly to 400 feet or more in case of rural, subrual, and urban areas. A high-speed transit zone 120 and a low-speed localized traffic zone 130 may be classified based on missions performed by unmanned aerial vehicles. For example, a company, such as Amazon, for providing distribution services may use the range of the high-speed transit zone 120 for a quick delivery service and may use the range of the low-speed localized traffic zone 130 for agriculture, facility inspection, or image capture.

In embodiments below, vertical separation for each range may be shaped into the concept of "layer". The high-speed transit zone 120 and the low-speed localized traffic zone 130 may be simply classified by characteristics of missions of unmanned aerial vehicles (missions of delivering goods at high speed or missions of scanning facilities slowly at low speed). More layers may be generated to reflect characteristics of missions performed by more various unmanned aerial vehicles.

Autonomous flight of an unmanned aerial vehicle may additionally request information of an altitude Z other than a location coordinate (X, Y). Autonomous flight technologies of a conventional unmanned aerial vehicle input an altitude Z value before flight and maintain an altitude Z value measured by a sensor such as an ultrasonic sensor using an echo principle of radio waves. For example, a conventional autonomous flight system is used for farmers who are unfamiliar with controlling unmanned aerial vehicles to spray pesticides on farmland with a constant height of the earth's surface. However, to overcome a limit for safety regulations (operation within a visible range of a pilot) according to a change in industry demand, there is a need for countermeasures for areas where it is difficult to keep an altitude Z value constant due to ground objects and the like. Herein, the ground objects may basically include the earth's surface and may include features and obstacles which are formed and or connected and established from the ground. Since a radio altitude sensor operates with a principle of an echo to an object, it may maintain an altitude Z value relative to the object. In other words, if an altitude Z value of 150 meters is input to an unmanned aerial vehicle to be maintained, an altitude of 150 meters may be continuously maintained from an elevation. However, if there is a ground object with a height of 50 meters and a wide area in the middle of routes, a flight altitude of an unmanned aerial vehicle may be maintained on 200 meters in the range of the corresponding ground object. Flight depending on a radio sensor which measures an altitude using an echo principle of wavelengths if there is a limit to a flight altitude may consequently violate the limit to the flight altitude for safety regulation. Particularly, as shown in FIG. 1, since the limit to the flight altitude is safety measures for maintaining a safety distance (vertical separation) from a minimum flight altitude of a manned vehicle, if it is violated, there is the risk of airline accidents.

Thus, an absolute altitude Z value (i.e., a limit to a flight altitude) should be maintained from the earth's surface for safe autonomous flight of an unmanned aerial vehicle, and there should be a correction for maintaining an absolute altitude Z value for the ground object in the middle of a route. Avoidance routes for a ground object which is adjacent to the absolute altitude (Z) value, in which it is difficult for vertical separation, should be provided.

Figure 2:
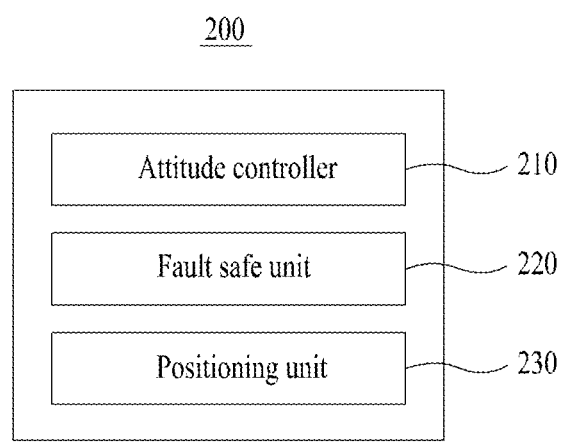
FIG. 2 is a block diagram illustrating a configuration of a sensor unit of an unmanned aerial vehicle according to an embodiment.

FIG. 2 is a block diagram illustrating a configuration of a sensor unit of an unmanned aerial vehicle according to an embodiment.

Referring to FIG. 2, a sensor unit 200 of the unmanned aerial vehicle according to an embodiment may include an attitude controller 210, a fault safe unit 220, and a positioning unit 230. The sensor unit 200 may further include a wireless communication sensor, a sensor for image capture, a laser scan sensor, and the like.

The attitude controller 210 may detect a rotation angle of a fuselage and may control attitude of the fuselage. For example, a gyro sensor, a geomagnetic sensor, an accelerator, or the like may be used as the attitude controller 210.

The fault safe unit 220 may be for a flight error. For example, a barometric altimeter (a radio altitude sensor), an ultrasonic meter, a radar meter, a voltage meter, a current meter, or the like may be used as the fault safe unit 220.

Meanwhile, since the radio altitude sensor operates with a principle of an echo to an object, it may maintain an altitude Z value relative to the object. Flight depending on the radio altitude sensor which measures an altitude using an echo principle of wavelengths if there is a limit to a flight altitude may consequently violate the limit to the flight altitude for safety regulation. Thus, an absolute altitude Z value (i.e., a limit to a flight altitude) should be maintained from the earth's surface for safe autonomous flight of an unmanned aerial vehicle, and there should be a correction for maintaining an absolute altitude Z value for a ground object in the middle of a route. Avoidance routes for a ground object which is adjacent to the absolute altitude (Z) value, in which it is difficult for vertical separation, should be provided.

The positioning unit 230 may be a sensor which senses a location of an unmanned aerial vehicle. For example, a global positioning system (GPS) sensor or the like may be used as the positioning unit 230.

Assuming that there is a limit of calculating an altitude Z value if an altitude is measured using the GPS sensor, an error range should be reduced through ambient infrastructures. However, since measurement of a GPS altitude is primarily influenced by a (geometric) arrangement state of a GPS satellite and is secondarily influenced by ground obstacles and terrain, it is impossible to calculate an altitude Z value or an error may occur in the same point.

According to an embodiment, to extract an altitude Z value on a route through real flight, first of all, a point cloud of an object, extracted by LiDAR scanning necessary for establishing a two-dimensional (2D) layer on a 3D space, may be analyzed.

An initial layer obtained by connecting height values of specific points of an object through an analysis of a point cloud extracted from an echo of radio waves or light may fail to exclude an error generated by electromagnetic interference or distortion (e.g., propagation shadow and the like) which occurs by materials of the object and an incident angle. Thus, a more safe autonomous flight route may be established through verification and correction of an extracted value.

Figure 3:
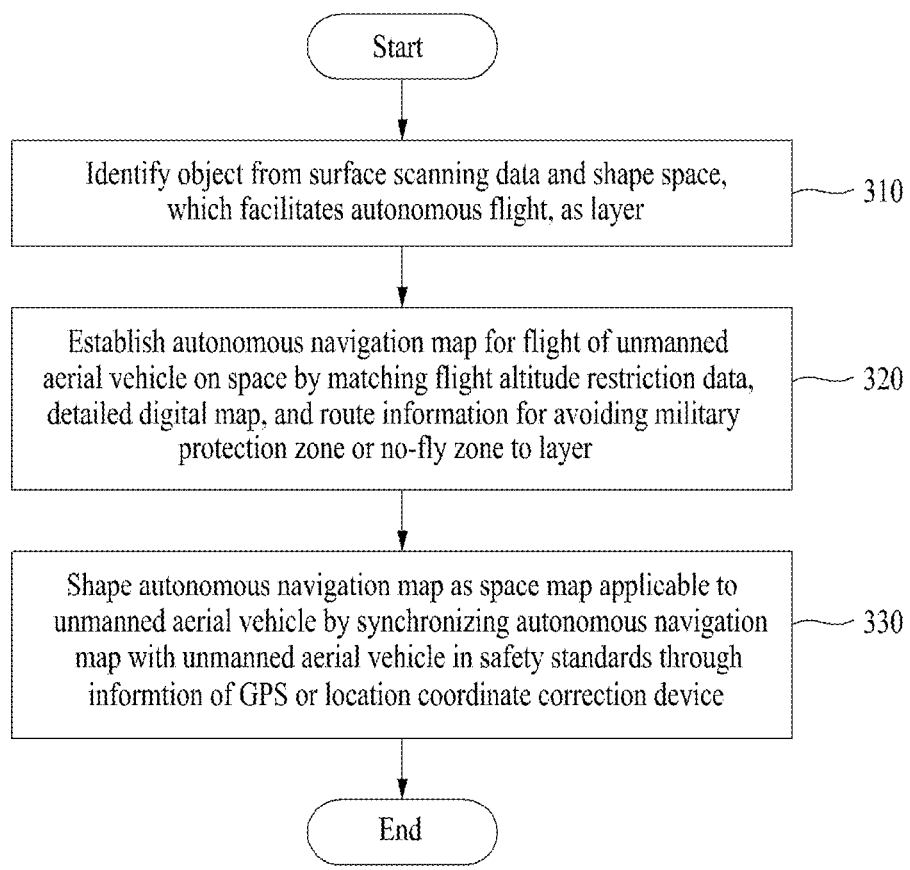
FIG. 3 is a flowchart illustrating a method for making a map for flight of an unmanned aerial vehicle according to an embodiment.

FIG. 3 is a flowchart illustrating a method for making a map for flight of an unmanned aerial vehicle according to an embodiment.

Referring to FIG. 3, the method for making the map for the flight of the unmanned aerial vehicle according to an embodiment may include operation 310 of identifying an object from surface scanning data and shaping a space, which facilitates autonomous flight, as a layer and operation 320 of establishing an autonomous navigation map for flight of the unmanned aerial vehicle on a space by matching at least one of flight altitude restriction data, a detailed digital map, and route information for avoiding a military protection zone or a no-fly zone to the layer shaped on the space. Herein, the layer may refer to a 2D space shaped by applying a latitude value (height value) to a 3D space.

Herein, operation 310 of shaping the space, which facilitates autonomous flight, as the layer may include obtaining a point cloud of an object scanned by a surface scanning device loaded into an aircraft which captures the earth's surface, identifying the object by analyzing the collected point cloud, extracting height values of specific points of the identified object using terrain altitude data, and shaping an area and altitude, which facilitates the autonomous flight of the unmanned aerial vehicle, as the layer on the space by connecting the extracted height values of the specific points of the object.

The method for making the map for the flight of the unmanned aerial vehicle according to an embodiment may further include operation 330 of shaping the autonomous navigation map for the flight of the unmanned aerial vehicle established on the layer as a space map applicable to the unmanned aerial vehicle by synchronizing the autonomous navigation map with the unmanned aerial vehicle in safety standards through information of a GPS or location coordinate correction device.

According to an embodiment, an autonomous flight map of an invisible area may be provided to overcome a limit of an operation in a visible range of a pilot to an area where it is difficult to keep an altitude value constant due to a ground object and the like.

Also, a method and system for making a map for flight of an unmanned aerial vehicle, in which an altitude value is reflected, by shaping an autonomous flight space as a layer from surface scanning and image capture data and matching data to the shaped layer may be provided.

According to another aspect, a method for making a map for flight of an unmanned aerial vehicle may include setting a layer having a constant altitude value from the earth's surface, at which the unmanned aerial vehicle may fly based on a mission to the unmanned aerial vehicle, setting a route of the unmanned aerial vehicle on the set layer, and establishing an autonomous navigation map including the set layer and route. Herein, the route may be configured with at least two way points including a location of a ground object which exists on the earth's surface of the route. The method for making the map for the flight of the unmanned aerial vehicle may further include establishing an autonomous navigation map for each mission based on identification information of the unmanned aerial vehicle. The way point may be point for performing a mission assigned to the unmanned aerial vehicle. Therefore, an autonomous flight map of an invisible area may be provided to overcome a limit of an operation in a visible range of a pilot to an area where it is difficult to keep an altitude value constant due to a ground object and the like. Also, a method and system for making a map for flight of an unmanned aerial vehicle, in which an altitude value is reflected, by shaping an autonomous flight space as a layer from surface scanning and image capture data and matching data to the shaped layer may be provided.

A description will be given in detail of each operation of the method for making the map for the flight of the unmanned aerial vehicle according to an embodiment.

Figure 4:
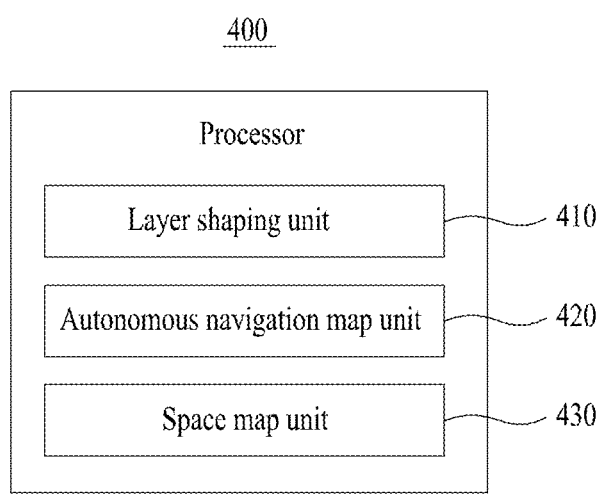
FIG. 4 is a block diagram illustrating a system for making a map for flight of an unmanned aerial vehicle according to an embodiment.

FIG. 4 is a block diagram illustrating a system 400912 for making a map for flight of an unmanned aerial vehicle according to an embodiment. As shown in FIG. 4, the system for making the map for the flight of the unmanned aerial vehicle according to an embodiment may include a layer shaping unit 410, an autonomous navigation map unit 420, and a space map unit 430. The components of the system for making the map for the flight of the unmanned aerial vehicle may be included in a processor included in a server.

Such components may be implemented to execute operations 310 to 330 included in a method of FIG. 3 through an operating system (OS) and at least one program code included in a memory.

In operation 310, the layer shaping unit 410 may identify an object from surface scanning data and may shape a space, which facilitates autonomous flight, as a layer. Herein, the layer may be represented as a plane including the concept of height.

The layer shaping unit 410 may generate a plurality of 2D layers on the space. The 2D layers may be vertically separated.

Herein, the layer shaping unit 410 may include a collection unit, an identification unit, an extraction unit, and a layer unit.

The collection unit of the layer shaping unit 410 may obtain a point cloud of an object scanned by a surface scanning device loaded into an aircraft which captures the earth's surface. In this case, the collection unit of the layer shaping unit 410 may extract a height of a specific point of a building using the obtained point cloud. Herein, the height may be the height of the specific point such as a top height of the building or a middle height of the building. A description will be given of a method for extracting a height of a specific point of a building from a point cloud of a scanned object according to an embodiment with reference to FIGS. 22A and 22B.

Figure 22A:
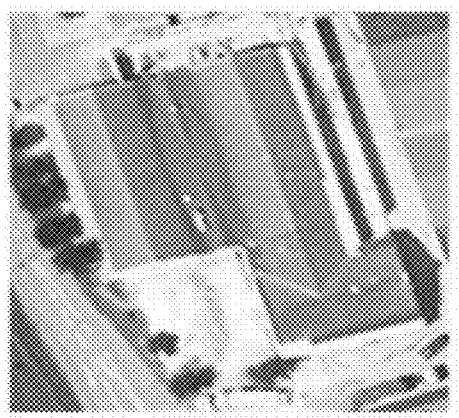
FIGS. 22A and 22B are drawings illustrating a process of extracting a height of a specific point from an object scanned by a light detection and ranging (LiDAR) device according to an embodiment.
Figure 22B:
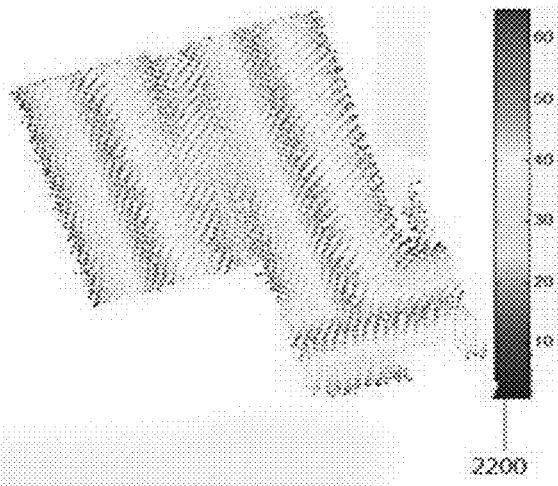

FIGS. 22A and 22B are drawings illustrating a process of extracting a height of a specific point from an object scanned by a LiDAR device according to an embodiment. FIG. 22A illustrates an image of a real object. FIG. 22B illustrates a point cloud of a real object scanned by a scanning device such as LiDAR equipment. In this case, FIG. 22B illustrates a color spectrum 2200 which may refer to a height at each point of the object. According to an embodiment, the collection unit of the layer shaping unit 410 may extract the height values of the specific points of the scanned object with reference to the color spectrum.

In an embodiment, when extracting the height values of the specific points from the scanned object using the point cloud, the collection unit of the layer shaping unit 410 may use a height spectrum value of the color spectrum 2200. However, the LiDAR equipment may scans an object in a pulse manner of laser light, thus causing dispersion of light and a problem of recognizing a boundary and a break line based on materials of the object. The result of extracting height values of the object may vary according to an algorithm of a software tool used to analyze the color spectrum 220. Therefore, in an embodiment, an error in verifying a height of a layer by first flight (e.g., flight of a pilot on a visible area) on the layer first set by a point cloud which LiDAR data may be corrected through calibration of an optical imaging device.

For example, the collection unit of the layer shaping unit 410 may obtain a point cloud of an object onto which a LiDAR pulse is projected via a LiDAR device loaded into an aircraft which captures the earth's surface.

The identification unit of the layer shaping unit 410 may analyze the point cloud collected by the collection unit to identify the object. In this case, the identification unit of the layer shaping unit 410 may recognize a boundary or a contour of an object on the ground through the point cloud and may identify the recognized object as a bridge, a building, wires, and the like.

Figure 23:
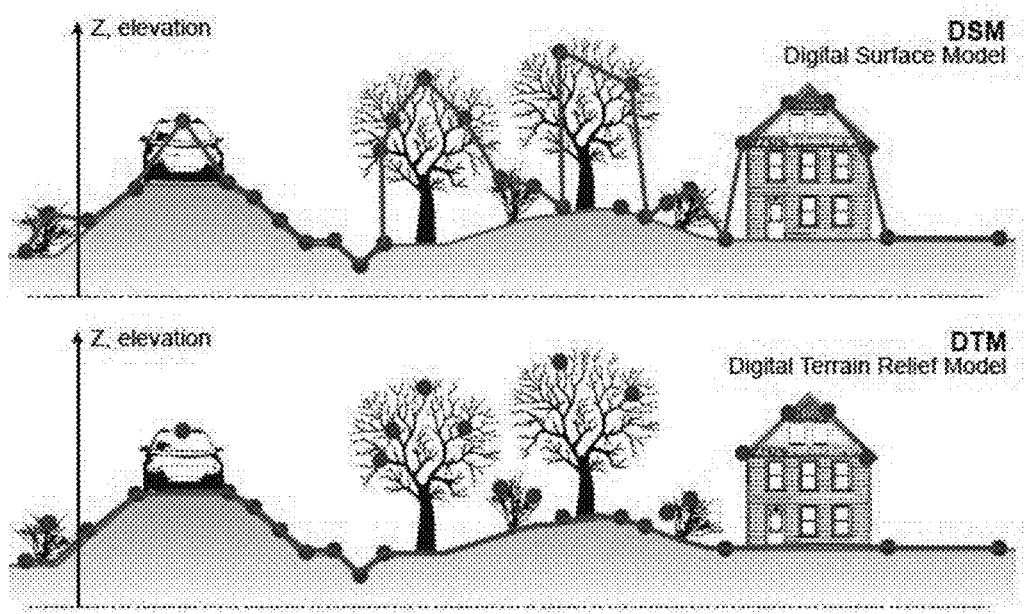
FIG. 23 is a drawing illustrating a digital surface model (DSM) and a digital terrain relief model (DTM) used in an embodiment.

The extraction unit of the layer shaping unit 410 may extract height values of specific points of the object identified by the identification unit using a digital surface model (DSM) or a digital terrain model (DTM) among terrain altitude data. DSM data and DTM data may be data which may be obtained from a government agency (e.g., National Geographic Information Institute in Korea) or an aerial survey company which establishes a database of geographic information of each country. FIG. 23 is a drawing illustrating a DSM and a DTM used in an embodiment. As shown in FIG. 23, the DSM may be a height value of a ground object, and the DTM may be a height value (elevation) of terrain.

The layer unit of the layer shaping unit 410 may shape an area and altitude, which facilitates autonomous flight of an unmanned aerial vehicle, as a layer on a space by connecting the height values of the specific points of the object, extracted from the extraction unit.

A description will be given of a method for identifying such object and shaping an autonomous flight space with reference to FIGS. 8 to 10.

In operation 320, the autonomous navigation map unit 420 may establish an autonomous navigation map for flight of the unmanned aerial vehicle on the space by matching at least one of flight altitude restriction data, a detailed digital map, and route information for avoiding a military protection zone or a no-fly zone to the layer shaped on the space.

In operation 330, the space map unit 430 may shape the autonomous navigation map for the flight of the unmanned aerial vehicle, established on the layer, as a space map applicable to the unmanned aerial vehicle by synchronizing the autonomous navigation map with the unmanned aerial vehicle within safety standards through information of a GPS or location coordinate correction device.

The space map unit 430 may match a GPS coordinate to the autonomous navigation map for the flight of the unmanned aerial vehicle, established on the layer, and may process an altitude value of an image of a ground object image from the autonomous navigation map for the flight of the unmanned aerial vehicle, thus correcting an altitude measured by a sensor.

In other words, the space map unit 430 may match the GPS coordinate to the autonomous navigation map for the flight of the unmanned aerial vehicle, established on the layer, may analyze a change in resolution of a ground object by a set incident angle (or a calibrated incident angle on the earth's surface) of an imaging device (e.g., various loadable optic-based imaging devices) loaded into the unmanned aerial vehicle, and may match a resolution height value extracted through the analysis of the change in resolution to the GPS coordinate, thus correcting an altitude measurement value of an altitude measuring device which uses an echo principle of ultrasonic waves.

A description will be given in detail of a method for matching this geographic spatial data and establishing a map with reference to FIGS. 11 to 12B.

A method for making a map for flight of an unmanned aerial vehicle on a 3D detailed map may include vertically and separately establishing a plurality of layers on the 3D detailed map and shaping a route established at a vertically separated interval and a symbol indicating a collected way point, established on the layer.

Herein, the vertically and separately establishing of the plurality of layers may include obtaining a point cloud of an object scanned by a surface scanning device loaded into an aircraft which captures the earth's surface, identifying the object by analyzing the collected point cloud, extracting height values of specific points of the identified object using terrain altitude data, and shaping an area and altitude, which facilitates autonomous flight of an unmanned aerial vehicle, as a layer by connecting the extracted height values of the specific points of the object.

The method for making the map for the flight of the unmanned aerial vehicle on the 3D detailed map according to another embodiment will be described in detail using a system for making a map for flight of an unmanned aerial vehicle on a 3D detailed map according to another embodiment. Herein, the system for making the map for the flight of the unmanned aerial vehicle on the 3D detailed map may include a layer shaping unit and a route and symbol shaping unit. The components of the system for making the map for the flight of the unmanned aerial vehicle on the 3D detailed map may be included in a processor included in a server.

The layer shaping unit may vertically and separately establish a plurality of layers on the 3D detailed map. In this case, a conventional 3D detailed map may be used as the 3D detailed map, or the 3D detailed map may be made by collected data.

As shown in FIG. 4, the layer shaping unit may include a collection unit, an identification unit, an extraction unit, and a layer unit.

The collection unit of the layer shaping unit may obtain a point cloud of an object scanned by a surface scanning device loaded into an aircraft which captures the earth's surface. For example, the collection unit of the layer shaping unit may obtain a point cloud of an object onto which a LiDAR pulse is projected by a LiDAR device loaded into the aircraft which captures the earth's surface.

The identification unit of the layer shaping unit may analyze the point cloud collected by the collection unit to identify the object.

The extraction unit of the layer shaping unit may extract height values of specific points of the object identified by the identification unit using a DSM or a DTM among terrain altitude data.

The layer unit of the layer shaping unit may shape an area and altitude, which facilitates autonomous flight of an unmanned aerial vehicle, as a layer on a space by connecting the height values of the specific points of the object, extracted by the extraction unit.

Herein, the layer may include at least one of an established altitude, a mission which may be performed, and fuselage specifications.

A symbol of a route established on the layer may include a location coordinate and an altitude value of an image on a layer for the corresponding coordinate. The altitude value of the image may be a value in which a value measured by a sensor which measures an altitude should be corrected to maintain an altitude established on a layer while an unmanned aerial vehicle performs autonomous flight.

Figure 5:
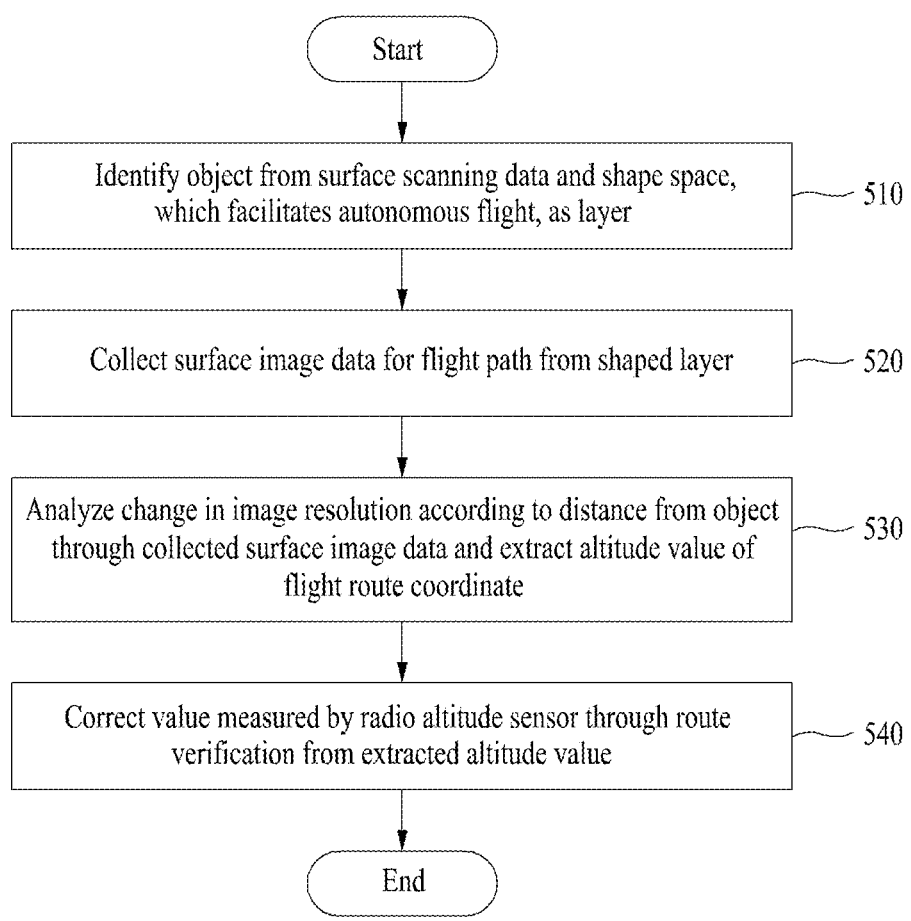
FIGS. 5 and 6 are flowcharts illustrating a method for establishing a route of an unmanned aerial vehicle according to an embodiment.
Figure 6:
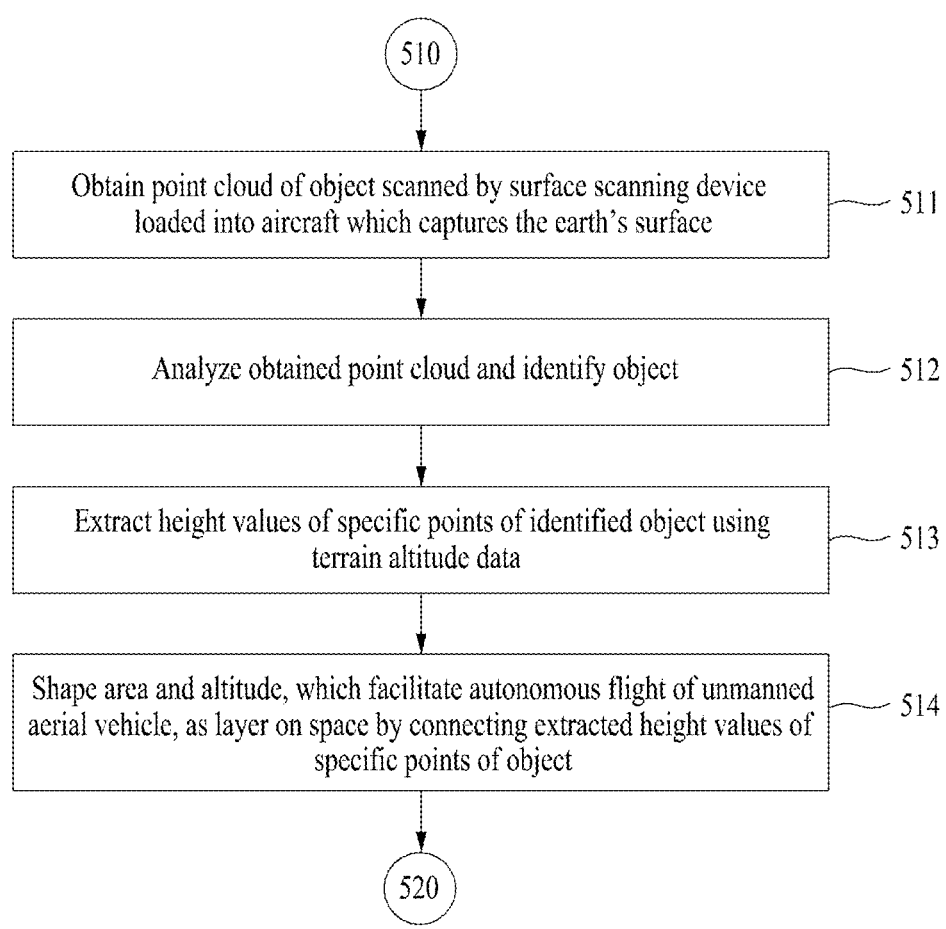

FIGS. 5 and 6 are flowcharts illustrating a method for establishing a route of an unmanned aerial vehicle according to an embodiment.

Referring to FIGS. 5 and 6, the method for establishing the route of the unmanned aerial vehicle according to an embodiment may include an operation 510 of identifying an object from a surface scanning data and shaping a space, which facilitates autonomous flight, as a layer, an operation 520 of collecting surface image data for a flight route from the shaped layer, and an operation 530 of analyzing a change in image resolution based on a distance between a camera which scans the earth's surface and an object through the collected surface image data and extracting an altitude value on a flight route. Herein, the distance between the camera and object may be calculated through internal parameter values and external parameter values of the camera, verified through calibration of the camera. Also, since it is assumed that a location and direction of the camera when an image of a ground object is captured is known in an embodiment of the inventive concept, the distance between the camera and the object may be calculated by considering the above-mentioned parameters of the camera.

Also, the camera may include another replaceable device which may recognize and record a change in resolution of an object with respect to a calibration parameter value as well as a general optic camera having a structure including a light condensing part, a light condensing adjusting part, and an imaging part.

Herein, operation 510 of shaping the space, which facilitates the autonomous flight, as the layer may include operation 511 of obtaining a point cloud of an object scanned by a surface scanning device loaded into an aircraft which captures the earth's surface, operation 512 of identifying the object by analyzing the obtained point cloud, operation 513 of extracting height values of specific points of the identified object using terrain altitude data, and operation 514 of shaping an area and altitude, which facilitates autonomous flight of an unmanned aerial vehicle, as a layer on a space.

Further, the method for establishing the route of the unmanned aerial vehicle according to an embodiment may further include operation 540 of correcting a value measured by a radio altitude sensor through route verification from the extracted altitude value.

According to an embodiment, an autonomous flight route of an invisible area may be provided to overcome a limit of an operation in a visible range of a pilot to an area where it is difficult to keep an altitude value constant due to a ground object and the like.

Also, a method and system for establishing a route of an unmanned aerial vehicle to establish a safe autonomous flight route of the unmanned aerial vehicle by extracting height information of an elevation and an obstacle and analyzing a change in image resolution of surface image data, and correcting calibration verification and a value measured by a radio altitude sensor of the unmanned aerial vehicle using extracted height information of a ground object may be provided.

The calibration verification according to an embodiment may include verification about whether a distance between a camera lens loaded into an unmanned aerial vehicle and an object and a focus on the object are correct. The correcting of the value measured by the radio altitude sensor of the unmanned aerial vehicle may include correcting an error range of the radio altitude sensor using a change value in image resolution.

In an embodiment, the correcting of the value measured by the radio altitude sensor of the unmanned aerial vehicle may be performed for calibration verification of a camera for the purpose of initial flight setting corresponding to a flight purpose before the unmanned aerial vehicle flies. The correcting of the value measured by the radio altitude sensor of the unmanned aerial vehicle may be performed to continue correcting the value measured by the radio altitude sensor of the unmanned aerial vehicle while the unmanned aerial vehicle is operated after the initial flight setting is completed.

Also, calibration verification for initial setting before first flight of the unmanned aerial vehicle may be verifying calibration of a camera with respect to a value measured by a radio altitude sensor of the unmanned aerial vehicle on level ground. A description will be in detail hereinafter of this. An operator of a unmanned aerial vehicle operation system according to an embodiment or a company for establishing and operating an autonomous flight map may verify a distance (focal distance) from the center of an optical lens of a camera to an image sensor by setting a radio altitude value of the unmanned aerial vehicle before flight when about 80 meters from an elevation is set as a height of a layer and verifying whether the camera loaded into the unmanned aerial vehicle which hovers at the corresponding altitude is focused to 80 meters. Therefore, the operator or the company may verify whether an object which is at an incident angle from a height of 80 meters is focused.

In this case, the reason of performing such calibration verification whenever the unmanned aerial vehicle flies may be because a value may vary by extreme vibration which occurs when the unmanned aerial vehicle takes off and because a flight altitude recognized by the unmanned aerial vehicle is different from an altitude of a specified layer due to the value.

Also, according to an embodiment, the calibration verification may be performed to continue correcting a value measured by a radio altitude sensor of the unmanned aerial vehicle while the unmanned aerial vehicle is operated after the initial setting for flight of the unmanned aerial vehicle is completed. A description will be given in detail hereinafter of this. A value measured by a radio altitude sensor loaded into a real unmanned aerial vehicle may be within a range departing a height of a layer based on a flight purpose of the unmanned aerial vehicle. In this case, there may be a risk that the unmanned aerial vehicle departs from a maximum flight restriction altitude or collides with other aerial vehicles. Thus, in an embodiment, to prevent such problems, an embodiment may allow the unmanned aerial vehicle to fly while keeping a height of a layer constant through calibration verification using a change value in image resolution of optical equipment loaded into the unmanned aerial vehicle.

Therefore, an embodiment may allow the unmanned aerial vehicle to fly while keeping a height of the layer by adjusting a flight altitude height which departs from the layer by a height of a ground object to a height of a layer using a resolution height by an analysis of a change in resolution although the unmanned aerial vehicle suddenly recognizes the presence of the ground by the radio altitude sensor during flight. Particularly, in order to do so, first of all, there may be a need for obtaining an image correctly captured after calibration of a camera is accurately verified to obtain an image for accurately analyzing resolution on a path where the unmanned aerial vehicle is moved.

Hereinafter, a description will be given in detail of a method each operation of the method for establishing the route of the unmanned aerial vehicle according to an embodiment.

Figure 7:
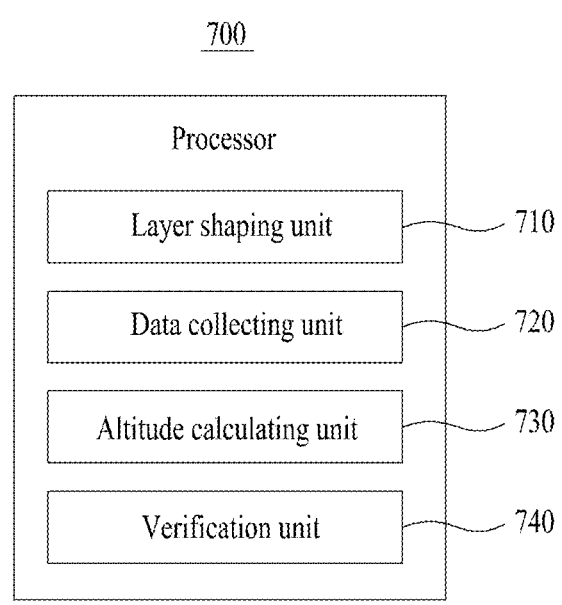
FIG. 7 is a block diagram illustrating a system for establishing a route of an unmanned aerial vehicle according to an embodiment.

FIG. 7 is a block diagram illustrating a system for establishing a route of an unmanned aerial vehicle according to an embodiment. As shown in FIG. 7, a system 700 for establishing a route of an unmanned aerial vehicle according to an embodiment may include a layer shaping unit 710, a data collecting unit 720, an altitude calculating unit 730, and a verification unit 740. The components of the system 700 for establishing the route of the unmanned aerial vehicle may be included in a processor included in a server.

Such components may be implemented to execute operations 510 to 540 included in a method of FIGS. 5 and 6 through an OS and at least one program code included in a memory.

In operation 510, the layer shaping unit 710 may identify an object form surface scanning data and may shape a space, which facilitates autonomous flight, as a layer. Herein, the layer may be a plane including the concept of height.

The layer shaping unit 710 may analyze a point cloud of an object scanned by various surface scanning devices (e.g., a synthetic aperture radar (SAR), a LiDAR device, a short wave infrared sensor, and the like) from an aircraft which captures the earth's surface to identify an object such as a building and a bridge.

The layer shaping unit 710 may shape a 2D layer on a 3D space by calculating a height of the object identified from scan data with reference to a surface altitude of a corresponding coordinate and connecting heights of specific points.

The layer shaping unit 710 may generate a plurality of 2D layers on a space. The 2D layers may be vertically and separately established.

Herein, the layer shaping unit 710 may include a collection unit, an identification unit, an extraction unit, and a layer unit.

The collection unit of the layer shaping unit 710 may obtain a point cloud of an object scanned by the surface scanning device loaded into the aircraft which captures the earth's surface. In this case, the collection unit of the layer shaping unit 710 may extract a top height of a building or a middle height of the building based on a height of the building.

For example, the collection unit of the layer shaping unit 710 may obtain a point cloud of an object onto which a LiDAR pulse is projected by a LiDAR device loaded into the aircraft which captures the earth's surface.

The identification unit of the layer shaping unit 710 may analyze the point cloud collected by the collection unit to identify the object.

The extraction unit of the layer shaping unit 710 may extract height values of specific points of the object identified by the identification unit using terrain altitude data.

The layer unit of the layer shaping unit 710 may shape an area and altitude, which facilitates autonomous flight of an unmanned aerial vehicle, as a layer on a space by connecting the height values of the specific points of the object, extracted by the extraction unit.

In operation 520, the data collecting unit 720 may collect surface image data for a flight path from the shaped layer.

In this case, the data collecting unit 720 may initially collect surface image data from a layer with a height of flight altitude restriction.

The data collecting unit 720 may obtain surface image data via an imaging device in which a calibration value is set at a specific altitude, loaded into the aircraft which captures the earth's surface.

The data collecting unit 720 may verify spatial geographic information to collect surface image data, may scan a safe path for flight, and may generate a detailed flight route, thus collecting surface image data for the corresponding flight route. Particularly, the initial collection of surface image data necessary for analyzing a route to establish the route may be for permitting only flight within a visible area of a pilot having qualifications and maximally obtaining safety.

The data collecting unit 720 may set a height value of flight altitude restriction and may verify a value measured by a radio altitude sensor (e.g., a radio altimeter or the like) through an object which facilitates verification of a height of flight altitude restriction. Herein, the object which facilitates verification of the height of flight altitude restriction may be a ground structure and the like which is the same or higher than the height of flight altitude restriction.

In addition, the data collecting unit 720 may verify information such as a calibration parameter according to specifications, such as resolution and an image acquisition scheme of the imaging device, and an incident angle and may verify flight information of a fuselage, recorded in a flight data recorder (FDR) loaded into the unmanned aerial vehicle.

In operation 530, the altitude calculating unit 730 may analyze a change in image resolution according to a distance between a camera and an object through the collected surface image data and may extract an altitude value on a flight route.

The altitude calculating unit 730 may match coordinate, altitude, attitude, time information from the FDR of a fuselage with the collected surface image data and may calculate an altitude Z value on a route through distortion correction of an image and an analyze of a change in image resolution with reference to calibration information and a calibration parameter of an imaging device to extract a height value of a collected image.

In detail, the altitude calculating unit 730 may analyze a change in resolution of an image according to the distance between the camera and the object and may extract an altitude value on a flight route. An altitude may be verified through the change in the resolution of the image, that is, a difference between the number of pixels of a previous frame and the number of pixels of a current frame or a difference in the number of pixels of objects captured at various angles.

Figure 15A:
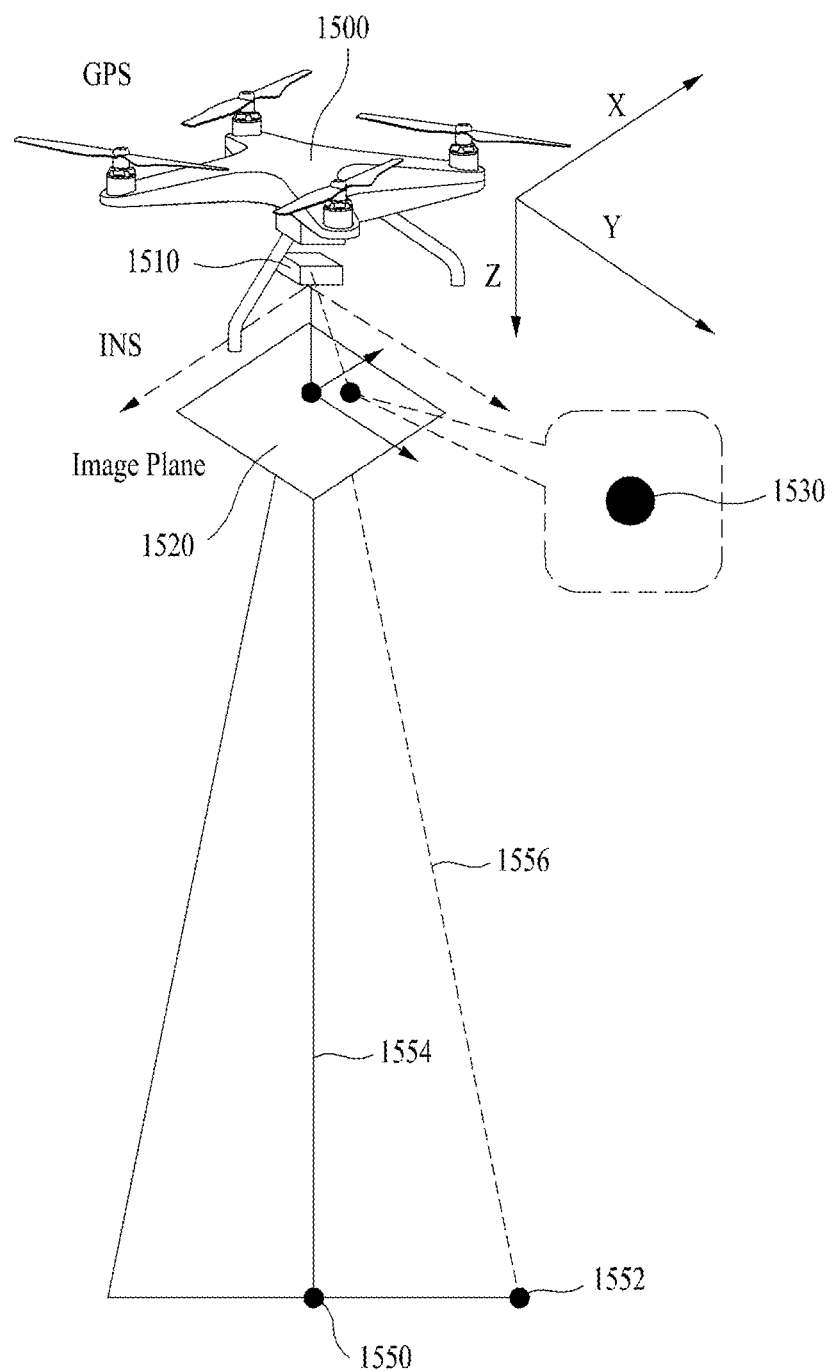
FIGS. 15A and 15B are drawings illustrating a change in resolution of an image based on a distance from an object according to an embodiment.
Figure 15B:
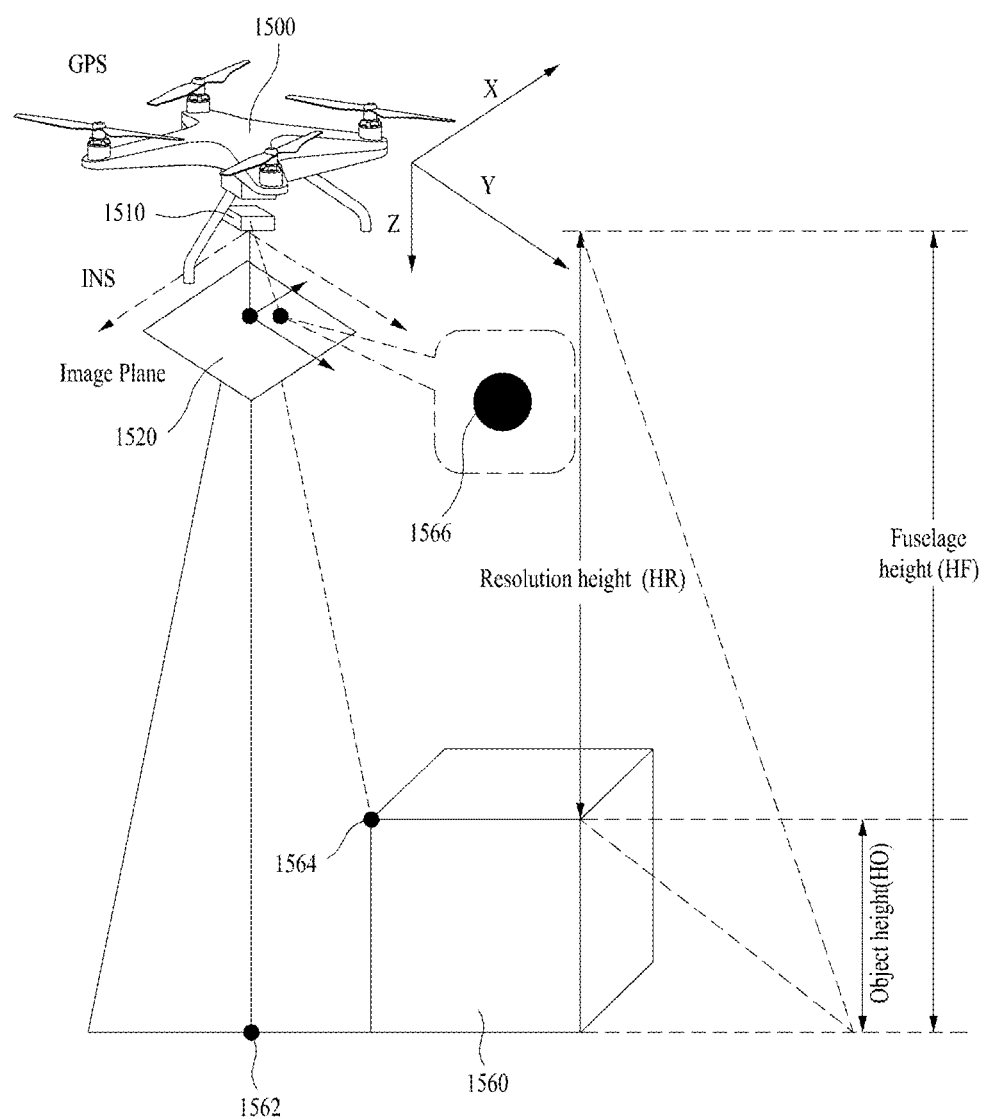

Thus, as shown in FIG. 15B, a resolution height HR may be calculated by a difference between a height by a radio altitude sensor and a height HO by an analysis of a point cloud. Correction of the resolution height HR may be performed through a sensor through a triangulation analysis and verification of scanning data.

As such, a conventional image analysis and distance measurement method of analyzing a change in an image of an object and measuring a distance may be applied to altitude measurement to analyze a change in image resolution and extract an altitude Z value of an image.

In operation 540, the verification unit 740 may correct a value measured by the radio altitude sensor through route verification from the extracted altitude value.

If extracting an altitude Z value from an object (obstacle) which exists on a route and substituting the result into a route coordinate of the unmanned aerial vehicle at a constant interval, the verification unit 740 may recognize a resolution height HR of an image corresponding to a coordinate which is in contact with the object (obstacle) and may correct a value measured by the radio altitude sensor which is in use if the unmanned aerial vehicle arrives at the corresponding route coordinate.

The verification unit 740 may support an offline image processing scheme to minimize a risk to a communication and fuselage infrastructure environment upon autonomous flight.

The verification unit 740 may repeatedly collect surface image data through autonomous flight of the unmanned aerial vehicle and may reflect the collected surface image data in route control, ground control, and route map data through an analysis of a change in resolution, thus generating or verifying a new route.

The unmanned aerial vehicle which reaches a specific coordinate of a route may match route map data previously stored in its fuselage with a GPS coordinate and may correct an altitude Z value measured by a sensor using an altitude Z value of an image from the route map data. The corrected altitude Z value may be for maintaining vertical separation of a route by flight altitude restriction and a layer through shifting control of the unmanned aerial vehicle.

To verify a route and maintain the latest data, the unmanned aerial vehicle may repeatedly collect surface image data through an autonomous flight mission and may reflect the collected surface image data in route control, ground control, and route map data through an analysis of a change in image or resolution. When the autonomous flight mission is more repeated, reliability of a route may be more increased. It is possible to generate and verify a new route through a simulation.

Figure 8:
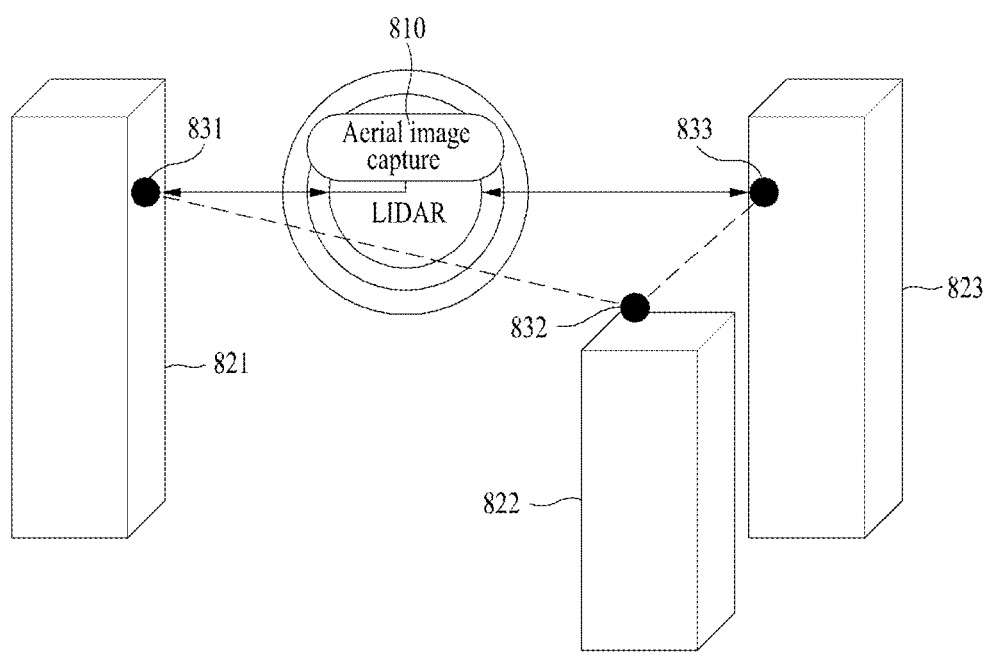
FIGS. 8, 9, and 10 are drawings illustrating shaping an autonomous flight space from surface scanning and image capture data according to an embodiment.
Figure 9:
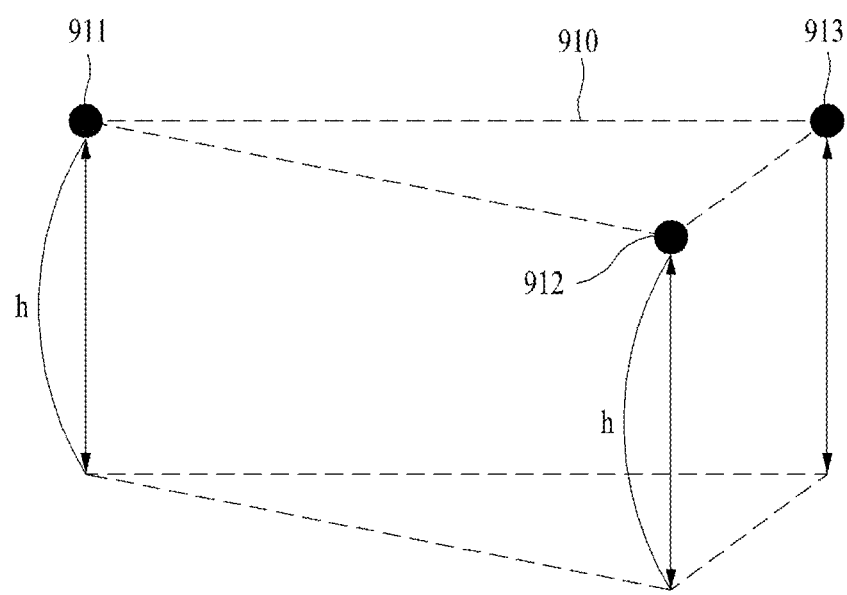
Figure 10:
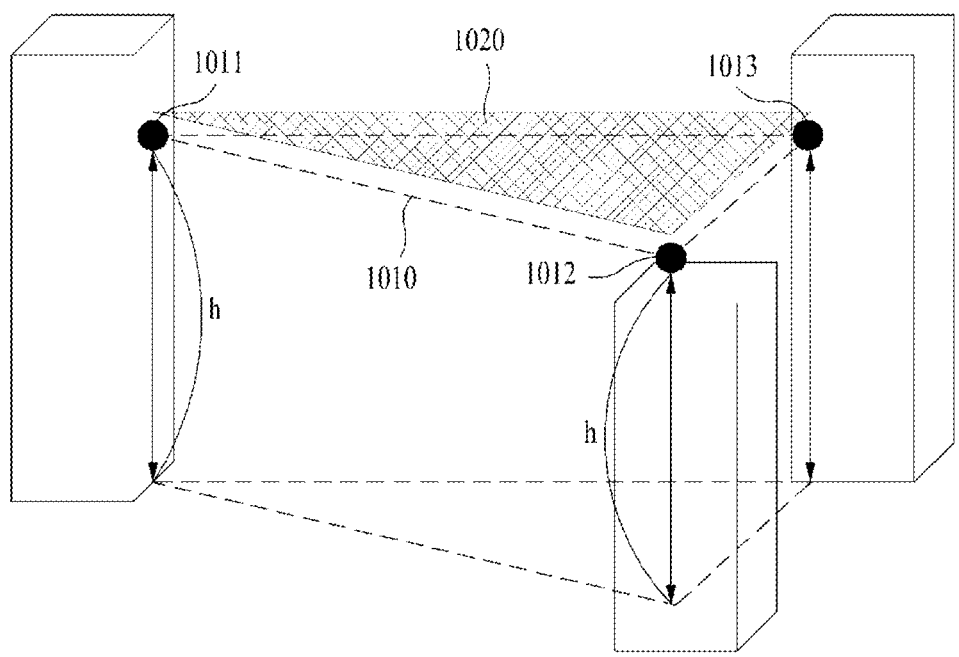

FIGS. 8 to 10 are drawings illustrating shaping an autonomous flight space from surface scanning and image capture data according to an embodiment.

Referring to FIGS. 8 and 9, an echo point cloud of objects (e.g., buildings and the like) 821 to 823 onto which a LiDAR pulse is projected via LiDAR equipment, loaded into an aircraft 810 which captures the earth's surface to shape an autonomous flight space from surface scanning and image capture data, and a calibrated imaging device, points 831, 832, and 833 formed at heights of specific points of the objects 821, 822, and 823, and image data may be obtained. Such data may be used in the form of various spatial geographic information services such as identification of the objects 821 to 823 and 3D modeling of the objects 821 to 823.

Point clouds collected by a LiDAR pulse and points 911, 912, and 913 formed at heights of specific points among the point clouds may be analyzed to identify the objects 821 to 823. A height value h of the point 912 of the identified object 822 may be extracted using a conventionally established terrain altitude data, and a plane 910 which connects the points 911 and 913 of the objects 821 and 823 having the same height as the height value h may be generated. For example, the height value h (120 meters) of the specific point of the identified object (a building and the like) may be extracted. Herein, the specific point may be randomly selected and may be a point selected assuming that there is a space where an unmanned aerial vehicle may take off and land on a rooftop of the object 811 in FIG. 8.

As shown in FIG. 10, if connecting height values 1011, 1012, and 1013 of extracted objects (see reference numeral 1010), an area and altitude, which facilitates autonomous flight of the unmanned aerial vehicle, may be shaped as the concept of a layer 1020 on a space.

Meanwhile, in FIGS. 8 to 10, it is assumed that a maximum flight restriction altitude of the unmanned aerial vehicle is 120 meters. FIGS. 8 to 10 illustrate that a height of the object 822 corresponds to 120 meters and that the layer 1020 which facilitates autonomous flight is generated with respect to the height. In an embodiment, to prevent a collision with a manned aerial vehicle when generating a layer which facilitates autonomous flight of the unmanned aerial vehicle, as described above, it is assumed that a maximum flight restriction altitude of the unmanned aerial vehicle is set by a safety regulatory policy. A plurality of vertically separated layers are established (shaped) on a space of the maximum flight level or less and may be used to determine a route of the unmanned aerial vehicle.

Figure 11:
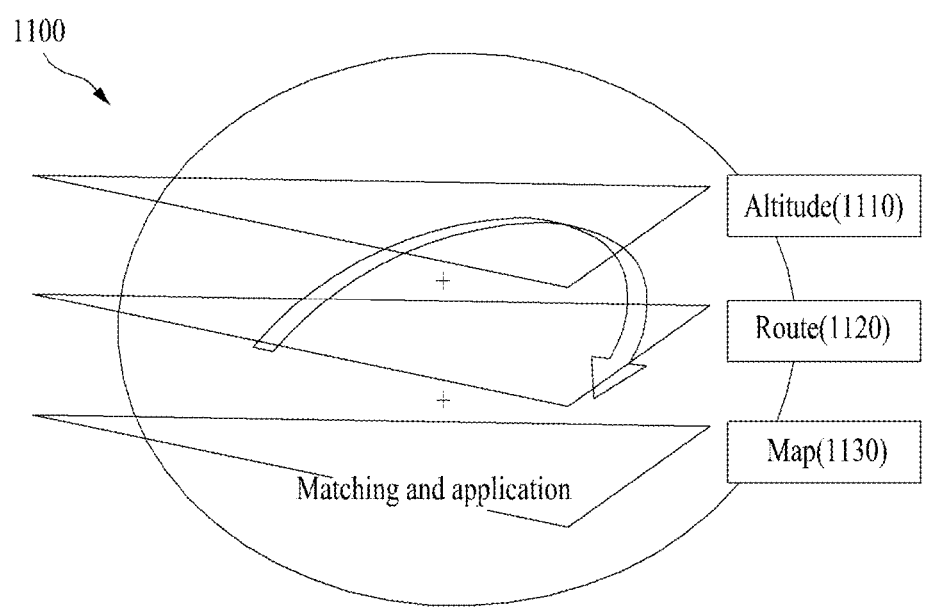
FIG. 11 is a drawing illustrating matching of geographic spatial data according to an embodiment.

FIG. 11 is a drawing illustrating matching of geographic spatial data according to an embodiment.

Referring to FIG. 11, an autonomous navigation map 110 for flight of an unmanned aerial vehicle may be established by matching and applying data, such as an altitude restriction policy 1110, a detailed digital map 1130, and route information 1120 for avoiding a military protection zone and a no-fly zone to a layer shaped on a space. Thus, a service which simultaneously uses a plurality of unmanned aerial vehicles may be provided in an area sensitive to safety by guiding a safe route of the unmanned aerial vehicle. Herein, the autonomous navigation map 1100 for the flight of the unmanned aerial vehicle may be represented as an autonomous navigation map for safety of the unmanned aerial vehicle.

Figure 12A:
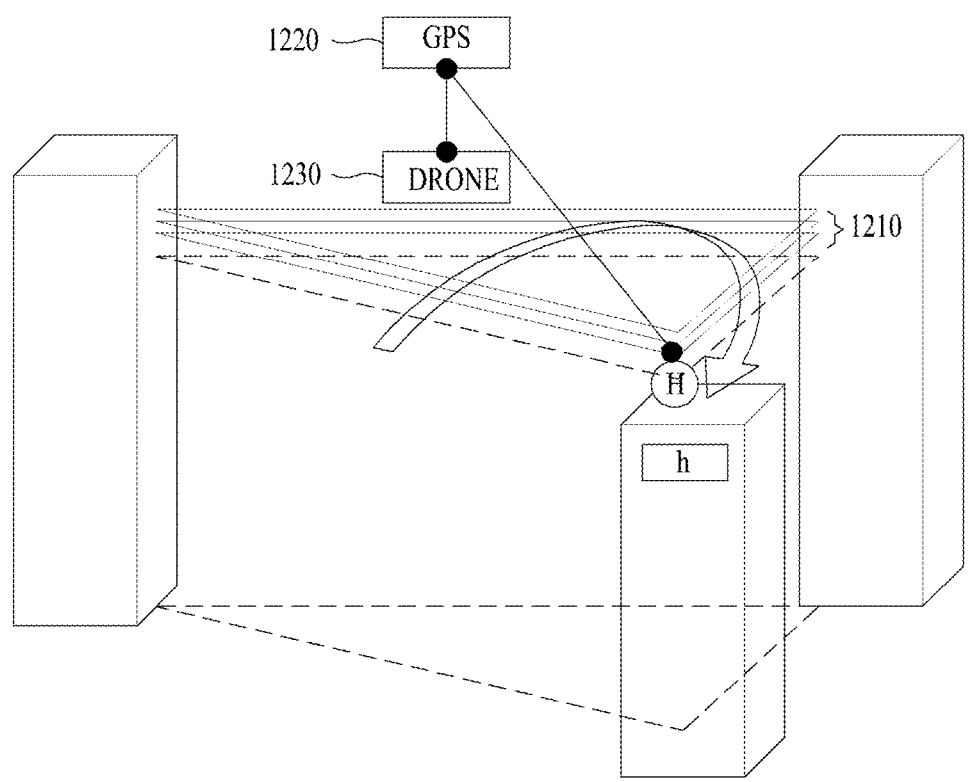
FIGS. 12A and 12B are drawings illustrating a method for making a map through matching of geographic spatial data according to an embodiment.
Figure 12B:
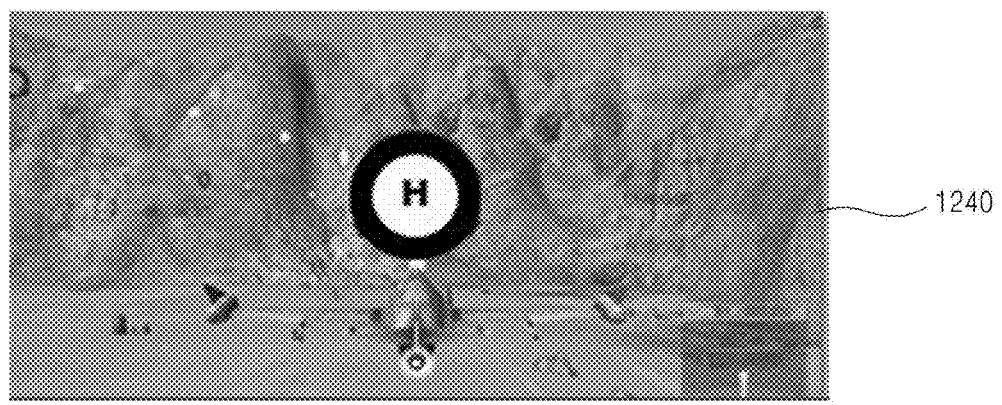

FIGS. 12A and 12B are drawings illustrating a method for making a map through matching of geographic spatial data according to an embodiment.

Referring to FIG. 12A, according to an embodiment, an autonomous navigation map 1210 for flight of an unmanned aerial vehicle, established on a layer, may be synchronized with an unmanned aerial vehicle 1230 (e.g., a drone) through information of a GPS 1220 and various location coordinate correction devices and may meet targeted safety standards.

In other words, as shown in FIG. 12B, tutorial details of a 3D virtual flight simulator 1240 may be shaped as a space map applicable to the unmanned aerial vehicle actually and physically.

The 3D virtual flight simulator 1240 may establish a vertical altitude value as spatial data using non-contact altitude measurement technology such that a real fuselage may recognize a visualized way point and may apply the spatial data, thus ensuring safety of operating the unmanned aerial vehicle.

Surface image data obtained by an imaging device in which scanning (echo) data such as radio waves/light to which an operation principle of a radio sensor is applied and a calibration value of a specific altitude are set may be used to establish a safe autonomous flight route of the unmanned aerial vehicle on a space.

An altitude Z value by a distance and altitude measurement scheme using scanning (echo) data may be for extracting height information of an elevation and an object (obstacle) from the object.

An altitude Z value by an image change analysis scheme of the surface image data collected by the imaging device in which the calibration value is set at the specific altitude may be for correcting calibration verification and a value measured by a radio altitude sensor of the unmanned aerial vehicle using extracted height information of the object (obstacle).

Figure 13:
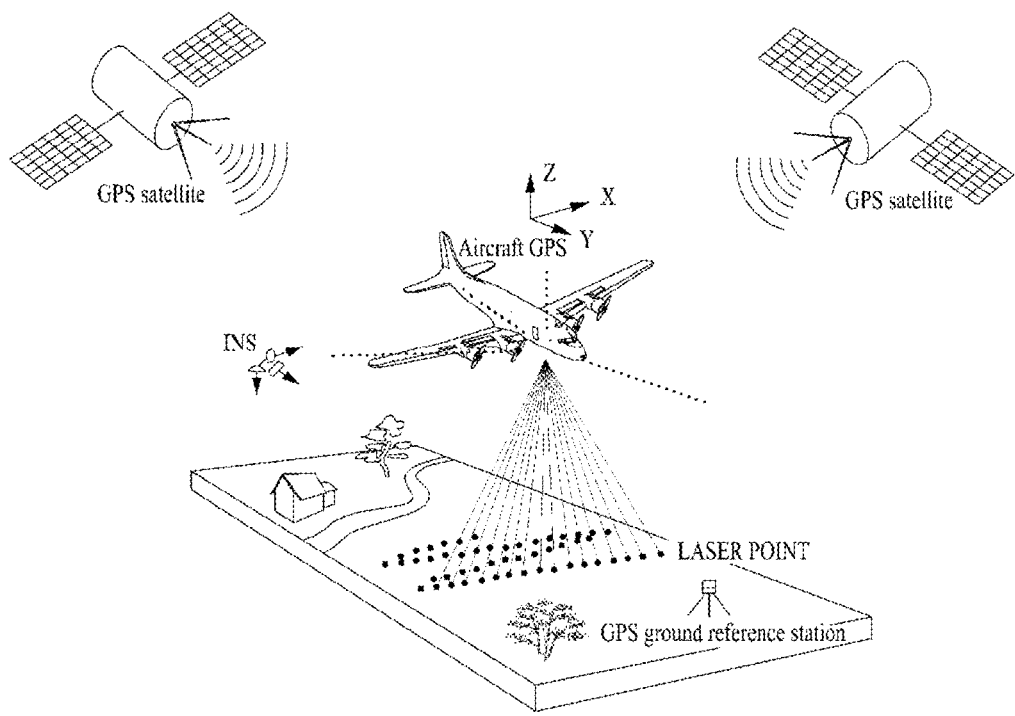
FIG. 13 is a drawing illustrating collection of a point cloud through laser scanning according to an embodiment.

FIG. 13 is a drawing illustrating collection of a point cloud through laser scanning according to an embodiment.

As shown in FIG. 13, an aircraft which captures the earth's surface may identify an object by collecting a point cloud of the object through a GPS (a location), an inertial navigation system (INS) (a route location), a laser scan, and the like.

An orthogonal (image, a 3D map, a contour, a DEM, and the like may be made from the scanned result indicated as these countless point clouds.

FIGS. 14A to 14D are drawings illustrating a layer having a specific height on a 3D space according to an embodiment.

Figure 14A:
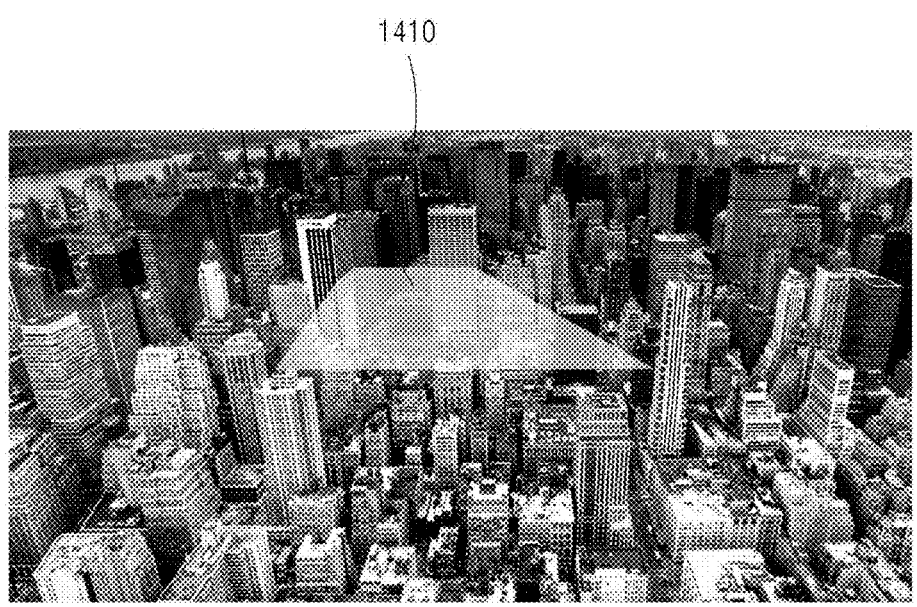
FIGS. 14A, 14B, 14C, and 14D are drawings illustrating a layer having a specific height on a three-dimensional (3D) space according to an embodiment.

As shown in FIG. 14A, a system for establishing a route of an unmanned aerial vehicle may shape a 2D layer on a 3D space by calculating a height of an object identified from scan data with respect to a surface altitude of a corresponding coordinate and connecting heights of specific points.

Figure 14B:
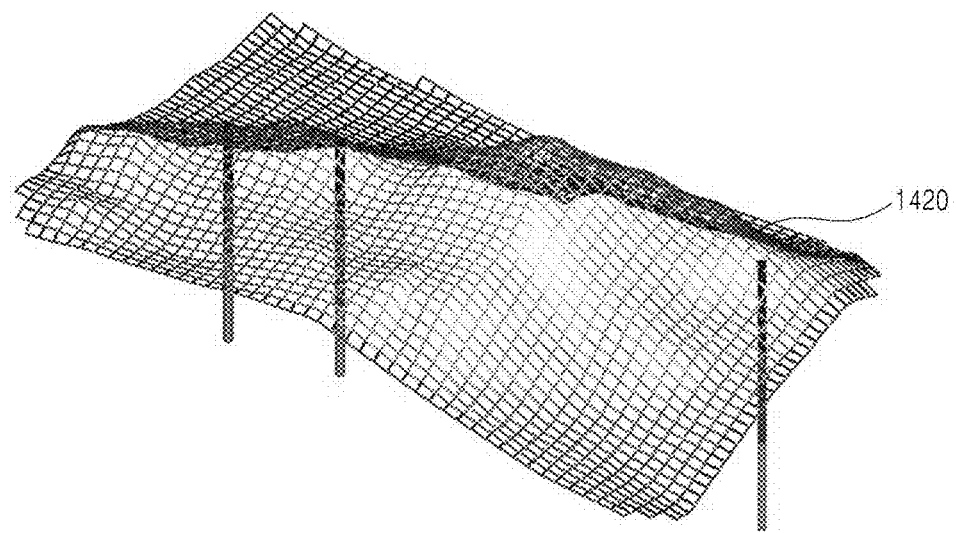

If countless 2D layers 1410 having a specific altitude Z value are generated on the 3D space, a terrain shown in FIG. 14A may be established. In addition, as shown in FIG. 14B, the terrain may be shaped as a plurality of grid terrains 1420. In other words, since the layer 1410 shown in FIG. 14A is expanded to be shaped as the grip terrain 1420 in which the plurality of layers of FIG. 14B are connected, the grid terrain may be used to establish a route of an unmanned aerial vehicle which may fly in a long distance. Thus, if each of grids is expanded one by one in FIG. 14B, finally, a shape in which layers shaped at heights specified along an elevation are connected may be indicated.

Figure 14C:
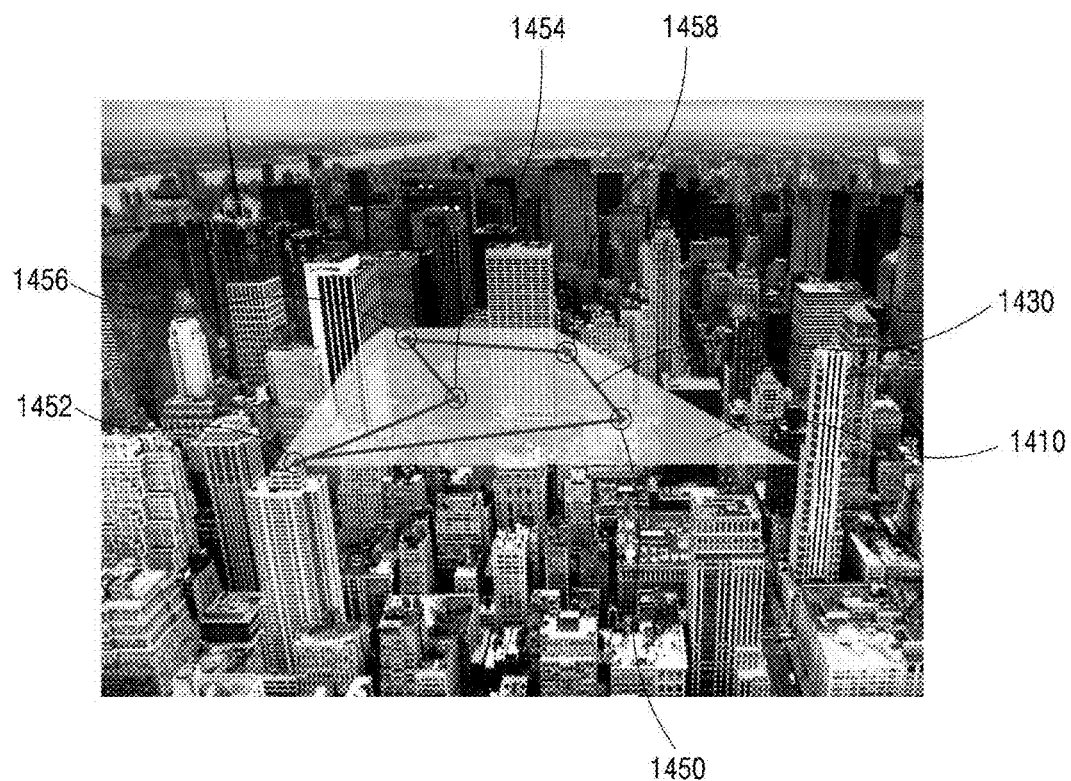

Referring to FIG. 14C, the system for establishing the route of the unmanned aerial vehicle may collect surface image data for a flight path from the shaped layer.

In this case, the system for establishing the route of the unmanned aerial vehicle may collect surface image data from a layer with a height of flight altitude restriction.

The system for establishing the route of the unmanned aerial vehicle may verify spatial geographic information to collect surface image data, may scan a safety path for flight, and may generate a detailed flight path, thus collecting surface image data for the corresponding path. Particularly, the collection of first surface image data necessary for analyzing a route to establish the route may be for permitting only flight within a visible area of a pilot having qualifications and maximally obtaining safety.

The system for establishing the route of the unmanned aerial vehicle may set a height value of flight altitude restriction and may verify a value measured by a radio altitude sensor (e.g., a radio altimeter or the like) through an object which facilitates verification of a height of flight altitude restriction. Herein, the object which facilitates verification of the height of flight altitude restriction may be a ground structure and the like which is the same or higher than the height of flight altitude restriction.

In addition, the system for establishing the route of the unmanned aerial vehicle may verify information such as a calibration parameter according to specifications, such as resolution and an image acquisition scheme of an imaging device, and an incident angle and may verify flight information of a fuselage, recorded in an FDR loaded into the unmanned aerial vehicle.

The system for establishing the route of the unmanned aerial vehicle may match coordinate, altitude, attitude, time information from the FDR of the fuselage with the collected surface image data and may calculate an altitude Z value on a route through distortion correction of an image and an analyze of a change in image resolution with reference to calibration information and a calibration parameter of the imaging device to extract a height value of a collected image.

Figure 14D:
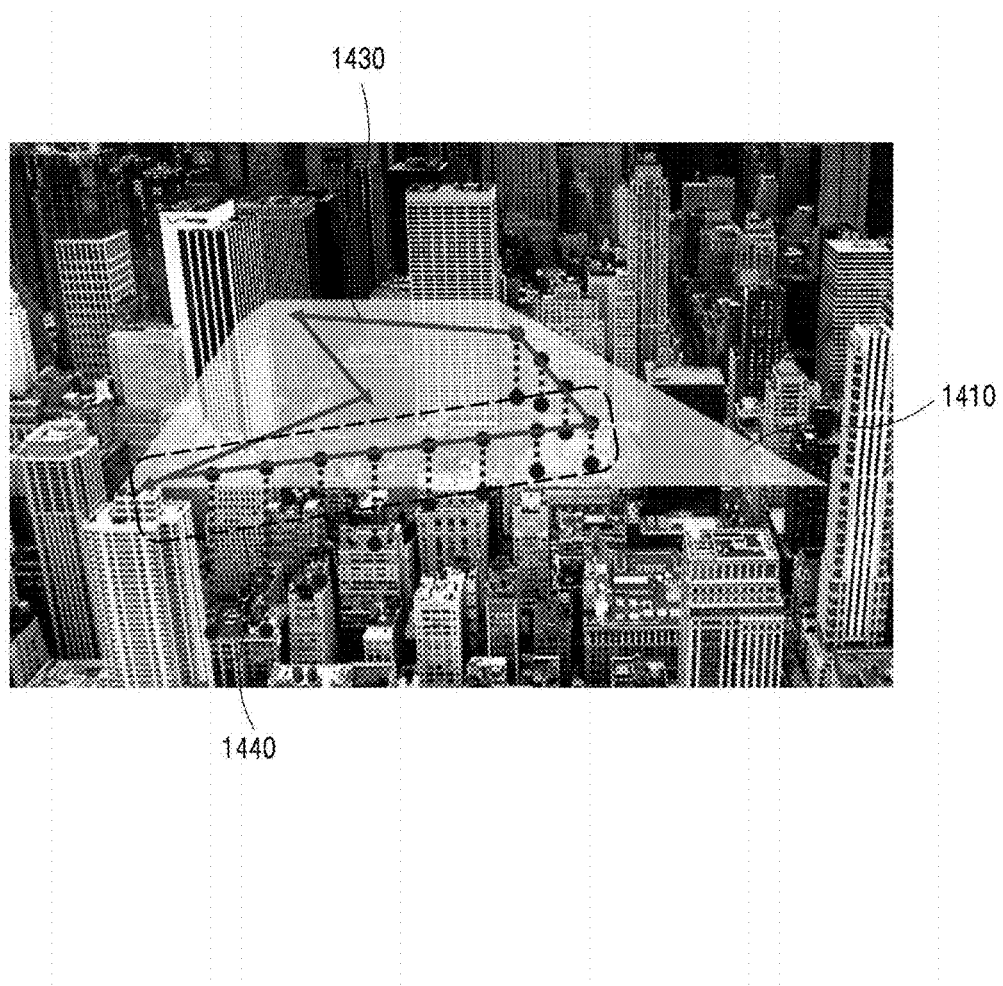

Referring to FIGS. 14C and 14D, the system for establishing the route of the unmanned aerial vehicle may set an autonomous flight route 1430 which is a flight path based on a flight purpose of the unmanned aerial vehicle on the layer 1410 and may generate a point 1440 for analysis of a change in resolution of a ground object to keep a flight altitude of the unmanned aerial vehicle constant at intervals of a point on the autonomous flight route 1430. Therefore, the unmanned aerial vehicle which flies along the autonomous flight route 1430 may periodically verify whether its flight altitude is accurately maintained.

As shown in FIG. 14C, a route 1430 for set autonomous flight may be indicated on the layer 1410. The route 1430 for the autonomous flight may be represented as a route including one way point 1452 designated as the same destination as a source to perform a repeated mission of the unmanned aerial vehicle and four way points 1450, 1454, 1456, and 1458 for avoiding a danger area and changing a movement direction, that is, a total of five way points 1450, 1452, 1454, 1456, and 1458. In this case, each of the five way points 1450, 1452, 1454, 1456, and 1458 may correspond to one of the plurality of way points 1440 for measuring a height of resolution shown in FIG. 14D.

This way point may be the concept of a point of a specific coordinate for achieving any purpose, set on a route. A point preset to set a basic path from a source point to a destination point or a path for avoiding an obstacle may be called a way point. The way point may be termed a coordinate point, including an image resolution value of a ground object the unmanned aerial vehicle should recognize to maintain a layer on a route, as the same concept.

In other words, in FIG. 14D, the point 1440 for an analysis of a change in resolution of the ground object to maintain a flight altitude of the unmanned aerial vehicle constant at intervals of a point on an autonomous flight route may be for indicating a point for measuring a change of an image of each ground object, which exists on a movement route 1430 to maintain a safety regulatory altitude of the unmanned aerial vehicle, as a way point. In other words, a point where analysis of a change in an image is performed with respect to a ground object below the route 1430, which blocks maintaining a height of the layer 1410 while the unmanned aerial vehicle moves along the route 1430 established on the layer 1410, may be represented as a way point. Herein, the way point may be a point where the unmanned aerial vehicle temporarily hovers to perform a specific mission or obtain data.

Figure 24:
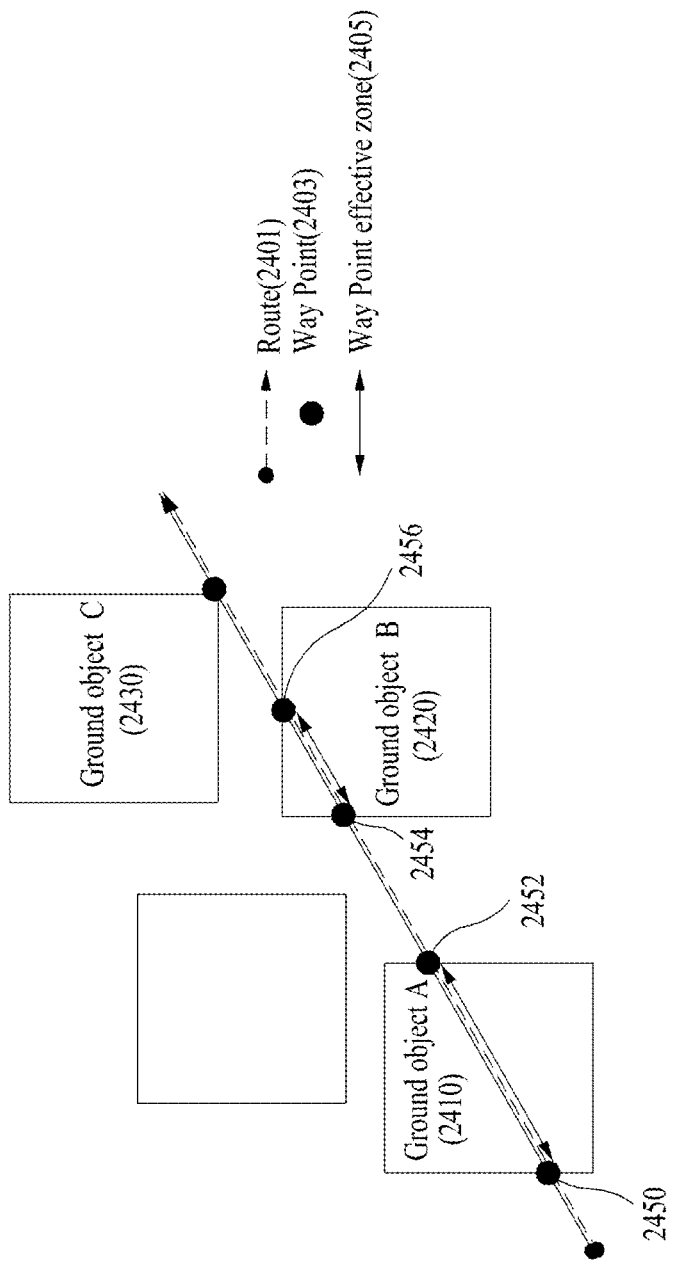
FIG. 24 is a drawing illustrating a method for setting a way point of a ground object according to an embodiment.

A description will be given in detail of the method for setting a route and a way point according to an embodiment with reference to FIG. 24. FIG. 24 illustrates a method for maintaining a flight altitude corresponding to a layer assigned to a route through image analysis when an unmanned aerial vehicle passes above a ground object which exists on a route of the unmanned aerial vehicle according to an embodiment.

Referring to FIG. 24, the unmanned aerial vehicle according to an embodiment may set a way point 2403 necessary for correcting an altitude measurement value of an ultrasonic sensor through image analysis to keep a constant flight altitude corresponding to a layer. The route 2401 of the unmanned aerial vehicle may be established to pass through ground object B 2420 and ground object C 2430 from ground object A 2410. Heights of way points of entry points 2450 and 2454 for ground object A 2410 and ground object B 2420 may be the same as those of way points of exit points 2452 and 2456. Herein, the corresponding zone may be set to the way point effective zone 2405. Herein, the way point effective zone 2405 may refer to a zone with the same resolution height of an image of a ground object at an entry point and an exit point of way points.

Figure 25:
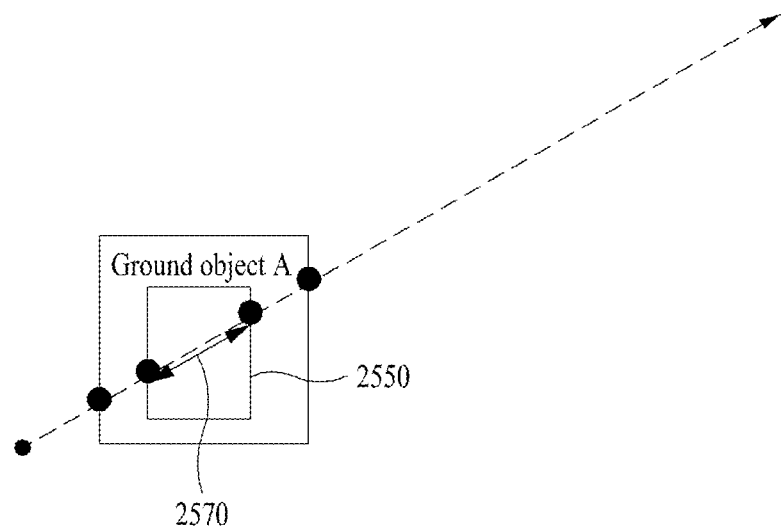
FIG. 25 is a drawing illustrating a process of adding a way point in a way point effective zone of a ground object according to an embodiment.

In contrast, if heights of way points are different in the way point effective zone 2405, additional way points may be further set in the middle of the way point effective zone 2405. Referring to FIG. 25, for example, assuming that there is a rooftop house 2550 on the top of ground object A, if the rooftop house 2550 is located on a flight route, a way point corresponding to the rooftop house 2550 may be added as the way point effective zone 2570.

Preferably, one way point exists for each ground object. However, assuming that ground object A 2410 and ground object B 2420 of FIG. 24 are very large buildings, two way points may exist.

FIGS. 15A and 15B are drawings illustrating a change in resolution of an image based on a distance from an object according to an embodiment.

Referring to FIGS. 15A and 15B, a system for establishing a route of an unmanned aerial vehicle may analyze a change in resolution of an image according to a distance between an unmanned aerial vehicle 1500 and an object and may extract an altitude value on a flight route.

In an embodiment, the unmanned aerial vehicle 1500 may always ascertain a current location, a speed, and the like basically via an INS. However, the unmanned aerial vehicle 1500 may correct a fuselage altitude through a value measured by a radio altitude sensor and a change in resolution of an image to measure a precise altitude. In detail, the unmanned aerial vehicle 1500 may verify an altitude through a difference in the number of pixels for a specific point of an object in a previous frame and a current frame captured by optical equipment 1510, such as a camera, mounted on the unmanned aerial vehicle 1500 and may analyze a change in resolution of an image using an image plane 1520 on which an image is formed in the camera 1510.

First of all, referring to FIG. 15A, assuming that the unmanned aerial vehicle 1500 flies in the direction of X-axis and Y-axis vectors along way points, the unmanned aerial vehicle 1500 may analyze a pixel value captured by the optical equipment 1510 of the unmanned aerial vehicle 1500 with respect to two points 1550 and 1552 where there is no object on the earth's surface on the image plane 1520. Herein, the points 1550 and 1552 may be points of the earth's surface corresponding to way points included in a route of the unmanned aerial vehicle 1500.

The unmanned aerial vehicle 1500 may verify accuracy of a measurement value of a radio altitude sensor, measured above the point 1550 by the unmanned aerial vehicle 1500, using a resolution height obtained through an analysis of resolution for an image in which the point 1550 of the earth's surface is captured above a way point before the point 1550. In this case, the unmanned aerial vehicle 1500 may measure a flight altitude using the radio altitude sensor loaded into the unmanned aerial vehicle 1500 (see reference numeral 1554).

The point 1552 may be a point of the earth's surface for calibration of an image capture incident angle to verify a change in resolution of an object which exists on a flight direction in which the unmanned aerial vehicle 1500 flies. A resolution height for the point 1552 may be calculated using an incident angle direction 1556 of the camera 1510, considering a movement direction for the point 1552. The earth's surface of reference numeral 1552 may be captured when the unmanned aerial vehicle 1500 is located above the point 1550. Thus, the unmanned aerial vehicle 1500 may verify a resolution size 1530 of an image for the point 1552. This process may be performed every wave point while the unmanned aerial vehicle 1500 performs autonomous flight along way points.

In other words, the unmanned aerial vehicle 1500 may measure a flight altitude from a specific point corresponding to a way point where it is currently located using the radio altitude sensor for each way point and may measure a resolution height from a specific point corresponding to a subsequent way point to which the unmanned aerial vehicle 1500 will move, thus comparing the measured resolution height with a value measured by the radio altitude sensor on the subsequent way point. If the value measured by the radio altitude sensor is different from the resolution height, the unmanned aerial vehicle 1500 may keep a flight altitude of the unmanned aerial vehicle 1500 constant on the subsequent way point by changing the value measured by the radio altitude sensor.

Referring to FIG. 15B, a point 1562 may be a point of the earth's surface for verifying accuracy of a value measured by the radio altitude sensor. The accuracy verification may be continuously performed. In FIG. 15B, as there is a ground object 1560 on a route of the unmanned aerial vehicle 1500, resolution of an image capturing the point 1552 in FIG. 15A may be changed from resolution of an image capturing the point 1564 of FIG. 15B. The unmanned aerial vehicle 1500 may analyze the change and may control to maintain a set flight altitude in consideration of a height of the ground object 1560. In other words, the resolution size 1530 of the image of FIG. 15A and an image size 1566 of an image of FIG. 15B may show a different change in resolution based on whether there is the ground object 1560.

In other words, as a distance between the camera 1510 and the point 1564 in FIG. 15B is closer than a distance between the camera 1510 and the point 1552 in FIG. 15A because there is the ground object 1560, resolution for the point 1564 may be different from resolution for the point 1552. As such, according to an embodiment, an altitude of the unmanned aerial vehicle 1500 and a height of the ground object 1560 may be estimated using this resolution difference, and a flight altitude of the unmanned aerial vehicle 1500 may be used through the altitude of the unmanned aerial vehicle 1500 and the height of the ground object 1560.

Thus, a resolution height (HR) and correction of the resolution height (HR) may be represented as Equation 1 below.

Height by radio altitude sensor (HF)−height by analysis of point cloud (HO)=resolution height (HR)　　[Equation 1]

Verification of a sensor and scanning data through triangulation analysis=correction of resolution height (HR)

Meanwhile, in a method for measuring a distance by an analysis of a change in image, optical mark recognition (OMR) targets may be prepared, and the targets may be located at a constant interval (e.g., 0.5 m). A distance may be measured using the result of analyzing a correction between a distance, between a camera and an object, and resolution.

As such, a conventional image analysis and distance measurement method of analyzing a change in an image of an object and measuring a distance may be applied to altitude measurement to analyze a change in image resolution and extract an altitude Z value of an image.

A verification unit 740 of the system for establishing a route of an unmanned aerial vehicle of FIG. 7 may correct a value measured by the radio altitude sensor through route verification from an extracted altitude value.

If extracting an altitude Z value from an object (obstacle) which exists on a route and substituting the result into a route coordinate of the unmanned aerial vehicle at a constant interval, the verification unit 740 may recognize a resolution height HR of an image corresponding to a coordinate which is in contact with the object (obstacle) if the unmanned aerial vehicle reaches a corresponding route coordinate and may correct a value measured by the radio altitude sensor which is in use.

As shown in FIG. 14D, in an embodiment, extracted altitude (Z) values may be located at a constant interval on a corresponding route coordinate.

FIGS. 16 to 19 are drawings illustrating a flight control and ground control process through image recognition and processing of an unmanned aerial vehicle according to an embodiment.

Figure 16:
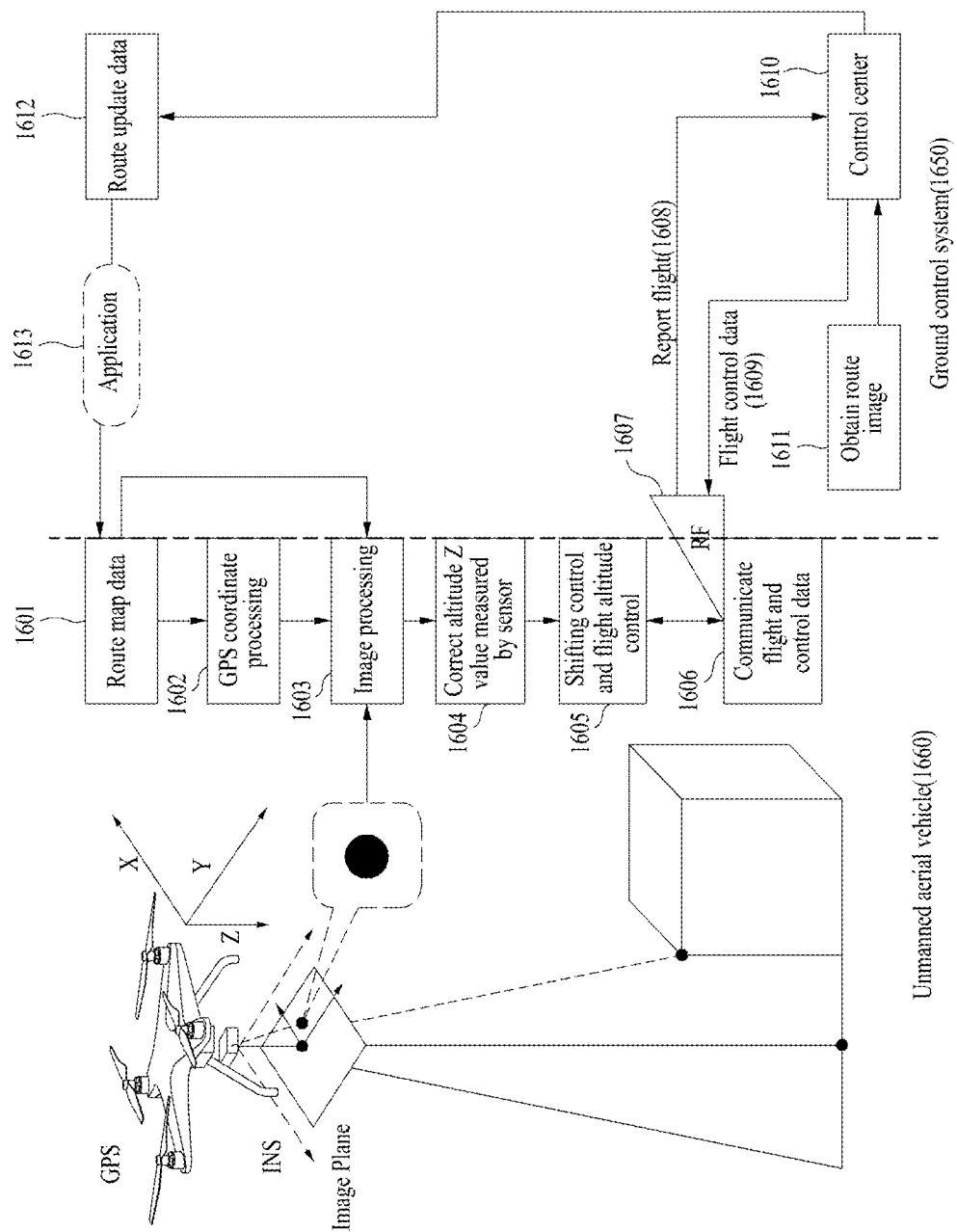
FIGS. 16, 17, 18, and 19 are drawings illustrating a flight control and ground control process through image recognition and processing of an unmanned aerial vehicle according to an embodiment.

Referring to FIG. 16, a method of identifying and processing an altitude Z value of an image arranged per way point on a route coordinate at the unmanned aerial vehicle should have vulnerabilities, such as a delay of a processing time and battery consumption, based on a characteristic of a data link with an image processing device. Thus, the unmanned aerial vehicle may support an offline image processing scheme to minimize a risk to a communication and fuselage infrastructure environment to ensure safety of autonomous flight.

In operation 1602, an unmanned aerial vehicle 1660 may match route map data 1601 previously stored in its fuselage with a GPS coordinate. In operation 1603, the unmanned aerial vehicle 1660 may process an altitude Z value of an image from the route map data 1601. In operation 1604, the unmanned aerial vehicle 1660 may correct an altitude Z value measured by its radio altitude sensor.

If a GPS signal is not received, the unmanned aerial vehicle 1660 may perform image processing (operation 1603) per way point while flying using the route map data 1601 previously stored by inertial navigation without GPS coordinate processing (operation 1602). Also, if a GPS signal is not received, the unmanned aerial vehicle 1660 may further include a communication means to ascertain its location through communication with base stations around the unmanned aerial vehicle 1660.

If the unmanned aerial vehicle 1660 does not perform first flight or if there is a resolution value of a ground object which exists per way point, according to an embodiment, a resolution value of a ground object, previously obtained for each way point, may be included in the previously stored route map data 1601. Thus, the unmanned aerial vehicle 1660 may compare a resolution value of a ground object, stored for each way point, with an altitude value measured and maintained by a radio altitude sensor while performing autonomous flight and may correct or use a value measured by the radio altitude sensor to observe a flight height of a previously defined layer. The unmanned aerial vehicle 1660 may store a resolution value of a ground object, obtained for each way point, every new flight.

Also, in another embodiment, the unmanned aerial vehicle 1660 may correct a value measured by the radio altitude sensor and may maintain a flight altitude of a layer using a resolution value previously obtained for a ground before autonomous flight and an average value of resolution values of the ground object, obtained during autonomous flight.

If the unmanned aerial vehicle 1660 performs first flight and does not obtain a resolution value of a ground object which exists per way point, in operation 1602, it may match the route map data 1601 with a GPS coordinate. While maintaining a flight altitude previously input via the radio altitude sensor and flying, the unmanned aerial vehicle 1660 may obtain and store a resolution value of a ground object for each way point.

In operation 1605, the unmanned aerial vehicle 1660 may perform shifting control and flight altitude control to maintain a flight altitude corresponding to a height of a layer by maintaining flight altitude restriction and vertical separation of a route by the layer using the corrected altitude (Z) value. In operation 1608, the unmanned aerial vehicle 1660 may report flight by transmitting flight information and the like generated while performing operations 1601 to 1605 to a control system 1650 via a wireless transceiver 1607. The control system 1650 may refer to a ground control system.

Also, if the unmanned aerial vehicle 1660 receives route control information 1609 from the ground control system 1650 via the wireless transceiver 1607 in operation 1606, in operation 1605, it may perform shifting control and flight altitude control to perform flight according to the received route control information (control data). According to an embodiment, the data processed in operations 1601 to 1605 may be recorded in an FDR of the unmanned aerial vehicle 1660 whenever it arrives at a corresponding coordinate point on a route.

When reporting flight in operation 1608, the unmanned aerial vehicle 1660 may transmit flight information such as a speed, an altitude, and a movement direction to a control center 1610 of the ground control system 1650 in the form of a message. The ground control system 1650 may transmit route control data 1609 for controlling the unmanned aerial vehicle 1660 to the unmanned aerial vehicle 1660 based on the received flight information data and situations. The flight information data and the route control data 1609 may be transmitted over a wireless communication network and may be transmitted over a mobile communication network such as long term evolution (LTE).

Also, in operation 1611, the control center 1610 of the ground control system 1650 may obtain a route image captured by the unmanned aerial vehicle 1660. Thus, the control center 1610 may obtain an image for analyzing height information of a ground object obtained while the unmanned aerial vehicle 1660 flies along a set route, through the obtained route image. If the obtained image is analyzed, the control center 1610 may update information of a route corresponding to the obtained route image using the analyzed information.

Thus, if route update data 1612 is generated through the obtained route image, in operation 1613, the control center 1610 may apply the route update data 1612 to the unmanned aerial vehicle 1660 online or offline. Also, in an embodiment, the applying (operation 1613) may be performed during reference numerals 1901 to 1903 shown in FIG. 19 and may be performed in an online or offline manner.

The obtaining of the route image in operation 1611 may be performed in a wireless or wired manner. A method of obtaining a route image in the wireless manner may be performed in real time via a wireless communication network, a mobile communication network, or a satellite communication network. In a method of obtaining a route image in the wired manner, after the unmanned aerial vehicle 1660 lands, an operator may directly obtain a route image in the unmanned aerial vehicle 1660 from a storage of the unmanned aerial vehicle 1660.

Also, the ground control system 1650 may obtain route images in both the wireless and wired manners. In this case, the ground control system 1650 may use an average value of the route image obtained in the wireless manner and the route image obtained in the wired manner as last route image information.

In addition, the control center 1610 of the ground control system 1650 may determine a layer changeable zone for inter-layer flight of the unmanned aerial vehicle 1660 and may transmit route data, in which the determined layer changeable zone is reflected, to an operation system or the unmanned aerial vehicle 1660. In this case, if a layer change request message is received from the unmanned aerial vehicle 1660, the control center 1610 may control other aerial vehicles which exist in a layer changeable zone specified such that the unmanned aerial vehicle 1660 flies to change a layer and may control the unmanned aerial vehicle 1660 not to collide with the other aerial vehicles until the unmanned aerial vehicle 1660 is located above a layer (an arrival layer) to which the unmanned aerial vehicle 1660 will move.

For example, there may be a situation where the unmanned aerial vehicle 1660 will move to layer C based on a previously programmed command or remote control while the unmanned aerial vehicle 1660 flies above way points specified on layer A. Herein, for convenience of description, layer A may be referred to as a departure layer, and layer C may be referred to as an arrival layer. If there is layer B between layer A and layer C, layer B may be referred to as a stop layer.

According to an embodiment, if the unmanned aerial vehicle 1660 will move from layer A to layer C, the control center 1610 may continuously control the unmanned aerial vehicle 1660 and other aerial vehicles located above a layer changeable zone at a layer changeable time of the unmanned aerial vehicle 1660 to prevent the unmanned aerial vehicle 1660 from colliding with the other aerial vehicles during the layer movement of the unmanned aerial vehicle 1660.

If the unmanned aerial vehicle 1660 will move from layer A to layer C, it may transmit a layer change request message to the control center 1610. The control center 1610 may complete identification of the unmanned aerial vehicle 1660 which transmits the layer change request message, may verify a layer changeable zone which may be used for inter-layer movement by the unmanned aerial vehicle 1660, and may transmit an acknowledge message according to the layer changeable zone to the unmanned aerial vehicle 1660. In this case, the control center 1660 may transmit layer movement information, including at least one of layer changeable zone information, a layer changeable time, layer change entry point information, and layer change entry angle information, to the unmanned aerial vehicle 1660 in consideration of a congestion level of the layer changeable zone. After the unmanned aerial vehicle 1660 which receives the layer movement information moves from layer A to layer B based on the information included in the layer movement information, it may move to layer C based on layer movement information received from the control center 1660 while it is located above layer B. Of course, the unmanned aerial vehicle 1660 may perform flight for layer movement from layer A to layer C using only layer movement information received while it is located above layer A.

According to another embodiment, the unmanned aerial vehicle 1660 may perform flight for inter-layer movement without control of the control center 1610. According to another embodiment, if it is necessary for flight for inter-layer movement, the unmanned aerial vehicle 1660 may fly between the layers based on previously stored layer changeable zone information. In this case, the unmanned aerial vehicle 1660 may perform autonomous flight while preventing collision using sensors included in the unmanned aerial vehicle 1660, before it enters a layer changeable zone and until it reaches an arrival layer after entering the layer changeable zone.

Figure 17:
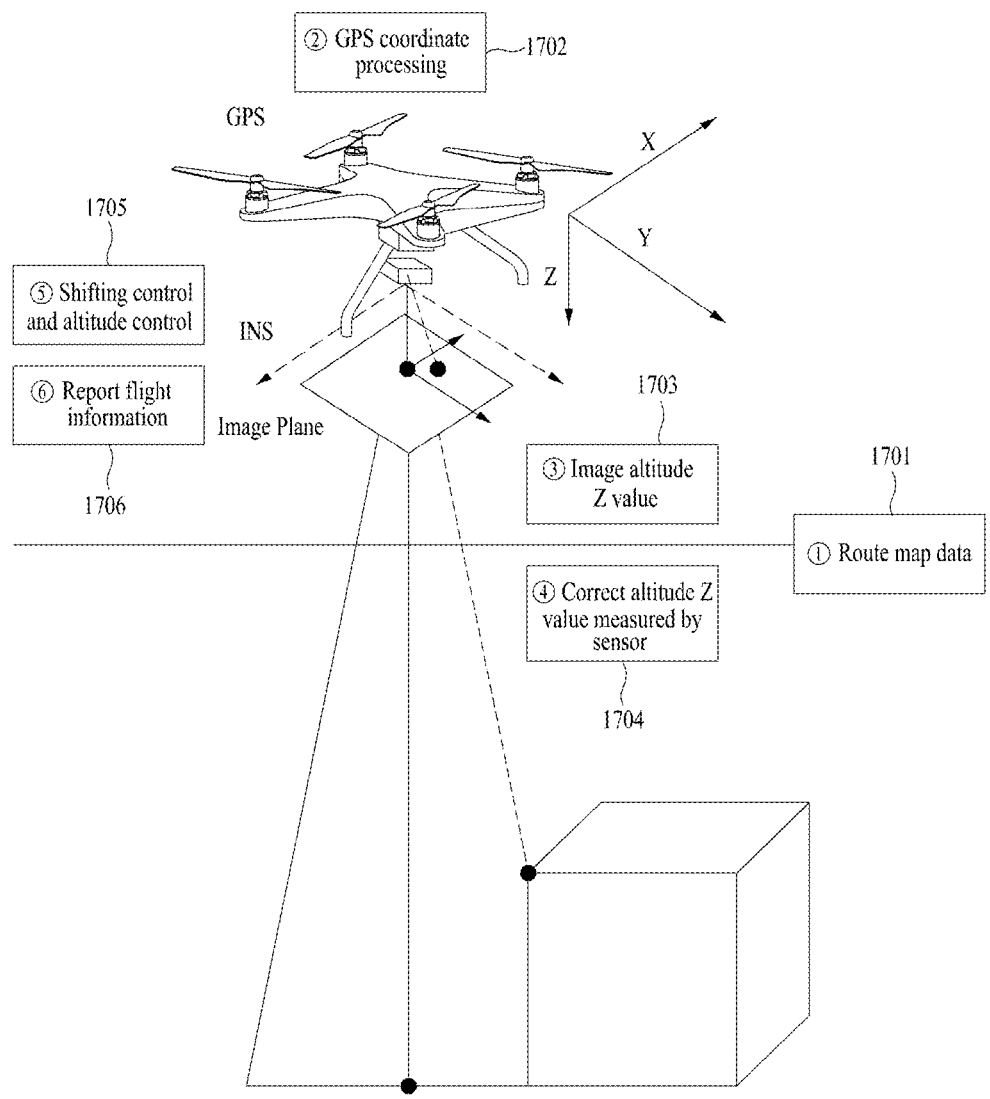

FIG. 17 illustrates an example of a method of recognizing an object (obstacle) when an unmanned aerial vehicle reaches a specific coordinate and correcting a value measured by a sensor.

Reaching a specific coordinate of a route, in operation 1702, the unmanned aerial vehicle may match route map data 1701 previously stored in its fuselage with a GPS coordinate. In operation 1703, the unmanned aerial vehicle may process an altitude Z value of an image from the route map data 1701. In operation 1704, the unmanned aerial vehicle may correct an altitude Z value measured by a sensor. In operation 1705, the corrected altitude Z value may be used for shifting control and altitude control of the unmanned aerial vehicle. The unmanned aerial vehicle may maintain flight altitude restriction and vertical separation of a route by a layer through the correction altitude Z value.

In operation 1706, the unmanned aerial vehicle may store flight information collected during flight in a device such as an FDR and may report the stored flight information to a control system or a system for establishing a flight route via a communication means (not shown).

Figure 18:
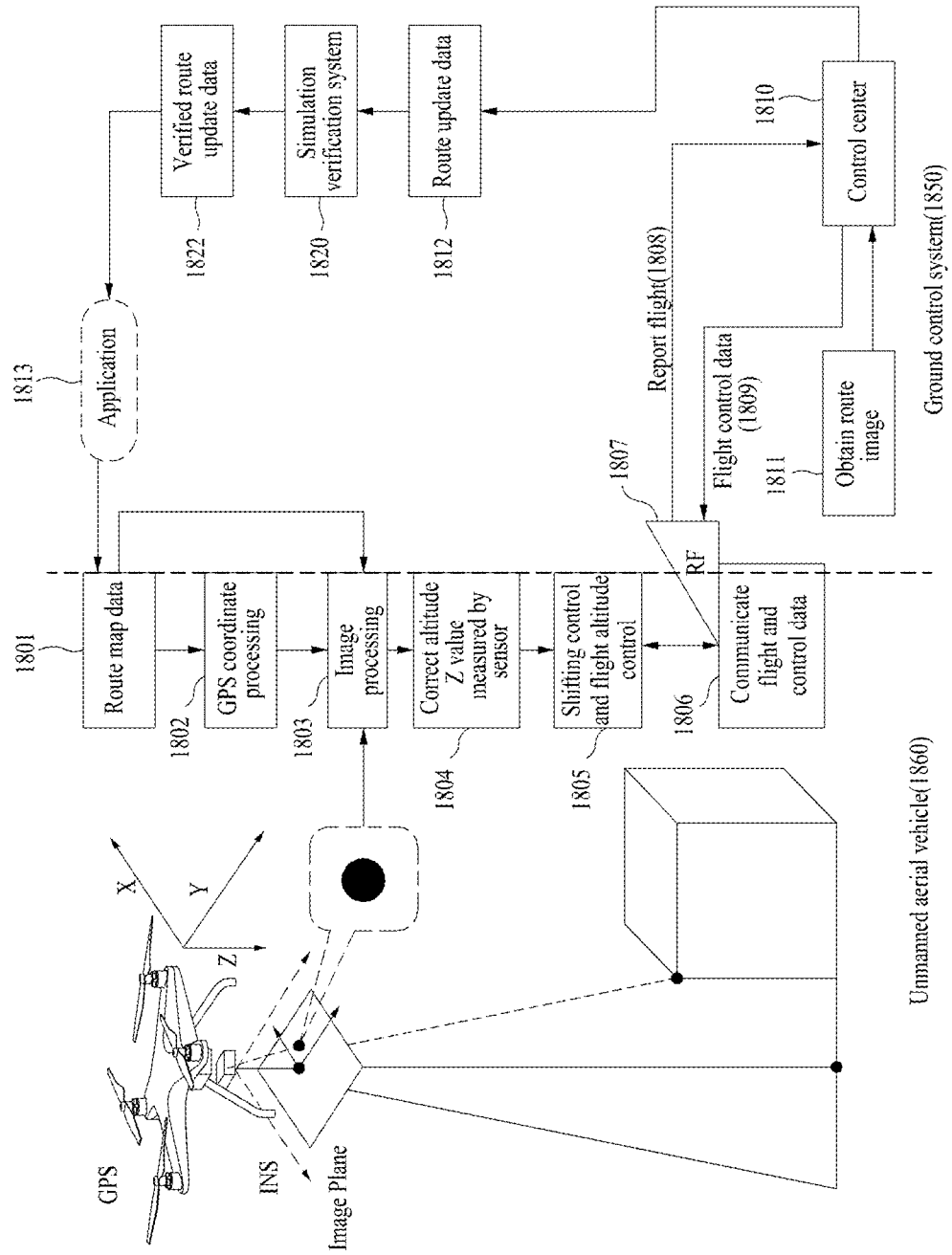
Figure 19:
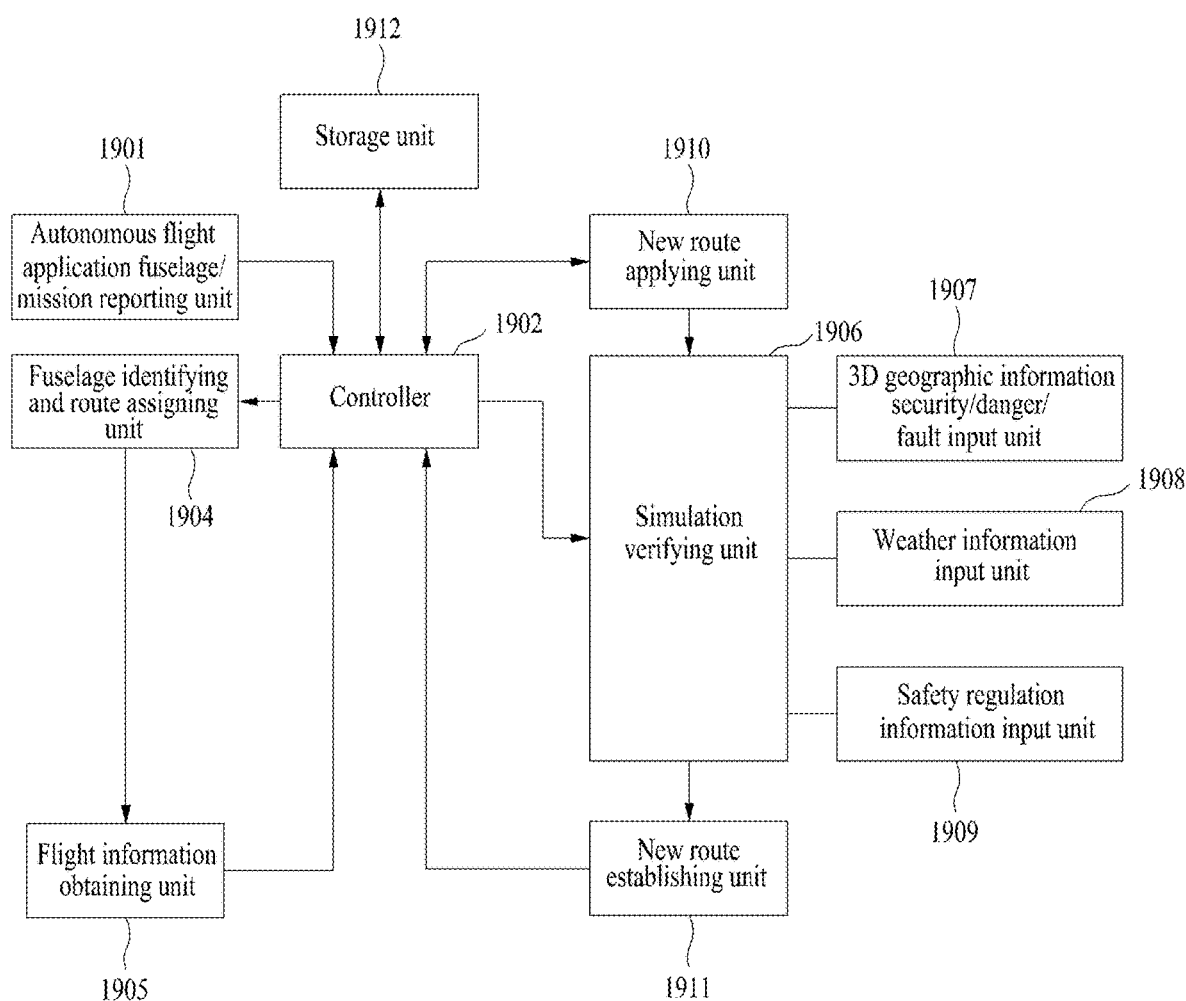
Figure 20:
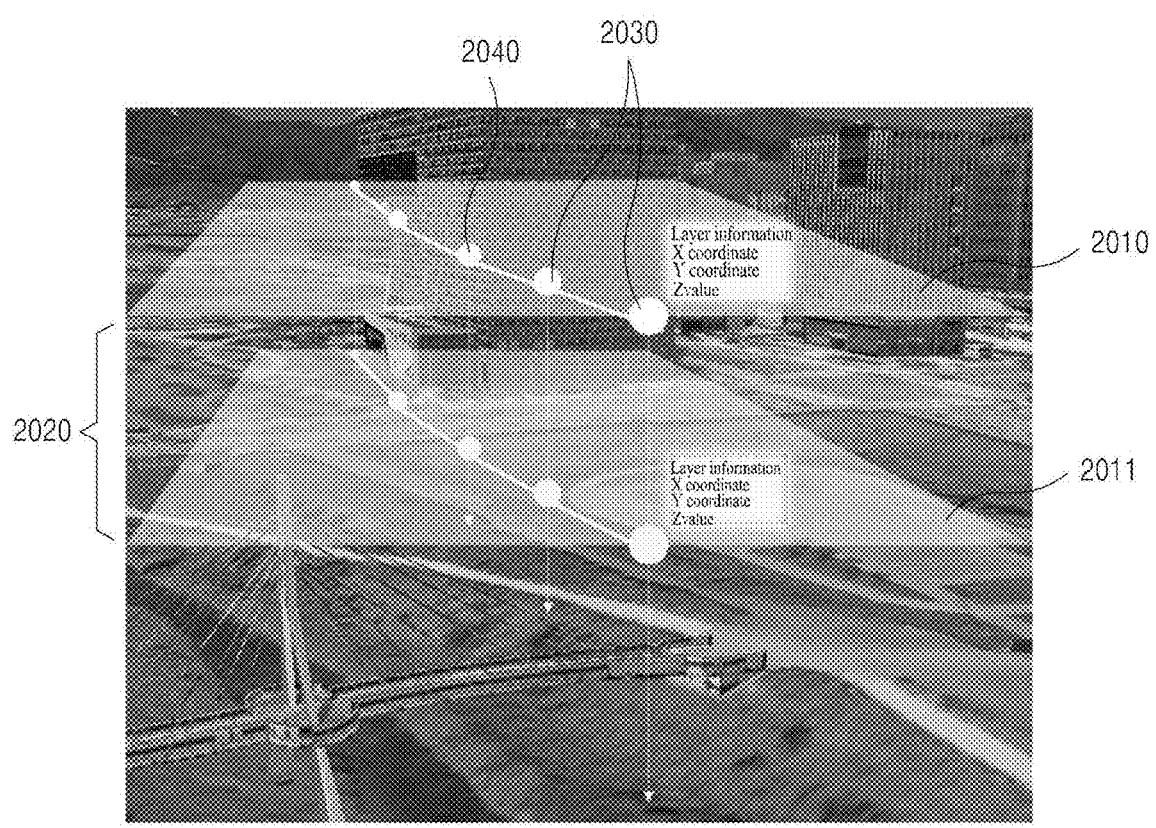
FIG. 20 is a drawing illustrating a simulation of an established route according to an embodiment.

FIGS. 18 to 20 illustrate an example of a system for controlling a route and generating and verifying the route and a processor for controlling a route and generating and verifying the route. Since reference numerals 1801, 1802, 1803, 1804, 1805, 1806, 1807, 1810, 1811, 1812, and 1813 shown in FIG. 18 are the same as reference numerals 1601, 1602, 1603, 1604, 1605, 1606, 1607, 1610, 1611, 1612 and 1613 shown in FIG. 16, a description for reference numerals 1801, 1802, 1803, 1804, 1805, 1806, 1807, 1810, 1811 and will be omitted.

Referring to FIG. 18, compared with FIG. 16, a simulation verification system 1820 for verifying a simulation for route data 1812 updated by a control center 1810 may be further included in a ground control system 1850. Thus, the ground control system 1850 may increase stability by performing simulation verification in advance before applying the route update data 1812 to an unmanned aerial vehicle 1860 and applying the verified route update data 1822 to a new route for the unmanned aerial vehicle 1860.

The unmanned aerial vehicle 1860 may repeatedly collect surface image data through an autonomous flight mission to verify a route and maintain the latest data. In operations 1803 and 1805, the unmanned aerial vehicle 1860 may perform shifting control and flight altitude control through an analysis of a change in image or resolution of the collected surface image data. The data processed while operations 1801 to 1805 are performed may be transmitted to the ground control system 1850. Thus, the control center 1810 may perform route control and ground control.

Also, the ground control system 1850 may verify the generated route update data 1812 using the simulation verification system 1820. In operation 1813, the ground control system 1850 may apply the verified route update data 1822 to route map data 1801 in an online or offline manner.

FIG. 19 is a block diagram illustrating a control device for controlling a route for an unmanned aerial vehicle and generating a route of the unmanned aerial vehicle according to another embodiment.

First of all, if a company which operates the unmanned aerial vehicle applied for autonomous flight of the unmanned aerial vehicle, an autonomous flight application fuselage/mission reporting unit 1901 may transmit an autonomous flight fuselage and a purpose (mission) of autonomous flight the company applies for, to a controller 1902. For example, the company may be logistics companies such as Amazon, DHL, FEDEX, and UPS, private security companies, oil companies for managing a large scale of oil pipelines, railway operation companies for monitoring whether a massive railroad is abnormal, and institutions, such as prison, the military, police stations, and fire stations, for promoting public safety.

The controller 1902 may store specifications of the unmanned aerial vehicle and identification information about a basic task in advance in a storage unit 1912. The controller 1902 may register an unmanned aerial vehicle obtained from the autonomous flight application fuselage/mission reporting unit 1901 in the storage unit 1912 and may store identification information about specifications of the unmanned aerial vehicle and a basic task. The controller 1902 may analyze information reported via the autonomous flight application fuselage/mission reporting unit 1901 by the company which operates the unmanned aerial vehicle, may identify the unmanned aerial vehicle, and may verify whether the identified unmanned aerial vehicle is an aerial vehicle suitable for the reported mission. If the identified unmanned aerial vehicle is the aerial vehicle suitable for the reported mission as a result of the verification, the controller 1902 may assign a layer and a route corresponding to a mission of the unmanned aerial vehicle via a fuselage identifying and route assigning unit 1904.

To classify unmanned aerial vehicles owned by the operation companies into a constant standard according to their weights and outputs may be preferable for efficiency of operation. Thus, the controller 1902 may easily establish an autonomous flight map (route) for autonomous flight.

For example, the storage unit 1912 may store standards for classifying unmanned aerial vehicles which are applied for autonomous flight into constant standards according to a weight, a mission purpose, a flyable time, or a mountable weight of each of the unmanned aerial vehicles. If it is requested to generate a new route from a new route applying unit 1910, if there is a route of an unmanned aerial vehicle, corresponding to specifications and missions of the unmanned aerial vehicle to fly to the requested new route, among route maps for autonomous flight stored in the storage unit 1912, the controller 1902 may allow a simulation verifying unit 1906 to perform simulation verification. The controller 1902 may generate and provide similar routes to unmanned aerial vehicles included in constant standards. Of course, the controller 1902 may set a route in a different way with respect to a flight time, a flight distance, an altitude, and the like such that unmanned aerial vehicles do not collide with each other during flight and may continuously monitor whether the unmanned aerial vehicle maintains the route.

If assignment of a layer and a route to the unmanned aerial vehicle is completed by the fuselage identifying and route assigning unit 1904, the fuselage identifying and route assigning unit 1904 may notify a flight information obtaining unit 1905 that the assignment is completed. The company which operates the unmanned aerial vehicle may control the unmanned aerial vehicle to perform autonomous flight above the assigned layer and route, may record flight information, and may transmit the flight information to the flight information obtaining unit 1905.

The flight information obtaining unit 1905 may obtain flight information reported by the unmanned aerial vehicle and may transmit the obtained flight information to the controller 1902. The controller 1902 may check the obtained flight information and may determine whether the unmanned aerial vehicle does not depart from a previously assigned layer and route. If the unmanned aerial vehicle having the flight information obtained by the flight information obtaining unit 1905 departs from a layer and route, the controller 1902 may notify a company which operates the unmanned aerial vehicle or the unmanned aerial vehicle that the unmanned aerial vehicle departs from the predetermined layer and route to control the unmanned aerial vehicle to fly above the layer and route.

Meanwhile, if it is necessary for additionally performing simulation verification, the controller 1902 may transmit flight information obtained from the unmanned aerial vehicle by the flight information obtaining unit 1905 to the simulation verifying unit 1906.

The simulation verifying unit 1906 may verify a simulation of safety of a layer and route assigned to the unmanned aerial vehicle in consideration of the flight information and information input from each of a 3D geographic information security/danger/fault input unit 1907, a weather information input unit 1908, and a safety regulation information input unit 1909 and may transmit the verified result to the controller 1902.

Meanwhile, if a new route is applied for from the company which operates the unmanned aerial vehicle other than an old route, the new route applying unit 1910 may transmit the new route, which is applied for, to the simulation verifying unit 1906. The simulation verifying unit 1906 may determine whether the new route, which is applied for, is valid through information obtained from the 3D geographic information security/danger/fault input unit 1907, the weather information input unit 1908, and the safety regulation information input unit 1909.

If the new route is valid, the simulation verifying unit 1906 may request the new route establishing unit 1911 to establish the new route. If the new route is established by the request of the simulation verifying unit 1906, the new route establishing unit 1911 may transmit the new route and identification information of the unmanned aerial vehicle which applies for the new route to the controller 1902. Thus, although a request to perform autonomous flight for the unmanned aerial vehicle which applies for the new route is received, since the new route is previously verified, the controller 1902 may immediately permit flight for the unmanned aerial vehicle.

As shown in FIG. 19, when an autonomous flight mission is more repeated, reliability of a route is more increased. The new route may be generated and verified through a simulation.

In addition, a description will be given of a method for increasing location accuracy in an autonomous flight system of an unmanned aerial vehicle.

An infrastructure for enhancing location accuracy of the unmanned aerial vehicle may include a GPS satellite, a satellite communication module which may receive a satellite signal other than a GPS, a GPS receiver which mounts the satellite communication module, a communication module and system which broadcasts various satellite signals to a terrestrial station and a ground control system (GCS) of a manual aerial vehicle which is not identified by autonomous flight, and a system which processes and displays positioning correction reference (data) accumulated by machine learning through a time difference of arrival (TDOA)

scheme using a communication infrastructure (which is being moved from 4G to 5G) used in a civil service such as long term evolution (LTE) and a TDOA process and operation in which an altitude difference of a base station is reflected.

A method for improving autonomous flight location accuracy of an unmanned aerial vehicle according to an embodiment may be applied to receive GPS and global navigation satellite system (GNSS) information, broadcast a message, apply a TDOA scheme using an LTE ground base station (or a next generation mobile communication infrastructure), and use machine learning positioning correction reference (data).

FIG. 20 is a drawing illustrating a simulation of an established route according to an embodiment.

Referring to FIG. 20, a shape for a simulation of an established route and route verification may be shown and may include vertically separated layers 2010 and 2011, a route 2020, and a way point 2040, 2030 shaped as a symbol. In the shape for the simulation, a plurality of 2D layers are vertically separated on a 3D detailed map. The shape of the simulation may be shaped as a route corresponding to a corresponding separated interval and a symbol corresponding to a collected way point.

Herein, the 2D layer may include information such as an established altitude, a performable mission, and fuselage specifications. A symbol of a route (connected by way points) established on the layer may include an altitude Z value of an image with respect to a location coordinate and a layer for the corresponding coordinate. In this case, the altitude Z value of the image may refer to a value for correcting a value measured by a sensor which measures an altitude to maintain an established altitude of the layer while an unmanned aerial vehicle performs autonomous flight.

Figure 21:
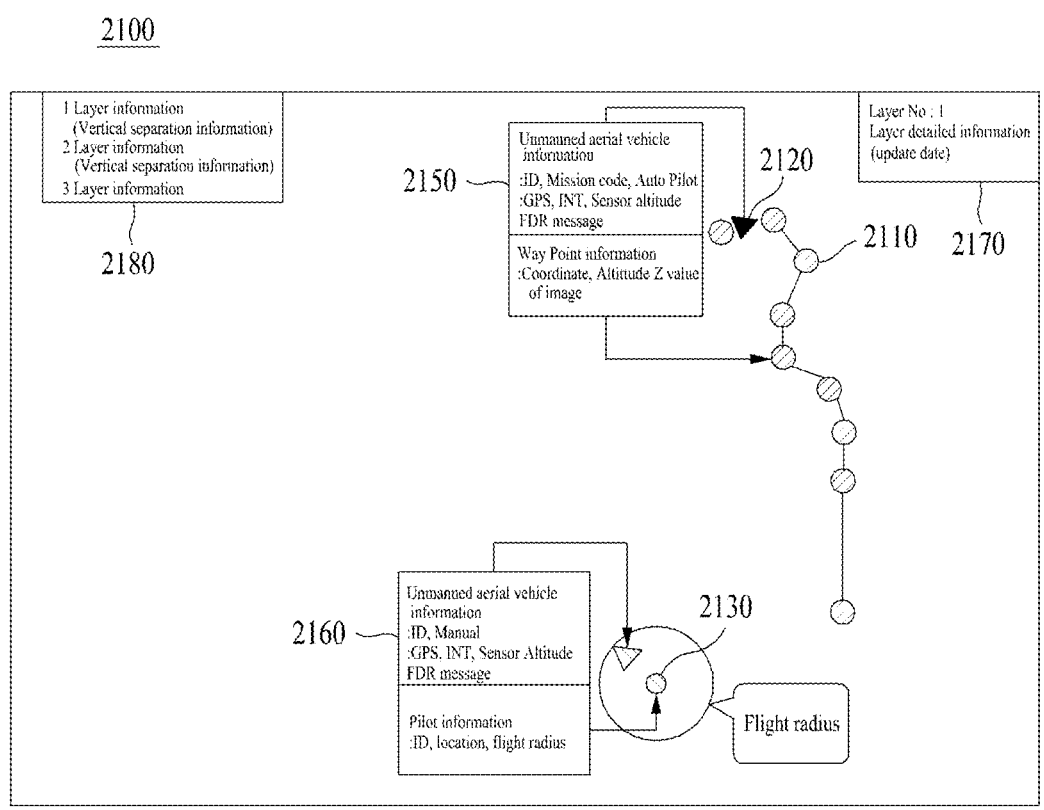
FIG. 21 is a drawing illustrating a fuselage recognition and route control shape according to an embodiment.

FIG. 21 is a drawing illustrating a fuselage recognition and route control shape according to an embodiment and illustrating displaying information of an unmanned aerial vehicle for manual flight and information of an unmanned aerial vehicle for autonomous flight on a control screen.

Referring to FIG. 21, a fuselage recognition and route control shape 2100 may include layer identification and vertical separation information, identification 2120 of the unmanned aerial vehicle for the autonomous flight, a flight path 2110 of the unmanned aerial vehicle for the autonomous flight, identification and radius information of the unmanned aerial vehicle for the manual flight, and the like.

If a location 2130 of a pilot is displayed on control information 2160 of the unmanned aerial vehicle for the manual flight, a flight radius determined by law may be displayed on the location 2130. An identifier (ID) of the unmanned aerial vehicle for the manual flight, information about whether an unmanned aerial vehicle is the unmanned aerial vehicle for the manual flight (e.g., display "manual" in case of the unmanned aerial vehicle for the manual flight), GPS, INS, altitude information, flight data, and the like may be display in real time.

An ID of a registered aerial vehicle, a business code applying for route assignment, information about whether flight is autonomous flight, GPS, INS, and sensor altitude information, flight data, and the like may be displayed on control information 2150 of the unmanned aerial vehicle for the autonomous flight.

Also, each way point and route information of the unmanned aerial vehicle for the autonomous flight may be displayed as a coordinate and an image resolution value for each way point.

Layer information 2170 and 2180 of a corresponding screen may be displayed on the fuselage recognition and route control shape 2100. A layer may be configured in various manners through vertical separation based on specifications of a fuselage and a performance mission at a restricted altitude or less. For example, reference numeral 2170 may indicate information of a currently displayed layer on a screen, and reference numeral 2180 may denote a vertical separation interval with another layer on the screen.

The fuselage recognition and route control shape 2100 may show information for maintaining a vertical separation interval of a plurality of 2D layers on a 2D detained map and may be shaped as a route established relative to each layer and a symbol corresponding to a collected way point.

The fuselage recognition and route control shape 2100 may minimize a delay of an image processing time to reduce risk by a control and flight control delay and may show identification of a layer, identification and flight information of a fuselage which is assigned an autonomous flight route, and an altitude Z value of an image assigned to a way point with respect to an autonomous flight route, a way point, and each layer.

Meanwhile, a fuselage manually controlled by a pilot may be identified to ensure safety. A flight radius may be restricted, and autonomous flight route information may be shared.

An unmanned aerial vehicle during autonomous flight may recognize an altitude Z value of an image analyzed and assigned with respect to a layer above which it flies when it arrives at a way point by loading a map installed in its fuselage, may correct a value measured by a sensor, and may maintain an altitude established above the corresponding layer.

As a fuselage broadcasts flight record data including a sensor altitude and GPS and INS information via a message transmission module to verify this process, a route control center may receive a message, may analyze GPS and sensor altitude value and information about an altitude established above a layer, and may verify whether an unmanned aerial vehicle maintains vertical separation and flight altitude restriction during autonomous flight.

Herein, an example of a function of providing a map for supporting route control may be represented hereafter.

[Display Route Information]

Display a security zone

Display a danger zone

Display a no-fly zone

Display a height and area of a ground object extracted by scanning the earth's surface Display information about an altitude established for each layer Display a route established for each layer Display a way point on a route established for each layer Display an altitude Z value of an image assigned to a way point on a route established for each layer

[Show an Unmanned Aerial Vehicle for Autonomous Flight]

Show an identification code of the unmanned aerial vehicle for autonomous flight Show a mission code of the unmanned aerial vehicle for autonomous flight Show a route assigned to the unmanned aerial vehicle for autonomous flight Show a horizontal separation interval with respect to a route assigned to the unmanned aerial vehicle for autonomous flight Show a GPS location coordinate of the unmanned aerial vehicle for autonomous flight Show a sensor altitude value of the unmanned aerial vehicle for autonomous flight Show a fail-safe state of the unmanned aerial vehicle for autonomous flight

[Show an Unmanned Aerial Vehicle for Manual Flight by a Pilot]

Show identification code of the unmanned aerial vehicle for manual flight

Figure 26:
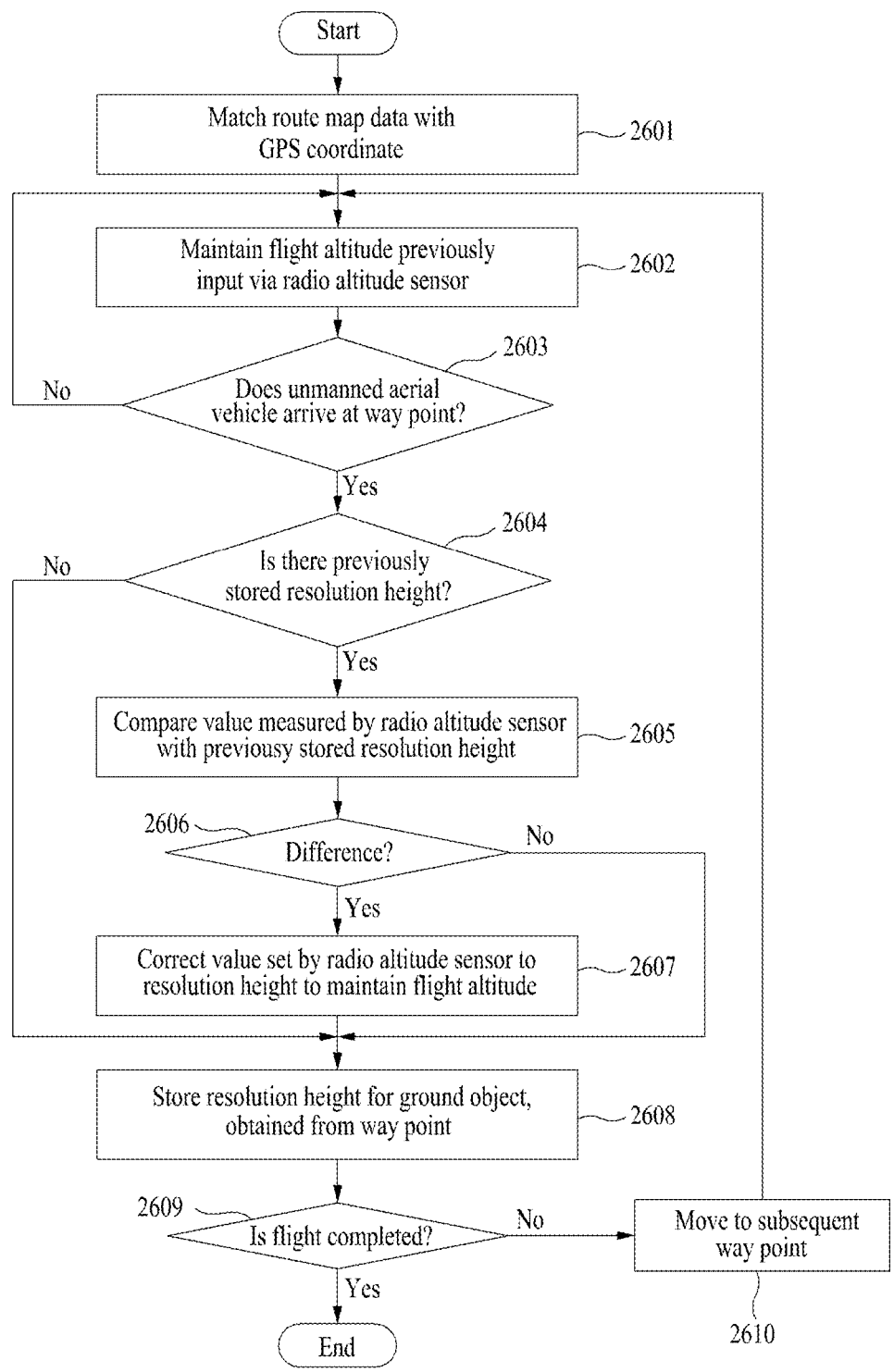
FIG. 26 is a flowchart illustrating an operation of an unmanned aerial vehicle according to an embodiment.

Show pilot identification code and a current location of the unmanned aerial vehicle for manual flight Show a flight range permitted with respect to the pilot of the unmanned aerial vehicle for manual flight Show a GPS location coordinate of the unmanned aerial vehicle for manual flight Show a sensor altitude value of the unmanned aerial vehicle for manual flight Show a fail-safe state of the unmanned aerial vehicle for manual flight FIG. 26 is a flowchart illustrating an operation of an unmanned aerial vehicle according to an embodiment.

Referring to FIG. 26, in operation 2601, the unmanned aerial vehicle may match route map data with a GPS coordinate. In operation 2602, while the unmanned aerial vehicle maintains a flight altitude previously input via its radio altitude sensor, it may fly while passing through way points set to a route according to the matched data. In operation 2603, the unmanned aerial vehicle may verify whether it arrives at a way point while continuing measuring its location during flight. If the unmanned aerial vehicle arrives at the way point as a result of the verification in operation 2603, in operation 2604, it may verify whether there is a previously stored height for a ground object which exists on the way point. In this case, there may be a resolution height previously stored for each way point in the route map data.

If there is the previously stored resolution height as a result of the verification in operation 2604, since there is a ground object, in operation 2605, the unmanned aerial vehicle may compare a value measured by a radio altitude sensor on a current way point with the previously stored resolution height. If there is a difference between the two resolution heights compared in operation 2606, in operation 2607, the unmanned aerial vehicle may determine that an error occurs in the value measured by the radio altitude sensor, may correct a value set by the radio altitude sensor to a resolution height to maintain a flight altitude specified above a layer, and may fly while maintaining a constant altitude according to the corrected value. Herein, the constant altitude may be a flight altitude defined for a layer assigned to the corresponding unmanned aerial vehicle. Also, the unmanned aerial vehicle may control its motor controller to maintain a constant flight altitude in which the value measured by the radio altitude sensor corresponds to the value set by the radio altitude sensor, thus performing shifting control and altitude control.

In contrast, if there is no previously stored resolution height in operation 2604 or if there is no error in operation 2606, in operation 2608, the unmanned aerial vehicle may store a resolution height of a ground object, obtained on a way point. In this case, similar to FIG. 25, if a ground object is added or changed using the obtained resolution height, the unmanned aerial vehicle may add a new way point.

Storing the resolution height, in operation 2609, the unmanned aerial vehicle may verify whether flight to the last way point is completed. If the flight is not completed, in operation 2610, the unmanned aerial vehicle may move to a subsequent way point.

Meanwhile, an embodiment is exemplified as the unmanned aerial vehicle compares the value measured by the radio altitude sensor with the previously stored resolution height and corrects the value measured by radio altitude sensor. However, embodiments are not limited thereto. For example, the unmanned aerial vehicle may compare a resolution height obtained on each way point with a resolution height previously stored for each way point and may determine whether an error occurs in the value measured by the radio altitude sensor using an average value calculated by the compared value. Of course, the unmanned aerial vehicle may correct the value measured by the radio altitude sensor based on the determined result and may maintain a previously defined constant altitude.

Also, the unmanned aerial vehicle may transmit flight information, including a flight speed, a location, and an altitude, to a control system or an operation system based on a predetermined condition. The predetermined condition may include a condition where a constant period arrives, a condition where the unmanned aerial vehicle arrives at a way point, or a condition where an emergency occurs.

Figure 27:
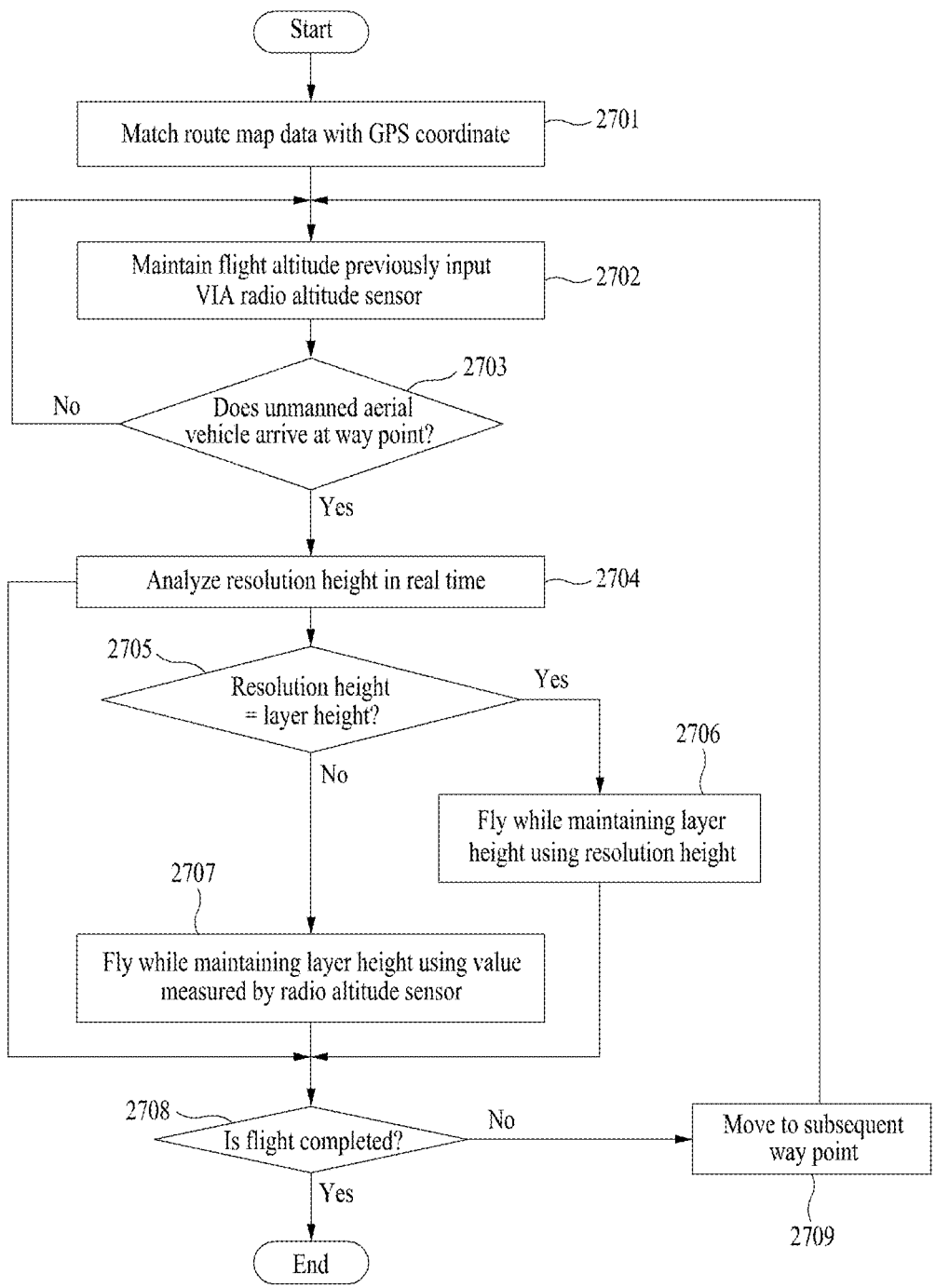
FIG. 27 is a flowchart illustrating an operation of an unmanned aerial vehicle according to another embodiment.

FIG. 27 is a flowchart illustrating an operation of an unmanned aerial vehicle according to another embodiment.

Contrary to FIG. 26, FIG. 27 illustrates that the unmanned aerial vehicle flies while maintaining a layer height using a resolution height obtained in real time whenever it arrives at a way point rather than a previously stored resolution height.

In operation 2701, the unmanned aerial vehicle may match route map data with a GPS coordinate. In operation 2702, while the unmanned aerial vehicle maintains a flight altitude previously input via its radio altitude sensor, it may fly while passing through way points set to a route according to the matched data. In operation 2703, the unmanned aerial vehicle may verify whether it arrives at a way point while continuing measuring its location during flight. If the unmanned aerial vehicle arrives at the way point as a result of the verification in operation 2703, in operation 2704, it may analyze a resolution height in real time with respect to the way point. In operation 2705, the unmanned aerial vehicle may compare a resolution height analyzed on a current way point with a height of a preset layer. If the analyzed resolution height is the same as the layer height as a result of the verification in operation 2705, in operation 2706, the unmanned aerial vehicle may perform autonomous flight while maintaining the layer height using the analyzed resolution height.

In contrast, if the analyzed resolution height is different from the layer height as a result of the verification in operation 2705, in operation 2707, the unmanned aerial vehicle may fly while maintaining a constant altitude using a value measured by a radio altitude sensor to maintain a flight altitude specified above a layer. Herein, the constant altitude may be a defined flight altitude above a layer assigned to the corresponding unmanned aerial vehicle.

Also, in operations 2706 and 2707, the unmanned aerial vehicle may control its flight controller to maintain the constant flight altitude, thus performing shifting control and altitude control. In operation 2708, the unmanned aerial vehicle may verify whether flight to the last way point is completed. If the flight is not completed, in operation 2709, the unmanned aerial vehicle may move to a subsequent way point.

Figure 28:
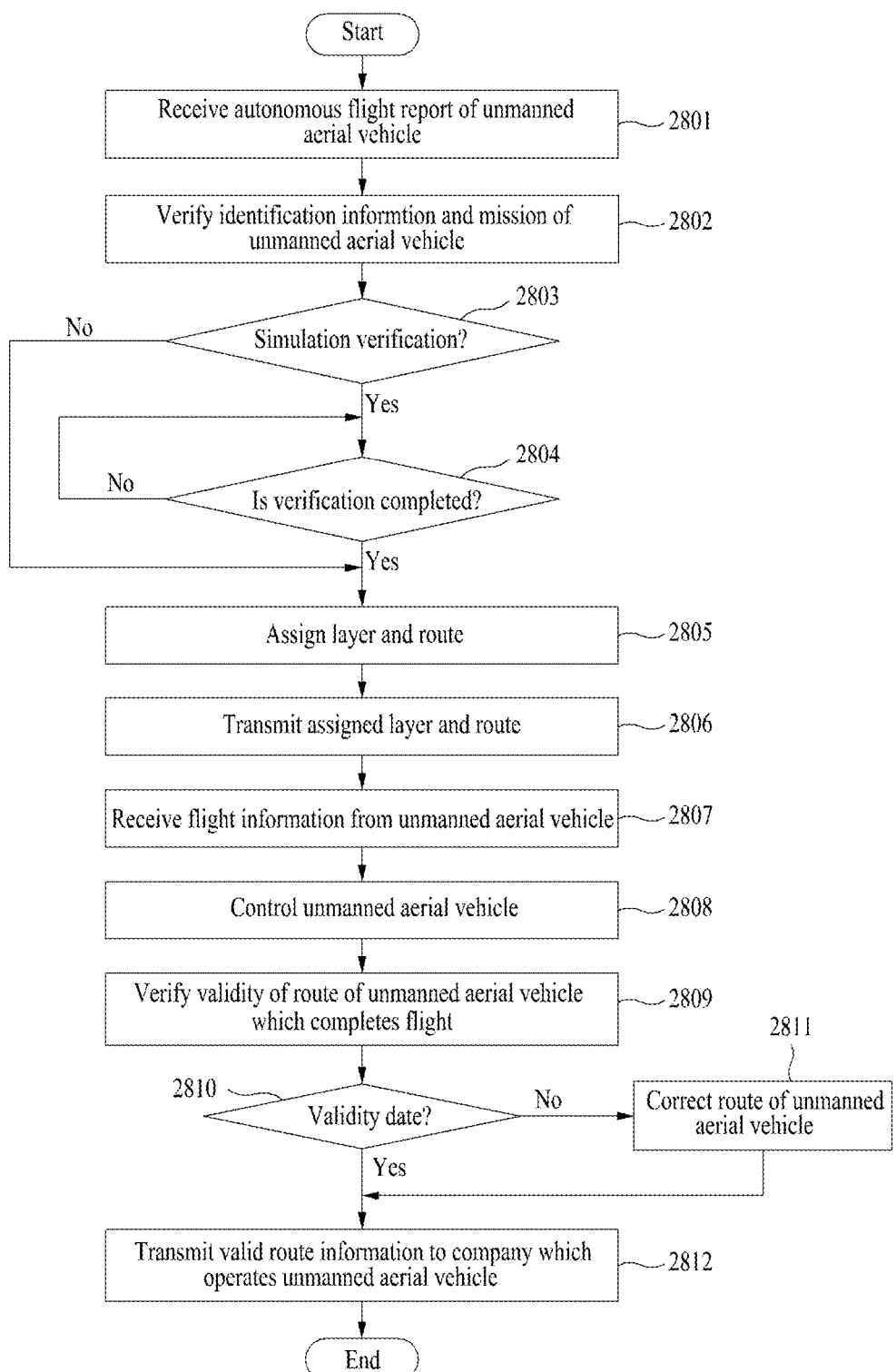
FIG. 28 is a flowchart illustrating an operation method of a route establishment system and a control system for autonomous flight of an unmanned aerial vehicle according to an embodiment.

FIG. 28 is a flowchart illustrating an operation method of a route establishment system and a control system for autonomous flight of an unmanned aerial vehicle according to an embodiment.

Referring to FIG. 28, the system for establishing the route may be included in a control system.

In operation 2801, the control system may receive an autonomous flight report of an unmanned aerial vehicle from a company which operates the unmanned aerial vehicle and a user of the unmanned aerial vehicle. In operation 2802, the control system may verify identification information and a mission of the unmanned aerial vehicle. In operation 2803, the control system may verify whether it is necessary for simulation verification for assigning a route of the unmanned aerial vehicle which is reported for autonomous flight. If it is necessary for the simulation verification, in operation 2804, the unmanned aerial vehicle may perform a simulation using information necessary for the autonomous flight of the unmanned aerial vehicle and may perform route verification.

In this case, if it is unnecessary for the simulation verification in operation 2803 or if the verification is completed in operation 2804, in operation 2805, the control system may assign a layer and route corresponding to specifications and a mission of the unmanned aerial vehicle. In operation 2806, the control system may transmit the assigned layer and route to the company which operates the unmanned aerial vehicle or the user of the unmanned aerial vehicle.

If the unmanned aerial vehicle which flies through the layer and route assigned from the control system performs unmanned flight, it may transmit flight information to the control system. Thus, in operation 2807, the control system may receive the flight information of the unmanned aerial vehicle. In operation 2808, the control system may control the flight of the unmanned aerial vehicle by continuously monitoring whether the unmanned aerial vehicle departs from the assigned layer and route or whether it is possible for the unmanned aerial vehicle to collide with another aerial vehicle.

If the flight of the unmanned aerial vehicle is completed, in operation 2809, the control system may verify the validity of the route of the unmanned aerial vehicle which completes flight. If the verified result is valid in operation 2810, in operation 2812, the control system may transmit valid route information to the company which operates the unmanned aerial vehicle of the user of the unmanned aerial vehicle. If the verified result is invalid, in operation 2811, the control system may correct a route of the unmanned aerial vehicle. In operation 2812, the control system may transmit the corrected route information to the company which operates the unmanned aerial vehicle.

Figure 29:
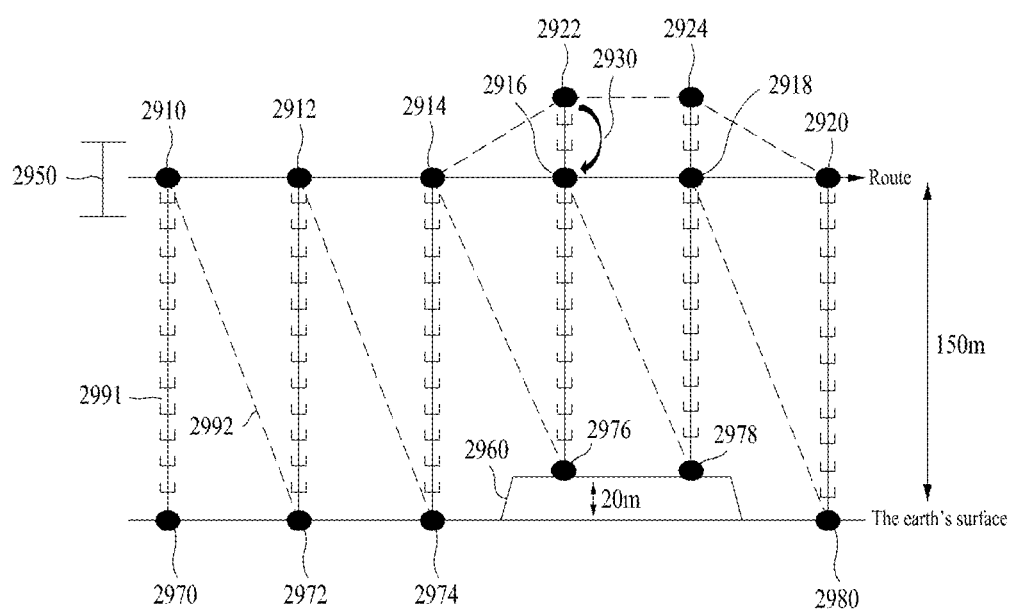
FIG. 29 is a drawing illustrating maintenance of a flight altitude within a layer range using a resolution height for a ground object if the ground object exists while an unmanned aerial vehicle flies along a predetermined route, according to an embodiment.

FIG. 29 is a drawing illustrating maintenance of a flight altitude within a layer range using a resolution height for a ground object 2960 if the ground object 2960 exists while an unmanned aerial vehicle flies along a predetermined route, according to an embodiment. In this case, it is assumed that a height of a layer is 150 meters. Thus, as a value set by a radio altitude sensor of the unmanned aerial vehicle is set to 150 meters, the unmanned aerial vehicle may fly such that a flight altitude is kept 150 meters from the earth's surface through a value measured by the radio altitude sensor.

First of all, according to an embodiment, the unmanned aerial vehicle may fly above a layer and route assigned to the unmanned aerial vehicle in a state where it keeps a flight altitude constant within a range which does not depart from a range 2950 of the layer from the earth's surface. Way points 2910 to 2920 may exist on a route above the unmanned aerial vehicle flies. The unmanned aerial vehicle may measure a flight aerial from points 2970, 2972, 2974, 2976, 2978, and 2980 using the radio aerial sensor for each way point.

The unmanned aerial vehicle may calculate a resolution height through a camera incident distance for the earth's surface or a ground object located from each way point to a subsequent way point. For example, if the unmanned aerial vehicle is locate above the way point 2910, the unmanned aerial vehicle may calculate a resolution height between the subsequent way point 2912 and the point 2972 by measuring a flight altitude 2991 from the point 2970 using the radio altitude sensor and measuring a camera incident distance for the point 2972. The unmanned aerial vehicle may perform this procedure for each way point.

If the unmanned aerial vehicle is located above the way point 2914, it may measure a flight altitude for the point 2974 using the radio altitude sensor and may calculate 130 meters which are a resolution height between the way point 2916 and the point 2976 through a camera incident distance for the point 2976 on the ground object 2960 which exists below the subsequent way point 2916. Thus, the unmanned aerial vehicle may control the flight altitude from the ground object 2960 to be 130 meters such that the flight altitude is not over a layer. This operation may be performed above the way point 2918 which exists above the ground object 2960. As such, in FIG. 29, since a height of the ground object 2960 is 20 meters, only if a flight altitude above the way points 2916 and 2918 which exist above the ground object 2960 has a height of 130 meters from the ground object 2960, the unmanned aerial vehicle may fail to be over the flight altitude of 150 meters.

Meanwhile, if the unmanned aerial vehicle maintains a flight altitude above a layer of the unmanned aerial vehicle using only the value set by the radio altitude sensor without considering a resolution height for the earth's surface or a ground object, the unmanned aerial vehicle may depart from a flight altitude of a layer and may collide with another aerial vehicle which flies above another vertically separated layer by determining points, where the value measured by the radio altitude sensor from the ground object 2960 is 150 meters, as way points 2922 and 2924.

However, the unmanned aerial vehicle according to an embodiment may fly without departing from a flight altitude above a layer by correcting the value set by the radio altitude sensor to the resolution height (130 meters) from the ground object 2960 although there is the ground object 2960.

Hereinafter, a description will be given of a system for controlling an unmanned aerial vehicle according to an embodiment.

Figure 50:
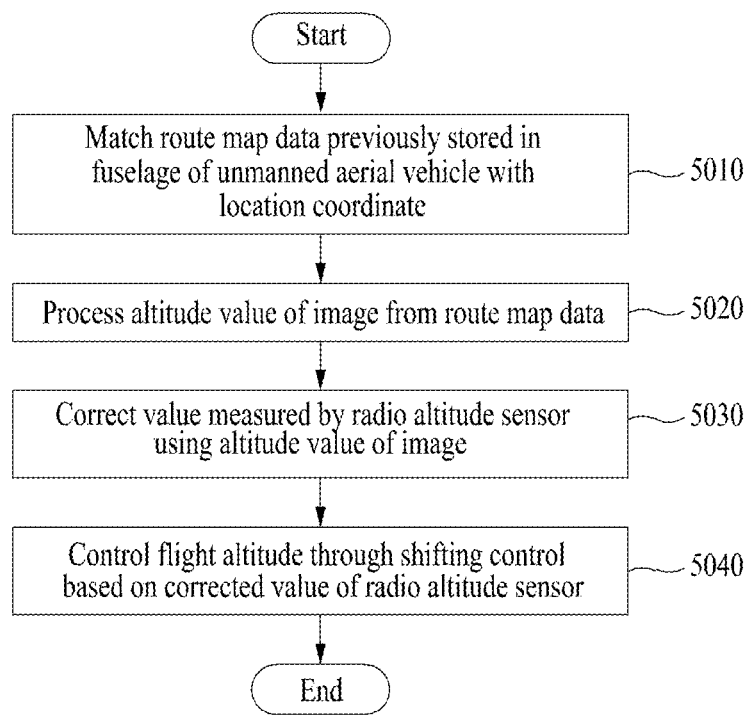
FIG. 50 is a flowchart illustrating a method for controlling an unmanned aerial vehicle according to an embodiment.

FIG. 50 is a flowchart illustrating a method for controlling an unmanned aerial vehicle according to an embodiment.

Referring to FIG. 50, the method for controlling the unmanned aerial vehicle may include operation 5010 of matching route map data previously stored in a fuselage of the unmanned aerial vehicle with a location coordinate, operation 5020 of processing an altitude value of an image from the route map data, operation 5030 of correcting a value measured by a radio altitude sensor using the altitude value of the image, and operation 5040 of controlling a flight altitude through shifting control based on the corrected value of the radio altitude sensor.

Herein, operation 5010 of matching the route map data with the location coordinate may be operation of matching a GPS coordinate of the unmanned aerial vehicle to route map data for flight of the unmanned aerial vehicle established on a layer. The layer may be for shaping a space which facilitates autonomous flight by identifying an object from surface scanning data.

The route map data may be for establishing an autonomous navigation map for flight of the unmanned aerial vehicle on a space by matching at least one of flight altitude restriction data, a detailed digital map, and route information for avoiding a military protection zone or a no-fly zone to the layer shaped on the space.

According to an embodiment, a method and system for controlling an unmanned aerial vehicle to facilitate safe autonomous flight of the unmanned aerial vehicle in an invisible area by matching route map data stored in the unmanned aerial vehicle with a location coordinate, processing an altitude value of an image, and correcting a value measured by a radio altitude sensor may be provided.

Hereinafter, a description will be given in detail of each operation of the method for controlling the unmanned aerial vehicle according to an embodiment.

Figure 51:
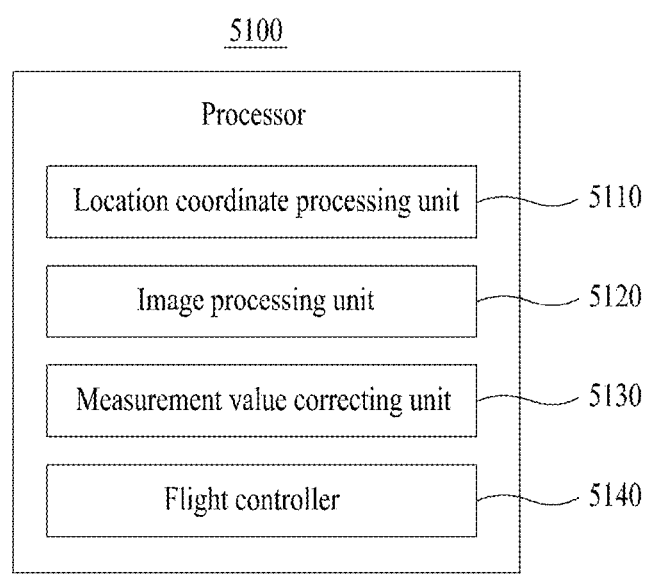
FIG. 51 is a block diagram illustrating a configuration of an unmanned aerial vehicle control system according to an embodiment.

FIG. 51 is a block diagram illustrating a configuration of an unmanned aerial vehicle control system according to an embodiment.

As shown in FIG. 51, a system 5100 for controlling an unmanned aerial vehicle according to an embodiment may include a location coordinate processing unit 5110, an image processing unit 5120, a measurement value correcting unit 5130, and a flight controller 5140. These components may be implemented to execute operations 5010 to 5040 included in a method of FIG. 50.

In operation 5010, the location coordinate processing unit 5110 may match route map data previously stored in a fuselage of the unmanned aerial vehicle with a location coordinate.

In detail, the location coordinate processing unit 5110 may match a GPS coordinate of the unmanned aerial vehicle to route map data for flight of the unmanned aerial vehicle established on a layer. Herein, the layer may be for shaping a space which facilitates autonomous flight by identifying an object from surface scanning data. The route map data may be for establishing an autonomous navigation map for flight of the unmanned aerial vehicle on a space by matching at least one of flight altitude restriction data, a detailed digital map, and route information for avoiding a military protection zone or a no-fly zone to the layer shaped on the space.

The location coordinate processing unit 5110 may identify an object from surface scanning data and may shape a space, which facilitates autonomous flight, as a layer.

Herein, the location coordinate processing unit 5110 may include a collection unit, an identification unit, an extraction unit, and a layer unit.

The collection unit may obtain a point cloud of an object scanned by a surface scanning device loaded into an aircraft which captures the earth's surface. For example, the collection unit may obtain the point cloud of the object onto which a LiDAR pulse is projected via a LiDAR device loaded into the aircraft which captures the earth's surface. The identification unit may analyze the point cloud collected by the collection unit to identify an object. The extraction unit may extract height values of specific points of the object identified by the identification unit using terrain altitude data.

The layer unit may shape an area and altitude, which facilities autonomous flight of the unmanned aerial vehicle, as a layer by connecting the height values of the specific values, extracted by the extraction unit.

Also, the location coordinate processing unit 5110 may verify spatial geographic information, may scan a safe path for flight, and may generate a flight path by reflecting the safe path, thus collecting surface image data for the flight path.

The location coordinate processing unit 5110 may set a flight altitude restriction value and may verify a value measured by a radio altitude sensor through an object which facilitates verification of a height of flight altitude restriction. Also, the location coordinate processing unit 5110 may verify calibration information of an image device and may verify flight information recorded in an FDR loaded into the unmanned aerial vehicle.

The image processing unit 5120 may process an altitude value of an image from route map data.

The image processing unit 5120 may analyze a change in resolution of an image according to a distance from an object and may extract an altitude value of an image on a route. The corrected value of the radio altitude sensor may be for maintaining flight altitude restriction and vertical separation of a route by a layer, through shifting control of the unmanned aerial vehicle.

In addition, the image processing unit 5120 may match at least one of coordinate, altitude, attitude, and time information from an FDR loaded into the unmanned aerial vehicle with the surface image data and may calculate an altitude value on a flight route through distortion correction of an image and an analysis of a change in image resolution with reference to calibration information of the imaging device.

The measurement value correcting unit 5130 may correct a value measured by the radio altitude sensor using the altitude value of the image. The measurement value correcting unit 5130 may extract an altitude value from an object which exists on a route and may substitute the altitude value into a route coordinate of the unmanned aerial vehicle at a constant interval. If the unmanned aerial vehicle arrives at the route coordinate, the measurement value correcting unit 5130 may recognize a resolution height of an image corresponding to a coordinate which is in contact with the object and may correct a value measured by the radio altitude sensor of the unmanned aerial vehicle based on the resolution height.

Also, the measurement value correcting unit 5130 may support an offline image processing scheme to minimize a risk to a communication and fuselage infrastructure environment upon autonomous flight.

The measurement value correcting unit 5130 may repeatedly collect surface image data through autonomous flight of the unmanned aerial vehicle and may reflect the collected surface image data in route control, ground control, and route map data through an analysis of a change in resolution, thus generating or verifying a new route through a simulation. For this purpose, a simulation verification system may be established.

The flight controller 5140 may control flight altitude through shifting control based on the corrected value of the radio altitude sensor.

Meanwhile, the system 5100 for controlling the unmanned aerial vehicle according to an embodiment may further include a route controller. The route controller may receive FDR data, including radio altitude sensor, GPS, and INS information, transmitted via a transmitter by the unmanned aerial vehicle and may analyze the GPS information, a value measured by the radio altitude sensor, and information about an altitude established above a layer, thus verifying whether the unmanned aerial vehicle maintains vertical separation and flight altitude restriction during autonomous flight.

Therefore, unmanned aerial vehicle control technologies which facilitate autonomous flight of an invisible area may be provided to overcome a limit of an operation in a visible range of a pilot to an area where it is difficult to keep an altitude value constant due to a ground object and the like. Also, a method and system for controlling an unmanned aerial vehicle to facilitate safe autonomous flight of the unmanned aerial vehicle in an invisible area by matching route map data stored in the unmanned aerial vehicle with a location coordinate, processing an altitude value of an image of a ground object, and correcting a value measured by the radio altitude sensor may be provided.

Hereinafter, a description will be given in detail of a system for controlling an unmanned aerial vehicle according to another aspect.

Figure 52:
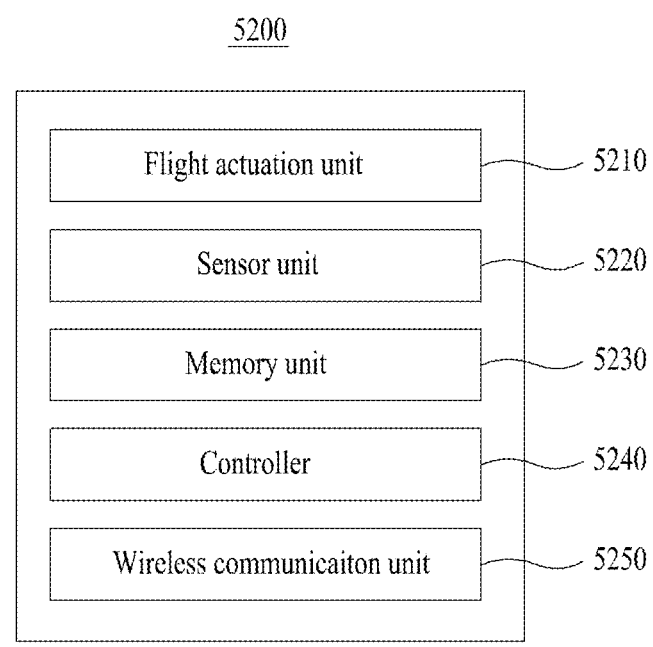
FIG. 52 is a block diagram illustrating a configuration of an unmanned aerial vehicle control system according to another embodiment.

FIG. 52 is a block diagram illustrating a configuration of a system for controlling an unmanned aerial vehicle according to another embodiment.

Referring to FIG. 52, a system 5200 for controlling the unmanned aerial vehicle may include a flight actuation unit 5210, a sensor unit 5220, a memory unit 5230, and a controller 5240. According to an embodiment, the system 5200 may further include a wireless communication unit 5250.

The flight actuation unit 5210 may generate a lift force and a flight force for flight of the unmanned aerial vehicle.

The sensor unit 5220 may measure a flight altitude of the unmanned aerial vehicle.

The memory unit 5230 may store route map data generated by a control center based on a mission of the unmanned aerial vehicle and program instructions for flight of the unmanned aerial vehicle.

The controller 5240 may control the flight actuation unit 5210 to fly on a route above a layer, defined in stored route map data and maintain a flight altitude defined above the layer using the result of comparing a resolution height corresponding to a way point on the route with a value measured by a radio altitude sensor of the sensor unit 5220, in which the flight altitude is measured.

Herein, the layer may be vertically and separately shaped on a 3D space to have a constant altitude value from the earth's surface on which the unmanned aerial vehicle may fly based on a mission. The route may be established above the layer and may include at least two or more way points.

If a resolution height for a way point is previously stored, the controller 5210 may compare a resolution height with a value measured by the radio altitude sensor. If there is a difference between the resolution height and the value measured by the radio altitude sensor as a result of the comparison, the controller 5210 may correct a value set by the radio altitude sensor to the resolution height and may control the flight actuation unit 5210 to maintain a flight altitude using the corrected value of the radio altitude sensor.

If a resolution height previously stored for a way point is not stored, the controller 5240 may maintain the value measured by the radio altitude sensor and may store a resolution value of a ground object located below the way point in the memory unit 5230.

When a fault occurs while the unmanned aerial vehicle performs its mission, the controller 5240 may control the flight actuation unit 5210 to move to a safe zone.

When an emergency occurs while the unmanned aerial vehicle performs the mission, the controller 5240 may control the flight actuation unit 5210 to be converted into a manual operation mode and perform flight by an operation of an operation system of the unmanned aerial vehicle.

If it is necessary for moving to another layer while the unmanned aerial vehicle performs autonomous flight above an initially assigned layer, the controller 5240 may control the flight actuation unit 5210 to move to a layer changeable zone based on layer movement information and fly to a layer to be changed in the layer changeable zone.

Herein, the layer movement information may be previously stored in the memory unit 5230 and may be received from a control system via the wireless communication unit 5250.

The wireless communication unit 5250 may communicate with the operation system of the unmanned aerial vehicle. Thus, if a flight fault occurs during flight, the controller 5240 may report the occurrence of the fault to the operation system of the unmanned aerial vehicle via the wireless communication unit 5250 or may transmit information capturing emergencies to the operation system of the unmanned aerial vehicle via the wireless communication unit 5250 when the emergencies occur while the unmanned aerial vehicle performs the mission.

Further, the wireless communication unit 5250 may transmit a layer change request message of the unmanned aerial vehicle to the control system and may receive layer movement information from the control system, through communication with a control system. Hereinafter, a description will be given in detail of the system for controlling the unmanned aerial vehicle using an embodiment.

Figure 30:
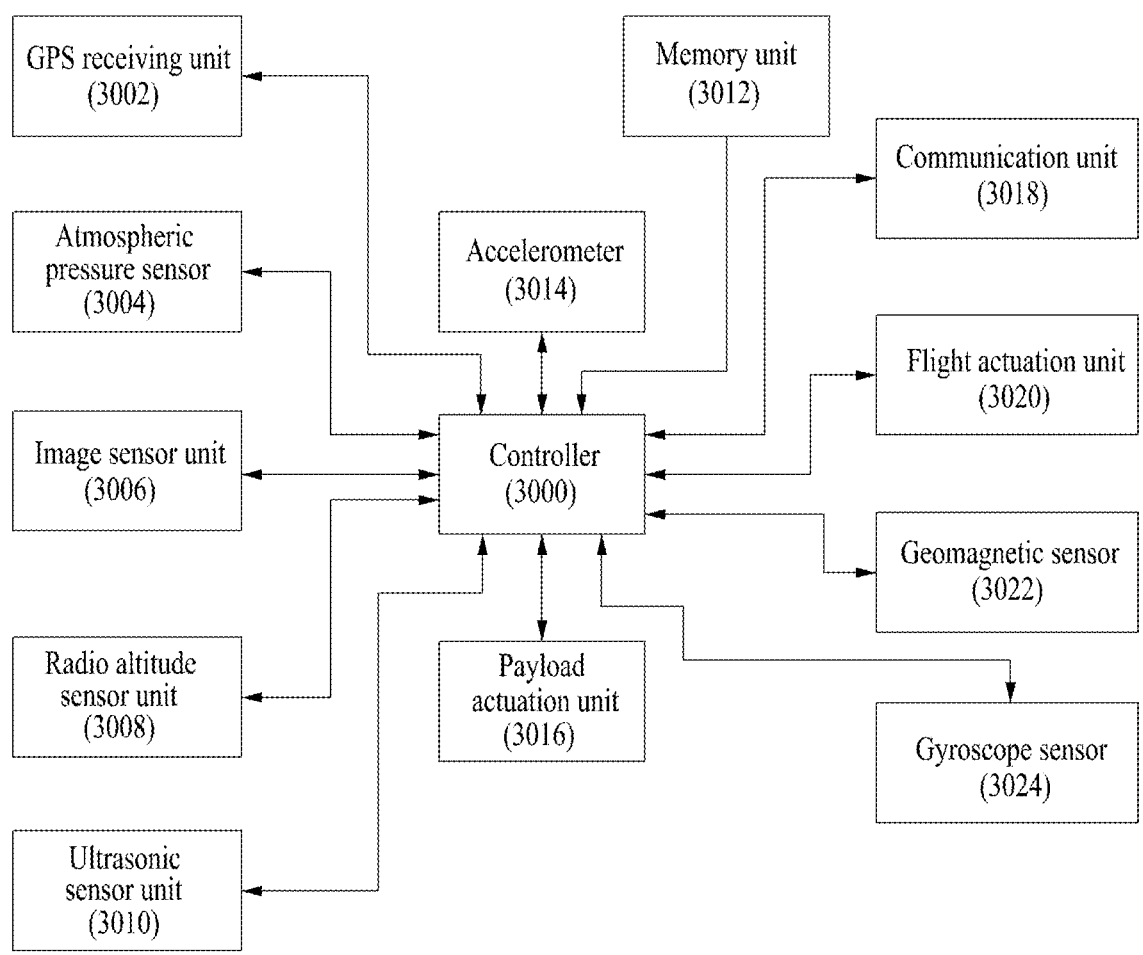
FIG. 30 is a block diagram illustrating a configuration of an unmanned aerial vehicle according to another embodiment.

FIG. 30 is a block diagram illustrating a configuration of an unmanned aerial vehicle according to another embodiment. Components of the unmanned aerial vehicle may be connected in an electronic manner or a mechanical manner.

Referring to FIG. 30, an unmanned aerial vehicle 3050 according to another embodiment may include a controller 3000, a GPS receiving unit 3002, an atmospheric pressure sensor 3004, an image sensor unit 3006, a radio altitude sensor unit 3008, an ultrasonic sensor unit 3010, a memory unit 3012, an accelerometer 3014, a payload actuation unit 3016, a communication unit 3018, a flight actuation unit 3020, a geomagnetic sensor 3022, a gyroscope sensor 3024.

The GPS receiving unit 3002 may receive a signal from a GPS satellite and may measure a current location of the unmanned aerial vehicle 3050. The controller 3000 may ascertain a location of the unmanned aerial vehicle 3050 using the current location of the unmanned aerial vehicle 3050. The controller 3000 may include at least one central processing unit (CPU) which is a general purpose processor and/or a dedicated processor such as an application specific integrated circuit (ASIC), a field-programmable gate way (FPGA), or a digital signal processor (DSP).

The atmospheric pressure sensor 3004 may measure an atmospheric pressure around the unmanned aerial vehicle 3050 and may transmit the measured value to the controller 3000 to measure a flight altitude of the unmanned aerial vehicle 3050.

The image sensor unit 3006 may capture objects via optical equipment such as a camera, may convert an optical image signal incident from the captured image into an electric image signal, and may transmit the converted electric image signal to the controller 3000.

The radio altitude sensor unit 3008 may transmit microwaves to the earth's surface and may measure a distance based on a time of arrival (TOA) according to a signal reflected from the earth's surface, thus transmitting the measured value to the controller 3000. An ultrasonic sensor unit a synthetic aperture radar (SAR) may be used as the radio altitude sensor unit 3008. Thus, the controller 3000 of the unmanned aerial vehicle 3050 may observe a ground object and the earth's surface concurrently with measuring an altitude using the radio altitude sensor unit 3008.

The ultrasonic sensor unit 3010 may include a transmitter which transmits ultrasonic waves and a receiver which receives ultrasonic waves, and may measure a time until transmitted ultrasonic waves are received and may transmit the measured time to the controller 3000. Thus, the controller 3000 may ascertain whether there is an object around the unmanned aerial vehicle 3050. Therefore, if there is an obstacle around the unmanned aerial vehicle 3050 through a value measured by the ultrasonic sensor unit 3010, the controller 3000 may control the flight actuation unit 3020 for collision avoidance to control a location and speed.

The memory unit 3012 may store information (e.g., program instructions) necessary for an operation of the unmanned aerial vehicle 3050, a route map, flight information associated with autonomous flight, and a variety of flight information ascertained during flight. Also, the memory unit 3012 may store resolution height information measured for each way point and a value measured by the radio altitude sensor unit 3008.

The accelerometer 3014 may be a sensor which measures acceleration of the unmanned aerial vehicle 3050, and may measure acceleration of an x-, y-, and z-axis direction and may transmit the measured acceleration to the controller 3000.

The communication unit 3018 may communicate with a ground control center and a company which operates the unmanned aerial vehicle 3050 through wireless communication and may transmit and receive flight information and control information on a periodic basis with the control center and the company. Also, the communication unit 3018 may access a mobile communication network via a base station around the unmanned aerial vehicle 3050 and may communicate with the control center or the company. The controller 3000 may communicate with an operation system or a control system via the communication unit 3018. If a remote control command is received from the operation system, the controller 300 may transmit a control signal for controlling flight of the unmanned aerial vehicle 3050 to the flight actuation unit 3020 or may provide a control signal for actuating the payload actuation unit 3016 to the payload actuation unit 3016 to collect or deliver an object, based on the received remote control command.

Further, the controller 3000 may transmit an image collected by the image sensor unit 3006 to the operation system or the control system via the communication unit 3018.

The geomagnetic sensor 3022 may be a sensor which measures the earth's magnetic field and may transmit the measured value to the controller 3000 to be used to measure an orientation of the unmanned aerial vehicle 3050.

A gyro sensor 3024 may measure an angular speed of the unmanned aerial vehicle 3050 and may transmit the measured value to the controller 3000. The controller 3000 may measure a tilt of the unmanned aerial vehicle 3050.

The controller 3000 may control overall functions of the unmanned aerial vehicle 3050 according to an embodiment and may perform methods of FIGS. 26 and 27. The controller 3000 may perform overall control such that the unmanned aerial vehicle 3050 flies along a route stored in the memory unit 3012 and may compare an altitude value measured by the radio altitude sensor unit 3008 with a resolution height obtained by the image sensor unit 3006 per predetermined way point. Although there is a ground object on a way point, the controller 3000 may allow the unmanned aerial vehicle 3050 to maintain a specified flight altitude.

The controller 3000 may control the payload actuation unit 3016 to drop or collect a cargo based on a cargo delivery manner of the unmanned aerial vehicle 3050 when the unmanned aerial vehicle 3050 collects or deliver the cargo loaded into a payload of the unmanned aerial vehicle 3050 from or to a specific point.

In this case, if a hoist is included in the payload actuation unit 3016 of the unmanned aerial vehicle 3050, when the unmanned aerial vehicle 3050 drops or collects the cargo, the controller 3000 may control the payload actuation unit 3016 to lower the cargo to a delivery point or collect the cargo from a collection point using the hoist. In detail, the unmanned aerial vehicle 3050 may deliver the cargo by lowering a rope to the cargo is fixed by a distance between a flight altitude and a delivery point to deliver the cargo to the delivery point using the hoist while maintaining the flight altitude corresponding to a specified layer. After lowering the rope by a distance between a flight altitude and a collection point in case of collecting the cargo, if verifying that the cargo is fixed to a hook of the rope, the controller 3000 may control the payload actuation unit 3016 such that the hoist winds up the rope.

Further, the controller 3000 may control the flight actuation unit 3020 to control a lift force and a flight speed of the unmanned aerial vehicle 3050. The controller 3000 may control the flight actuation unit 3020 such that a current flight altitude does not depart from a specified layer in consideration of a flight altitude measured by the radio altitude sensor unit 3008 and a resolution height.

The controller 3000 may control the flight actuation unit 3020 to move to a layer changeable zone. After moving to the layer changeable zone, the controller 3000 may control the flight actuation unit 3020 such that the unmanned aerial vehicle 3050 performs flight for a layer change procedure based on information included in layer movement information after the unmanned aerial vehicle 3050 moves to the layer changeable zone.

The flight actuation unit 3020 may generate a lift force and a flight force of the unmanned aerial vehicle 3050 and may include a plurality of propellers, a motor for adjusting each of the plurality of propellers, or an engine. The flight actuation unit 3020 may maintain a movement direction, an attitude, and a flight altitude of the unmanned aerial vehicle 3050 by adjusting a roll, a yaw, and a pitch which is three movement directions of the unmanned aerial vehicle 3050 based on control of the controller 3000.

Figure 31:
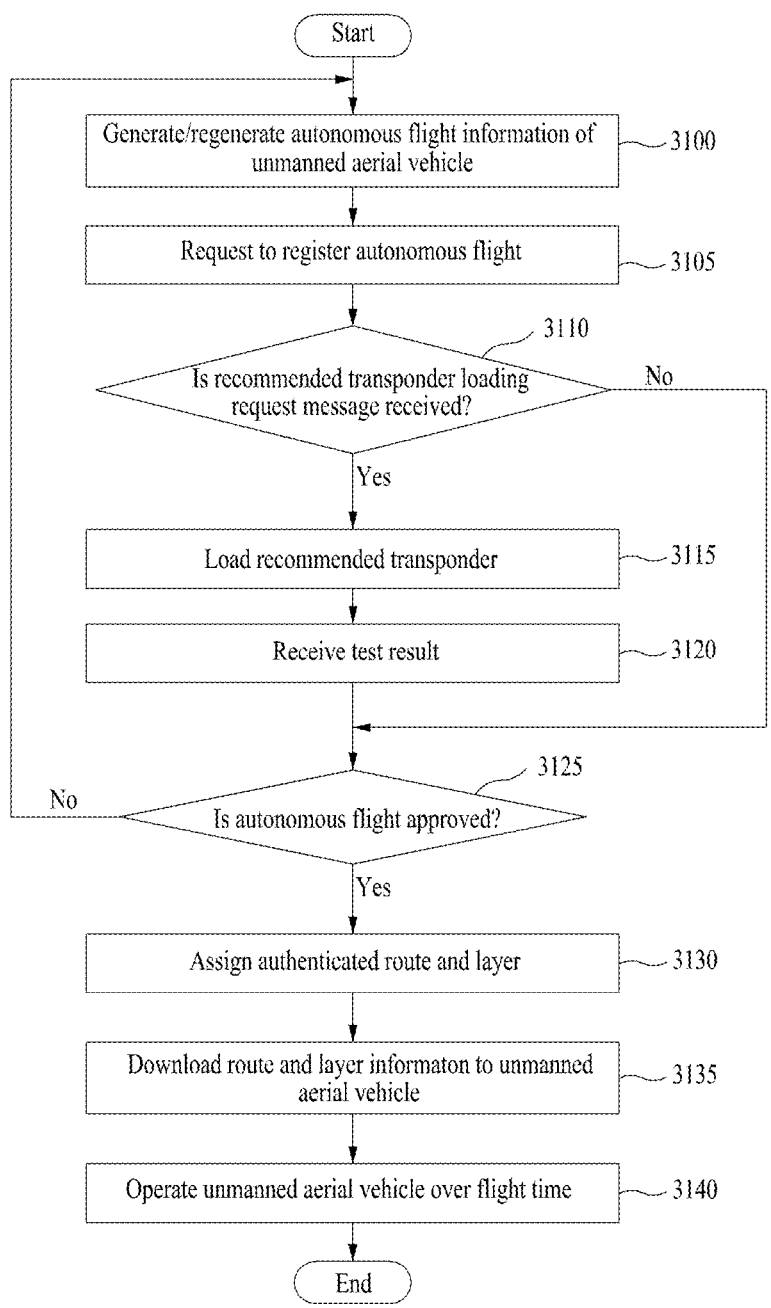
FIG. 31 is a flowchart illustrating an operation method of an unmanned aerial vehicle operation system according to another embodiment.

FIG. 31 is a flowchart illustrating an operation method of an unmanned aerial vehicle operation system according to another embodiment.

Referring to FIG. 31, the operation method of the unmanned aerial vehicle operation system may be performed by the unmanned aerial vehicle operation system (hereinafter simply referred to as "operation system"). In this case, the operation method of the unmanned aerial vehicle operation system according to another embodiment may be an operation method for operating an unmanned aerial vehicle according to another embodiment described with reference to FIG. 30.

In operation 3100, the operation system may generate autonomous flight information of the unmanned aerial vehicle to perform autonomous flight. In operation 3105, the operation system may transmit an autonomous flight registration request message including the autonomous flight information to a control system. Herein, the autonomous flight information of the unmanned aerial vehicle may include fuselage information, flight mission information, and the like of the unmanned aerial vehicle.

Table 1 represents an example of the fuselage information included in the autonomous flight information of the unmanned aerial vehicle.

TABLE 1

| Field | Description |
|---|---|
| Standards | Fuselage length, wingspread, and fuselage height |
| Engine/motor | Manufacturer, kind, type, whether there is authentication, maximum power, maximum rotational speed, and temperature limit |
| Fuel | Fuel quantity |
| Battery | Voltage, weight, charging time, the number of cells, and battery capacity |
| Information about propellant such as propeller/rotor | Manufacturer, kind, type, and whether there is authentication |
| Maximum weight (including payload) | Maximum takeoff weight and maximum landing weight |
| its own weight (body) | Weight except for fuel |
| Speed limit | Maximum flight speed, cruising speed, and stalling speed |
| Maximum operation altitude | Meter and feet |
| Flight time | Given time and accumulated flight time |
| OS | Type of OS and version of OS |
| Payload | Presence or absence |
| Manufacturing serial number | Manufacturing serial number of unmanned aerial vehicle |
| Others | Information about occurrence of accident and damaged degree |
| Payload information | Whether payload is loaded and loadable weight |

Table 2 represents an example of flight mission information included in autonomous flight information of an unmanned aerial vehicle.

TABLE 2

| Field | Description |
|---|---|
| Takeoff and landing method | Manual, Automatic, and the others |
| Navigation device | Main/sub navigation device |
| Failure system | Alternative and procedure (move to safe zone, return to takeoff place, and unfold parachute) when it is impossible to control unmanned aerial vehicle and when fuselage is abnormal |
| Available ground control system | Fixed type, remote control, and mobile device |
| Frequency | Frequency band/output, distance range, and the number of available channels |
| Operable environment | Limit temperature, limited wind speed, and the like |
| Operation information | Flight time accumulated before registration, important performance mission before registration, failure details, the number of times of failure, damaged degree, flight start time, and flight end time |

In Table 2, a takeoff and landing method field may be a field in which a takeoff and landing method of an unmanned aerial vehicle is defined. If the corresponding field indicates "manual", an operator or manager of the unmanned aerial vehicle may control takeoff and landing when the unmanned aerial vehicle takes off and lands. If the corresponding field indicates "automatic", the unmanned aerial vehicle takes off and lands based on a previously programmed command. A failure system field may be a field in which alternatives and procedures are defined if emergencies occur in the unmanned aerial vehicle and if it is impossible to control the unmanned aerial vehicle. For example, the failure system field may include information about a landing zone which is a safe zone where the unmanned aerial vehicle may land in emergencies, for example, communication with a control system is cut off, information about a return to a takeoff zone and information about a flight route to a safe zone, and information about procedures of unfolding a parachute for safe landing if a flight force is lost. Also, the failure system field may include information about a civilian upon emergencies of the unmanned aerial vehicle or information about a point for preventing the unmanned aerial vehicle from colliding with a residential facility. Upon emergencies, the unmanned aerial vehicle may maximally prevent damage of civilians by flying except for populated area of civilians based on the information defined in the failure system field.

In operation 3110, the operation system may verified whether a recommended transponder loading request message for the unmanned aerial vehicle which requests the control system to register autonomous flight in operation 3105 is received from the control system. Herein, the recommended transponder loading request message received from the control system may mean that a transponder loaded into the unmanned aerial vehicle does not meet a condition or that a transponder is not loaded into the unmanned aerial vehicle. For the control system to identify the unmanned aerial vehicle and monitor flight of the unmanned aerial vehicle, it is preferable that a transponder which may communicate with the control system is loaded into the unmanned aerial vehicle.

In operation 3110, if the recommended transponder loading request message is received, in operation 3115, the operation system may load a transponder recommended by the control system into the unmanned aerial vehicle. In operation 3120, the operation system may receive a test result from the control system.

In contrast, if the recommended transponder loading request message is not received or if the test result is received, it is meant that authentication (test) of the transponder loaded into the unmanned aerial vehicle is completed at the control system. In operation 3125, the operation system may verify whether an autonomous flight approval message is received.

If the autonomous approval message is not received in operation 3125, in operation 3110, the operation system may regenerate autonomous flight information for autonomous flight of the unmanned aerial vehicle and may retransmit an autonomous flight registration request message.

Also, if the autonomous flight approval message is received, in operation 3130, the operation system may be assigned an authenticated route and layer from the control system. In operation 3135, the operation system may download the authentication route and layer to the unmanned aerial vehicle to perform autonomous flight.

In operation 3140, the operation system may operate the unmanned aerial vehicle above the authenticated layer and route over a flight start and end time of the unmanned aerial vehicle.

An example of the autonomous flight approval message transmitted from the control system to the operation may be represented as Table 3 below.

TABLE 3

| Field | Description |
|---|---|
| Identification information of unmanned aerial vehicle | Authentication code and identifier |

TABLE 3-continued

| Field | Description |
| --- | --- |
| Layer information | Layer information according to mission |
| Route information | Route and way point information according to mission |
| Mission code | Code for each mission of unmanned aerial vehicle |
| Safety regulation information | Safety regulation information (minimum flight altitude, maximum flight altitude, speed, flight environment condition, given time, distance, ascending rate (m/s), descending rate (m/s), and the like) corresponding to mission code |
| Communication information | Given frequency and communication channel |
| Flight time verification field | Flight start time information and flight end time information of approved unmanned aerial vehicle |

Referring to Table 3, an authentication code and an identifier may be identification information for identifying the unmanned aerial vehicle. Layer information may be layer information assigned based on a mission of the unmanned aerial vehicle. A mission code may be information indicating whether a mission of the unmanned aerial vehicle is any of missions such as delivery, crime watch, reconnaissance, forest fire observation, measurement, a relief operation, weathering, and measurement of air pollution. Identification information of the unmanned aerial vehicle may be information for identifying the unmanned aerial vehicle from the control system after an authentication procedure between the unmanned aerial vehicle and the control system. Safety regulation information may indicate information about if there is safety regulation corresponding to a mission code.

Figure 32:
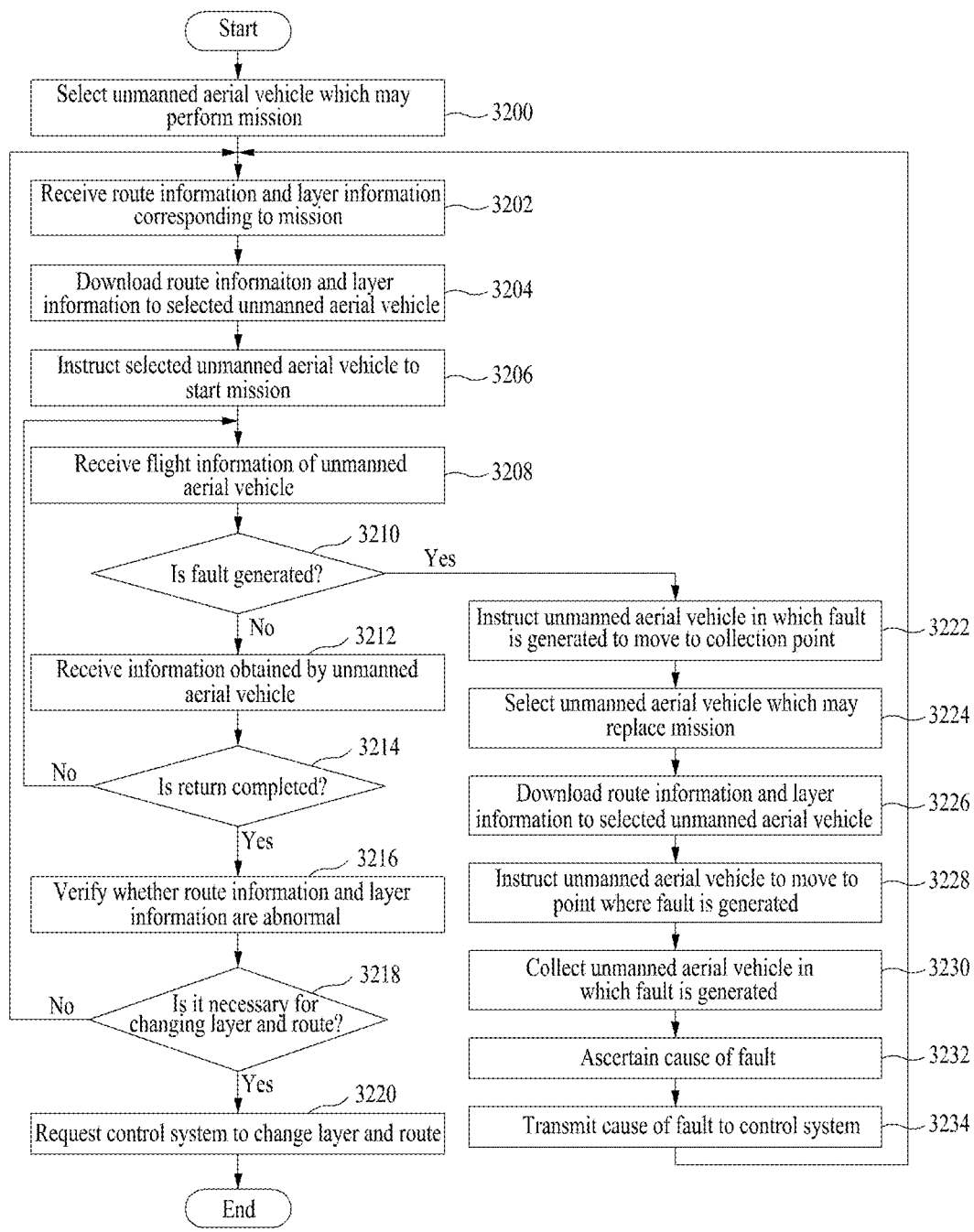
FIG. 32 is a flowchart illustrating an operation method of an unmanned aerial vehicle operation system according to another embodiment.

FIG. 32 is a flowchart illustrating an operation method of an unmanned aerial vehicle operation system according to another embodiment.

Referring to FIG. 32, the operation method of the unmanned aerial vehicle operation system according to another embodiment may be performed by the unmanned aerial vehicle operation system. In this case, the operation method of the unmanned aerial vehicle operation system according to another embodiment may be included in an operation method for operating an unmanned aerial vehicle according to another embodiment in operation 3140 of FIG. 31.

In operation 3200, the operation system may select an unmanned aerial vehicle which may perform a mission among a plurality of unmanned aerial vehicles.

In operation 3202, the operation system may receive route information and layer information corresponding to the mission from a control system. Herein, the route information and the layer information may be received from the control center, included in an autonomous flight approval message. In this case, operation 3202 may include operations 3100 to 3125 described with reference to FIG. 31.

In operation 3204, the operation system may download the received route information and layer information to the selected unmanned aerial vehicle. In operation 3206, if a mission start time of the selected unmanned aerial vehicle arrives, the operation system may instruct the selected unmanned aerial vehicle to start the mission. Herein, if the operation system transmits a mission start message to the unmanned aerial vehicle, the unmanned aerial vehicle may start to fly for performing a mission based on flight start time information included in Table 3.

In operation 3208, the operation system may receive flight information on a periodic basis from the unmanned aerial vehicle. Alternatively, if an event occurs in the unmanned aerial vehicle, the operation system may receive flight information about the corresponding event. Herein, the event may include a result of self-diagnosis continuously performed during flight by the unmanned aerial vehicle, a case where a fault is generated, or a case where an accident or incident occurs while the unmanned aerial vehicle performs its mission.

If it is verified that the fault of the unmanned aerial vehicle is generated from the received flight information in operation 3210, in operation 3222, the operation system may instruct the unmanned aerial vehicle to move to a collection point. Herein, the collection point may be determined in advance between the control system and the operation system, and may be a point determined not to be usually assigned to other unmanned aerial vehicles to be used in only emergencies or a point previously defined as a safe zone. Also, a layer and route used to move to a collection point because a fault is generated in the unmanned aerial vehicle may be a layer and route for emergency, set to be used in only emergencies by the control system.

Meanwhile, the operation system may actuate a means, such as a parachute, for preventing an impact due to ground collision in preparation for a severe fault where the unmanned aerial vehicle in which the fault is generated does not move to the collection point.

In operation 3224, the operation system may select an unmanned aerial vehicle which may replace the mission of the unmanned aerial vehicle in which the fault is generated among unmanned aerial vehicles of a standby state. In this case, it is assumed that an authentication procedure of the unmanned aerial vehicle which may replace the mission may be performed in advance from the control system.

In operation 3226, the operation system may download the route information and layer information of the unmanned aerial vehicle in which the fault is generated to the selected unmanned aerial vehicle. In operation 3228, the operation system may instruct the unmanned aerial vehicle to move to a point where the fault is generated, and may continuously receive flight information from the replaced unmanned aerial vehicle and may instruct the replaced unmanned aerial vehicle to perform a mission.

In operation 3230, the operation system may collect the unmanned aerial vehicle in which the fault is generated from the collection point. In operation 3232, the operation system may ascertain a cause of the fault. In operation 3234, the operation system may transmit the cause of the fault to the control system. In this case, in operation 3230, the operation system may collect the unmanned aerial vehicle in which the fault is generated, using a separate unmanned aerial vehicle for collection. In this case, the unmanned aerial vehicle for collection may be a fuselage in which an authentication procedure is completed in advance from the control system. Since the unmanned aerial vehicle for collection previously stores layer information, flight information, and the like for emergency for collection, it may immediately perform flight for collection of an unmanned aerial vehicle in which a fault is generated when a collection situation occurs. In contrast, if a fault is not generated in the unmanned aerial vehicle which is performing a mission in operation 3210, in operation 3212, the operation system may receive information obtained by the unmanned aerial vehicle. Herein, the obtained information may be an image and the like obtained by image equipment and the like loaded into the unmanned aerial vehicle which is performing the mission, for example, may include an image of a crime or incident scene and images necessary for being used in a place, such as a railroad, a plant, an oil pipeline, a military ceasefire line, or a prison, necessary for a continuous monitoring task. Also, the obtained information may be an image captured by a thermo-graphic camera for maintenance of a railroad, a plant, and a building. In addition, if a mission of the unmanned aerial vehicle is weathering, measurement of air pollution, and the like, data measured during flight may be the obtained information.

If the unmanned aerial vehicle performs the mission and returns in operation 3214, in operation 3216, the operation system may verify whether route information and layer information are abnormal through flight information stored while the unmanned aerial vehicle flies. If it is necessary for changing the layer and route in operation 3218, in operation 3220, the operation system may request the control system to change the layer and route of the unmanned aerial vehicle.

In contrast, if the unmanned aerial vehicle does not return in operation 3214, in operation 3208, the operation system may receive flight information of the unmanned aerial vehicle. Also, if it is unnecessary for changing the layer and route in operation 3218, in operation 3202, the operation system may receive route information and layer information corresponding to the mission.

Figure 33:
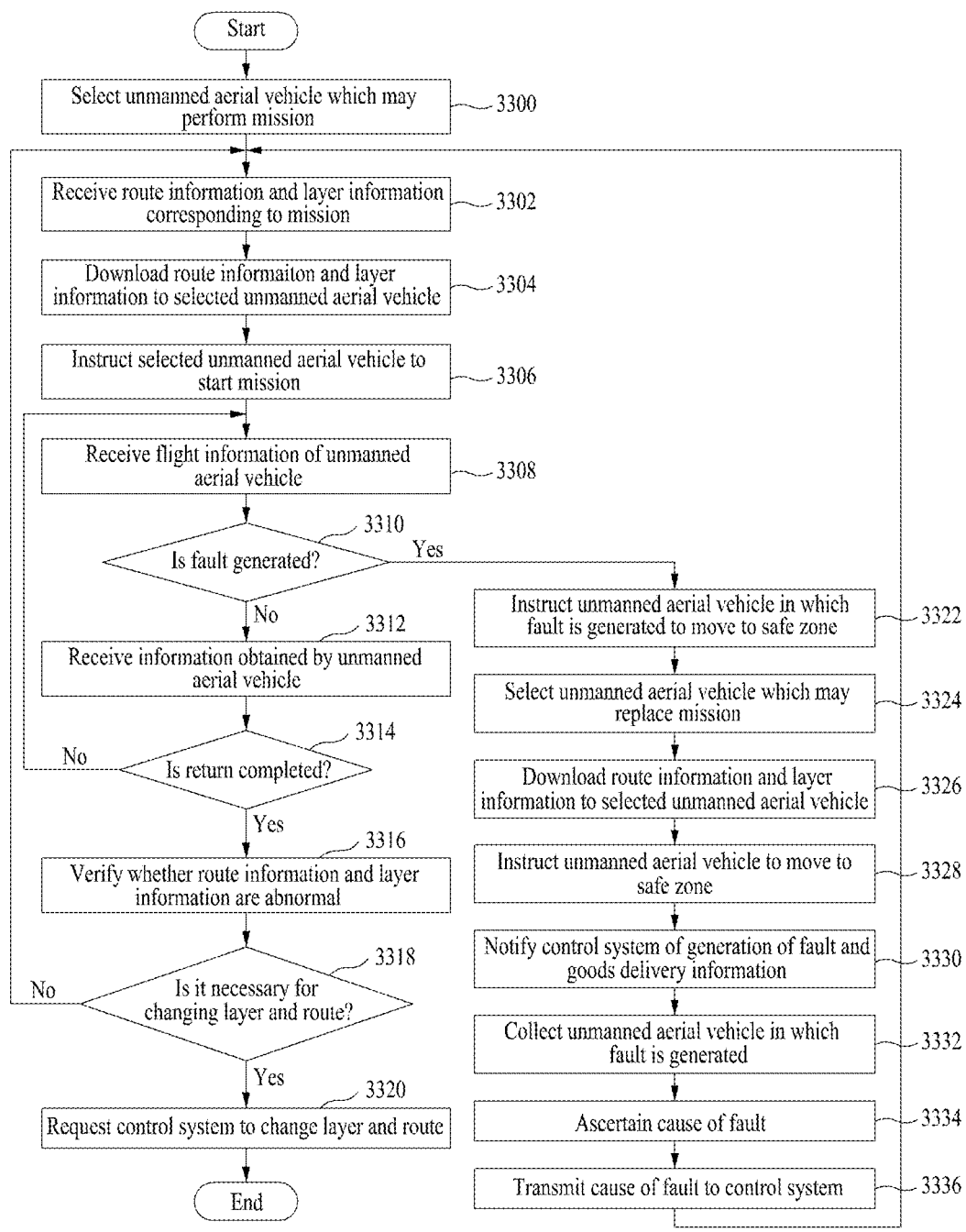
FIG. 33 is a flowchart illustrating an operation method of an unmanned aerial vehicle of an operation system according to another embodiment.

FIG. 33 is a flowchart illustrating an unmanned aerial vehicle operation method of an operation system according to another embodiment and is a flowchart illustrating a method in which the operation system is a company of operating a goods delivery service using the unmanned aerial vehicle. In this case, an unmanned aerial vehicle operation method of an unmanned aerial vehicle operation system according to another embodiment may be included in an operation method for operating an unmanned aerial vehicle according to another embodiment in operation 3140 of FIG. 31.

Since operations 3300, 3302, 3304, 3306, 3308, 3310, 3312, 3314, 3316, 3318, and 3320 of FIG. 33 are overlapped with operations 3200, 3202, 3204, 3306, 3208, 3210, 3212, 3214, 3216, 3218, to 3220 of FIG. 32, a description for this will be omitted.

In operation 3322, an operation system may transmit a safe zone movement message, for instructing an unmanned aerial vehicle in which a fault is generated to move to a safe zone, to unmanned aerial vehicle in which the fault is generated. Herein, the safe zone may be a point determined not to be usually assigned to other unmanned aerial vehicles to be used in only emergencies. Also, a layer and route used to move to the safe zone because the fault is generated in the unmanned aerial vehicle may be a layer and route for emergency, set to be used in only emergencies by a control system.

In operation 3324, the operation system may select an unmanned aerial vehicle which may replace a mission of the unmanned aerial vehicle in which the fault is generated among unmanned aerial vehicles of a standby state. In this case, it is assumed that an authentication procedure of the unmanned aerial vehicle which may replace the mission may be performed in advance from the control system.

In operation 3326, the operation system may download route information and layer information of the unmanned aerial vehicle in which the fault is generated to the selected unmanned aerial vehicle. In operation 3328, the operation system may instruct the unmanned aerial vehicle to move to the safe zone.

In operation 3330, the operation system may notify the control system which controls the unmanned aerial vehicle or a computer or a portable terminal of a goods receiver of information about the generation of the fault and a goods delivery time delay due to the generation of the fault.

In operation 3332, the operation system may collect the unmanned aerial vehicle in which the fault is generated. In operation 3334, the operation system may ascertain a cause of the fault using an FDR of the unmanned aerial vehicle. In operation 3336, the operation system may transmit the cause of the fault to the control system.

Hereinafter, a description will be given of a method for performing flight at an unmanned aerial vehicle according to an embodiment. An operation method of the unmanned aerial vehicle may interwork with the above-mentioned unmanned aerial vehicle operation system.

The method for performing the flight at the unmanned aerial vehicle may include performing authentication for autonomous flight with a control center, downloading route map data generated by the control center based on a mission of the unmanned aerial vehicle, flying on a route above a layer defined in the downloaded route map data, and maintaining a flight altitude defined above the layer using a resolution height corresponding to a way point on the route. Herein, the layer may be vertically and separately shaped on a 3D space to have a constant altitude value from the earth's surface where the unmanned aerial vehicle may fly based on the mission. The route may be established above the layer and may include at least two way points.

The method may further include, if a flight fault is generated during flight, reporting the generation of the fault to an operation system of the unmanned aerial vehicle.

The method may further include, when a fault is generated during the mission is performed, moving to a safe zone.

The method may further include, when an emergency occurs while the mission is performed, performing flight by an operation of an operation system of the unmanned aerial vehicle.

The method may further include, when an emergency occurs while the mission is performed, transmitting information captured in the emergency to an operation system of the unmanned aerial vehicle.

Hereinafter, a description will be given in detail of an example of the method for performing flight at the unmanned aerial vehicle.

Figure 34:
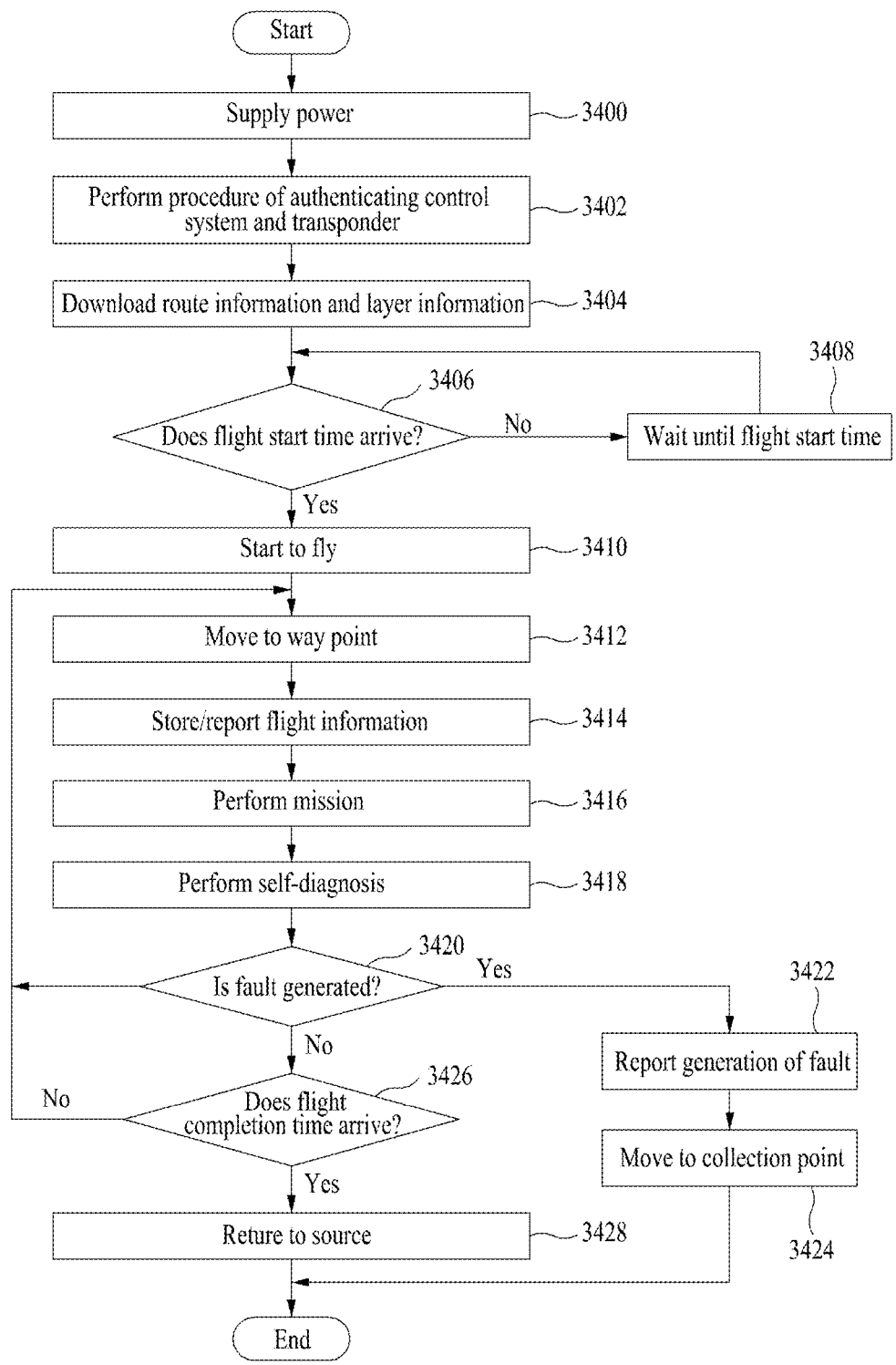
FIG. 34 is a flowchart illustrating an operation of an unmanned aerial vehicle according to another embodiment.

FIG. 34 is a flowchart illustrating an operation of an unmanned aerial vehicle according to another embodiment.

Referring to FIG. 34, the operation of the unmanned aerial vehicle according to another embodiment may be performed by the unmanned aerial vehicle. In this case, the operation of the unmanned aerial vehicle according to another embodiment may be an operation method of an unmanned aerial vehicle according to another embodiment described with reference to FIG. 30.

In operation 3400, the unmanned aerial vehicle may receive power from an operation system. In operation 3402, the unmanned aerial vehicle may perform a procedure of authentication a control system and a transponder. Herein, the performed authentication procedure may include any procedure, which is not described in the specification, of performing authentication for control of the unmanned aerial vehicle at the control system as well as the procedure of authenticating the transponder.

In operation 3404, the unmanned aerial vehicle may download route information and layer information from the operation system. In operation 3406, the unmanned aerial vehicle may verify whether a flight start time arrives.

In this case, if the flight start time does not arrive, in operation 3408, the unmanned aerial vehicle may wait until the flight start time. If the flight start time arrives, in operation 3410, the unmanned aerial vehicle may start to fly. In this case, before starting to fly, the unmanned aerial vehicle may perform a procedure (e.g., check an operation of an elevator, ailerons, rudder, or the like) for starting to fly before starting to fly. The unmanned aerial vehicle may be configured to start to fly if the procedure for starting to fly is normal.

In operation 3412, the unmanned aerial vehicle may fly along way points defined on the downloaded layer and route. In operation 3414, the unmanned aerial vehicle may store flight information and may report the flight information to the operation system or the control system. In operation 3416, the unmanned aerial vehicle may perform a mission. In this case, the unmanned aerial vehicle may perform the mission while maintaining a constant flight altitude defined above the layer.

In operation 3418, the unmanned aerial vehicle may perform a self-diagnosis while performing the mission. In operation 3420, the unmanned aerial vehicle may verify whether a fault is generated.

If the fault is generated in operation 3420, in operation 3422, the unmanned aerial vehicle may report the generation of the fault to the operation system or the control system. In operation 3424, the unmanned aerial vehicle may move to a collection point. In this case, a location to which the unmanned aerial vehicle moves may be a safe zone rather than the collection point.

In contrast, if the fault is not generated in operation 3420, in operation 3426, the unmanned aerial vehicle may verify whether a flight completion time arrives. If the flight completion time does not arrive, in operation 3412, the unmanned aerial vehicle may continue flying along the way points. In contrast, if the flight completion time arrives in operation 3426, in operation 3428, the unmanned aerial vehicle may return to a source.

Figure 35:
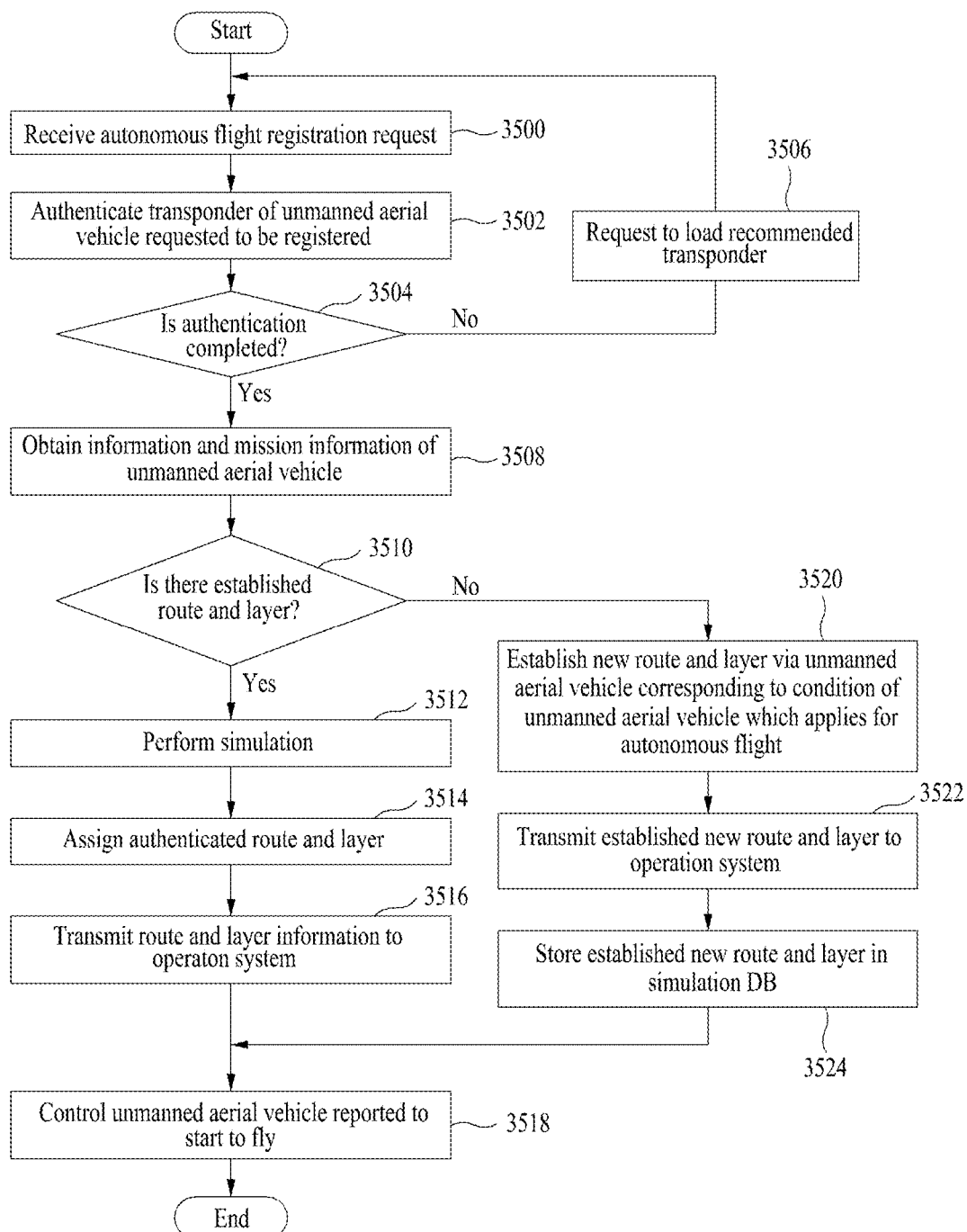
FIG. 35 is a flowchart illustrating an unmanned aerial vehicle control method of a control system according to another embodiment.

FIG. 35 is a flowchart illustrating an unmanned aerial vehicle control method of a control system according to another embodiment.

Referring to FIG. 35, the unmanned aerial vehicle control method of the control system according to another embodiment may be performed by the control system. In this case, the unmanned aerial vehicle control method of the control system according to another embodiment may be a method for controlling an unmanned aerial vehicle according to another embodiment described with reference to FIG. 30.

In operation 3500, the control system may receive an autonomous flight registration request from an operation system of an unmanned aerial vehicle. In operation 3502, the control system may perform an authentication procedure with the unmanned aerial vehicle requested to be registered. Herein, the performed authentication procedure may include a procedure of authenticating whether a transponder loaded into the unmanned aerial vehicle is a recommended transponder.

If authentication for the unmanned aerial vehicle is not completed in operation 3504, in operation 3506, the control system may transmit a recommended transponder loading request message for requesting to load the recommended transponder to the unmanned aerial vehicle or the operation system of the unmanned aerial vehicle.

In contrast, if the authentication for the unmanned aerial vehicle is completed, in operation 3508, the control system may obtain information and mission information of the unmanned aerial vehicle from the operation system. In operation 3510, the control system may verify whether there is information about a previously established route and layer corresponding to the obtained information.

If there is the information about the previously established route and layer in a database in operation 3510, in operation 3512, the control system may execute a simulation using the obtained mission information. In operation 3514, the control system may assign the authenticated route and layer to the unmanned aerial vehicle as a result of the simulation. In operation 3516, the control system may transmit information about the assigned route and layer to the operation system. In operation 3518, the control system may control an unmanned aerial vehicle reported to start to fly.

Meanwhile, if there is no the information about the previously established route and layer in the database, in operation 3520, the control system may select an unmanned aerial vehicle corresponding to a condition of the unmanned aerial vehicle which applies for the autonomous flight among unmanned aerial vehicles previously possessed by the control system and may establish a new route and layer via the selected unmanned aerial vehicle.

In operation 3522, the control system may transmit information about the established new route and layer to the operation system of the unmanned aerial vehicle. In operation 3524, the control system may store information about the established new route and layer in the database.

Figure 36:
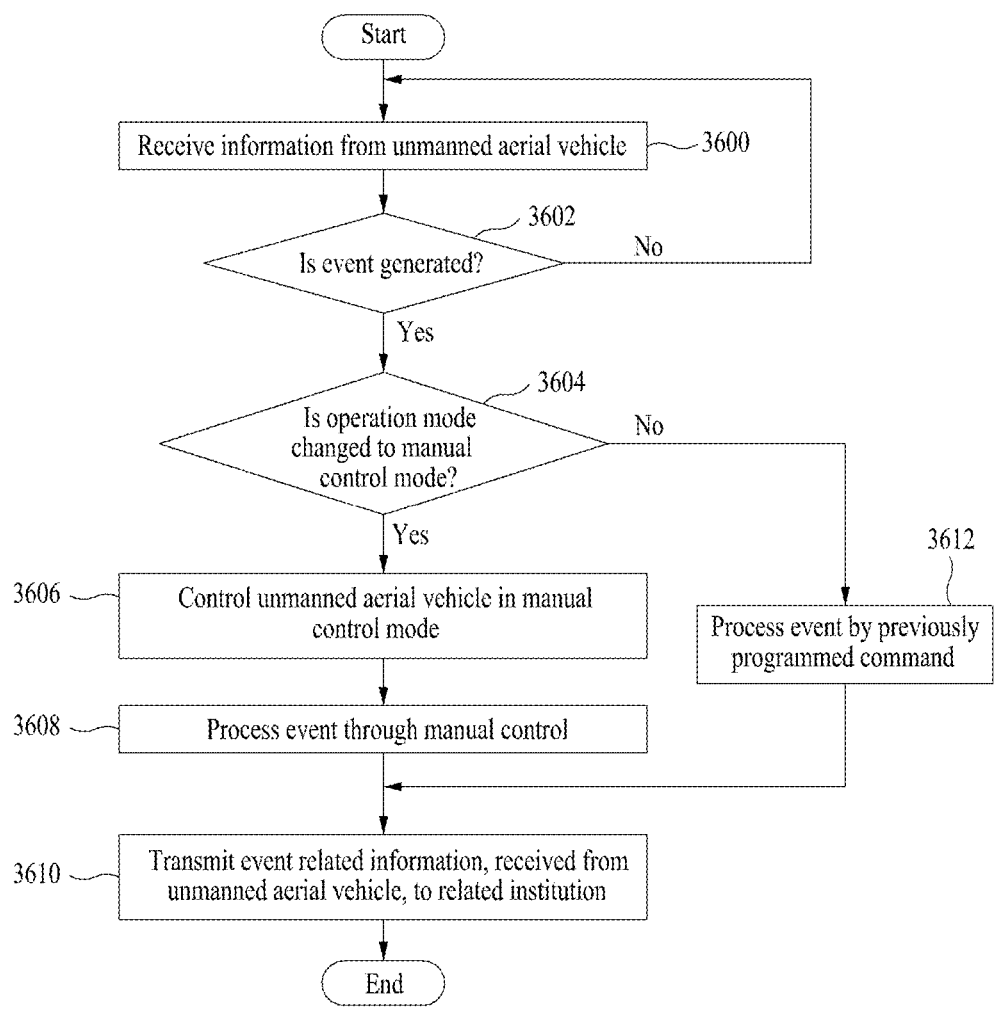
FIG. 36 is a flowchart illustrating an unmanned aerial vehicle operation method of an operation system according to another embodiment.

FIG. 36 is a flowchart illustrating an unmanned aerial vehicle operation method of an operation system according to another embodiment.

Referring to FIG. 36, the unmanned aerial vehicle operation method of the operation system according to another embodiment may be performed by the operation system. In this case, the unmanned aerial vehicle operation method of the operation system according to another embodiment may be a method for operating an unmanned aerial vehicle according to another embodiment in operation 3140 of FIG. 31.

In operation 3600, the operation system may receive flight related information and an image obtained by an unmanned aerial vehicle from the unmanned aerial vehicle. In operation 3602, the operation system may verify whether an event is generated. Herein, the event may include occurrence of a crime, occurrence of an accident such as fire, occurrence of a crack for facilities such as buildings, and the like.

If the event is generated, in operation 3604, the operation system may verify whether an operation mode of the unmanned aerial vehicle is changed to a manual control mode. The procedure of verifying whether the operation mode of the unmanned aerial vehicle is changed to the manual control mode in operation 3604 at the operation system may be performed by verifying whether a manual control command is input from an operator.

If the operation mode of the unmanned aerial vehicle is not changed to the manual control mode in operation 3604, in operation 3612, the operation system may process the generated event by previously programmed commands. For example, if the generated event is occurrence of a crime, the unmanned aerial vehicle may capture an object of a corresponding point or a moving object at high magnifications, may transmit an image captured using equipment such as a night vision to the operation system, or may trace a moving object. If program instructions for flying operations are stored in the unmanned aerial vehicle, the unmanned aerial vehicle may process the generated event based on the previously stored commands.

In contrast, if the operation mode of the unmanned aerial vehicle is changed to the manual control mode in operation 3604, in operation 3606, the operation system may transmit a message for controlling the unmanned aerial vehicle by control commands input from the operator to the unmanned aerial vehicle. In operation 3608, the operation system may transmit processing commands for a point where the event is generated to the unmanned aerial vehicle and may process the event generated in operation 3602. For example, the operation system may process the event based on a command, such as a camera angle adjustment command, a magnification adjustment command, a fuselage number command, a voice transmission command, a trace command, or the like, input by the operator.

In operation 3610, the operation system may transmit event related information received from the unmanned aerial vehicle to a related institution such as a police station, a fire station, a security related company, a troop, or a facility maintenance enterprise.

Figure 37:
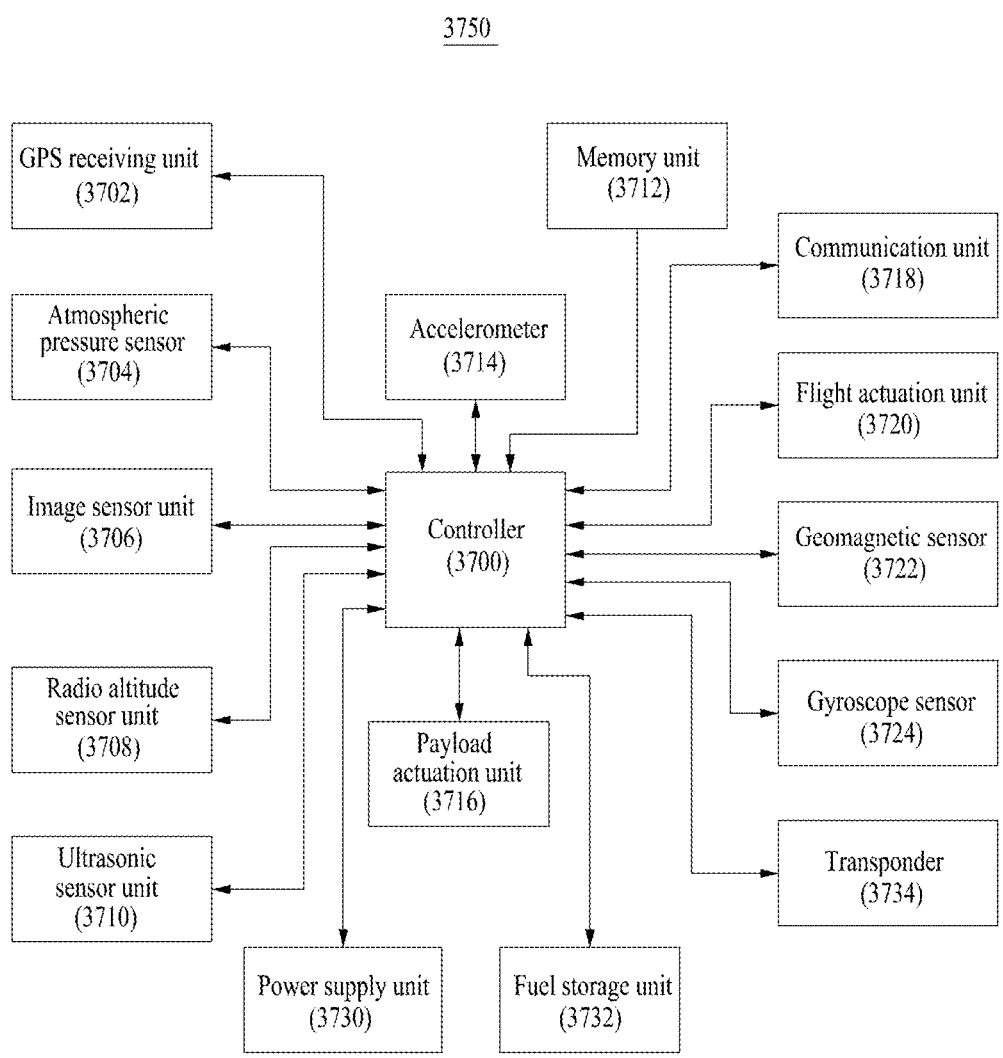
FIG. 37 is a block diagram illustrating a configuration of an unmanned aerial vehicle according to another embodiment.

FIG. 37 is a block diagram illustrating a configuration of an unmanned aerial vehicle according to another embodiment.

Referring to FIG. 37, an unmanned aerial vehicle 3750 according to another embodiment may include a controller 3700, a GPS receiving unit 3702, an atmospheric pressure sensor 3704, an image sensor unit 3706, a radio altitude sensor unit 3708, an ultrasonic sensor unit 3710, a memory unit 3712, an accelerometer 3714, a payload actuation unit 3716, a communication unit 3718, a flight actuation unit 3720, a geomagnetic sensor 3722, a gyroscope sensor 3724, a power supply unit 3730, a fuel storage unit 3732, and a transponder 3734.

The components of the unmanned aerial vehicle 3750 according to another embodiment may perform the partially same function as components of an unmanned aerial vehicle 3050 according to another embodiment described with reference to FIG. 30. For example, the GPS receiving unit 3702, the atmospheric pressure sensor 3704, the image sensor unit 3706, the radio altitude sensor unit 3708, the ultrasonic sensor unit 3710, the memory unit 3712, the accelerometer 3714, the payload actuation unit 3716, the communication unit 3718, the flight actuation unit 3720, the geomagnetic sensor 3722, and the gyroscope sensor 3724 of the unmanned aerial vehicle 3750 according to another embodiment may perform the same functions as a GPS receiving unit 3002, an atmospheric pressure sensor 3004, an image sensor unit 3006, a radio altitude sensor unit 3008, an ultrasonic sensor unit 3010, a memory unit 3012, an accelerometer 3014, a payload actuation unit 3016, a communication unit 3018, a flight actuation unit 3020, a geomagnetic sensor 3022, and a gyroscope sensor 3024 of the unmanned aerial vehicle 3050 according to another embodiment described with reference to FIG. 30. Therefore, an overlapped description for these will be omitted. Herein, the components of the unmanned aerial vehicle 3750 according to another embodiment may be connected to each other in an electronic or mechanical manner.

The power supply unit 3730 may supply power necessary for operating the unmanned aerial vehicle 3750 and may include an internal combustion engine such as an engine or a battery. The fuel storage unit 3732 may store fuel such as oil, if a power supply source of the unmanned aerial vehicle 3750 is the internal combustion engine such as the engine.

The transponder 3734 may perform authentication for a control system to identify the unmanned aerial vehicle 3750 and may transmit flight information and the like for control of the unmanned aerial vehicle 3750 to the control system on a periodic basis.

The controller 3700 may include at least one CPU which is a general purpose processor and/or a dedicated processor such as an ASIC (Application Specific Integrated Circuit), an FPGA (Field-programmable gate array), or a DSP (Digital Signal Processor). The controller 3700 may control overall functions of the unmanned aerial vehicle 3750 according to an embodiment and may perform a method described with reference to FIG. 34.

The controller 3700 may perform overall control such that the unmanned aerial vehicle 3750 flies along a route stored in the memory unit 3712 and may compare an altitude value measured by the radio altitude sensor unit 3708 with a resolution height obtained by the image sensor unit 3706 at intervals of a way point. If there is a ground object on a way point, the unmanned aerial vehicle 3750 may maintain a flight altitude.

Also, if a fault is generated in the unmanned aerial vehicle 3750, the controller 3700 may control the flight actuation unit 3720 to move to a safe zone or a collection point stored in the memory unit 3712 and may transmit fault related information to an operation system via the communication unit 3718.

If power supplied from the power supply unit 3730 is lower than power necessary for an operation of the unmanned aerial vehicle 3750, if fuel of the fuel storage unit 3732 is less than a minimum amount of storage, or if a fault is generated in an operation of the flight actuation unit 3720, the controller 3700 may determine that the fault is generated in the unmanned aerial vehicle 3750 and may transmit the fact that the fault is generated to the operation system or the control system via the communication unit 3718.

Also, if an event is generated, the controller 3700 may control the image sensor unit 3706 based on a procedure corresponding the event to select an image acquisition direction and an image acquisition mode (infrared rays, X-rays, and the like), store an image obtained by the image sensor unit 3706 in the memory unit 3712, and transmit the image to the operation system via the communication unit 3718.

Also, the controller 3700 may control function blocks for performing a command based on the command received from the operation system or the control system via the communication unit 3718. For example, if an image acquisition command is received from the operation system or the control system via the communication unit 3718, the controller 3700 may control a view angle, a direction, resolution, magnification, and the like of an image acquisition module of the image sensor unit for image acquisition based on the image acquisition command or may control the flight actuation unit 3720 to control a flight direction for obtaining an image the operation system or the control system wants.

In addition, if a goods collection or delivery command is received from the operation system or the control system via the communication unit 3718, the controller 3700 may control the flight actuation unit 3720 to move to a goods collection or a goods delivery point based on the received command and may control the payload actuation unit 3716 to perform an operation of collecting or deliver goods at the goods collection point or the goods delivery point.

Figure 38:
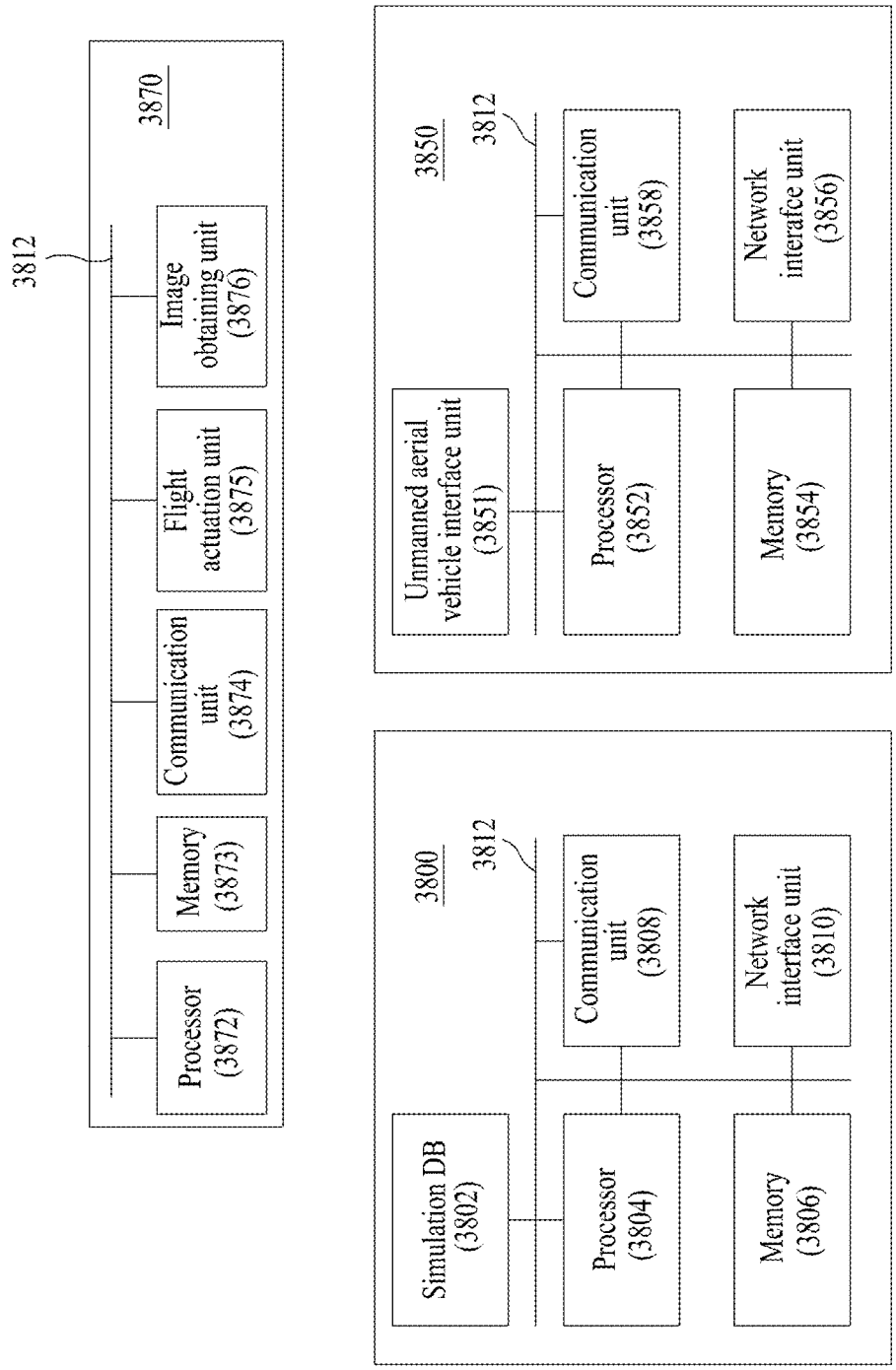
FIG. 38 is a block diagram illustrating an unmanned aerial vehicle, an operation system, and a control system according to another embodiment.

FIG. 38 is a block diagram illustrating an unmanned aerial vehicle, an operation system, and a control system according to another embodiment.

Referring to FIG. 38, another embodiment may include a control system 3800, an operation system 3850, and an unmanned aerial vehicle 3870. Components of the control system 3800, the operation system 3850, and the unmanned aerial vehicle 3870 may be connected to each other via an electrically connected bus 3812 to communicate data and a control signal.

The control system 3800 may include a simulation database 3802, a processor 3804, a memory 3806, a communication unit 3808, and a network interface unit 3810.

The communication unit 3808 of the control system 3800 may perform wireless communication with the unmanned aerial vehicle 3870. The network interface unit 3810 may be connected with a network interface 3856 of the operation system 3850 to communicate information with the operation system 3850. The memory 3806 may store program instructions such that the processor 3804 of the control system 3800 operates according to embodiments.

The simulation database 3802 of the control system 3800 may store simulation result information about missions of unmanned aerial vehicles which perform autonomous flight and about layer information and route information for each specification of each of the unmanned aerial vehicles, previously established by the control system 3800. If an autonomous flight registration request is received from the operation system 3850, the processor 3804 may verify whether layer information and route information corresponding to the requested autonomous flight are present in the simulation database (DB) 3802, may perform a simulation through specification information of an unmanned aerial vehicle to perform the requested autonomous flight, and may transmit the simulated result to the operation system 3850.

The operation system 3850 may include an unmanned aerial vehicle interface unit 3851, a processor 3852, a memory 3854, the network interface unit 3856, and the communication unit 3858.

The communication unit 3858 of the operation system 3850 may communicate a variety of information with a communication unit 3874 of the unmanned aerial vehicle 3870 through wireless communication. The memory 3854 may store program instructions such that the processor 3852 of the operation system 3850 operates according to embodiments and may store specification information and mission information about a plurality of unmanned aerial vehicles operated by the operation system 3850.

The unmanned aerial vehicle interface unit 3851 may be connected with the plurality of unmanned aerial vehicles located in a hanger of the operation system 3850 to transmit a variety of control information, for example, supply power, download route information and layer information, and assign a flight mission.

The unmanned aerial vehicle 3870 may include a processor 3872, a memory 3873, the communication unit 3874, a flight actuation unit 3875, and an image obtaining unit 3876.

The processor 3872 of the unmanned aerial vehicle 3870 may perform a variety of operations associated with flight of the unmanned aerial vehicle 3870. The memory 3873 may store program instructions executed by the processor 3872, route information, layer information, a variety of flight information stored during flight, and images obtained by the image obtaining unit 3876. The processor 3872 may generate a control signal for controlling a component for autonomous flight of the unmanned aerial vehicle 3870 based on the program instructions, the route information, the layer information, and the like associated with an operation of the unmanned aerial vehicle 3870, stored in the memory 3873.

The communication unit 3874 may communicate flight information, various data, and a variety of control information through wireless communication with the communication unit 3808 of the control system 3800 and the communication unit 3858 of the operation system 3850. The flight actuation unit 3875 may generate a lift force or a flight force of the unmanned aerial vehicle 3870 based on control of the processor 3872. The image obtaining unit 3876 may capture objects based on control of the processor 3872 during flight. Particularly, the communication unit 3874 may transmit an image captured by the image obtaining unit 3876 to the communication unit 3858 of the operation system 3850 or the communication unit 3808 of the control system 3800 and may transmit a control signal of the image obtaining unit 3876, received from the communication unit 3858 of the operation system 3850 or the communication unit 3808 of the control system 3800, to the processor 3872. Therefore, the processor 3872 may control various flight control operations such that the image obtaining unit 3876 captures an image and an operation for obtaining an image.

Embodiments are exemplified as the unmanned aerial vehicle flies along the route above the previously established layer. Hereinafter, an embodiment is exemplified as an unmanned aerial vehicle changes a layer and performs autonomous flight.

A method for establishing a route of an unmanned aerial vehicle according to another embodiment may include identifying an object from surface scanning data and shaping a space, which facilitates autonomous flight of the unmanned aerial vehicle, as a layer, determining way points for generating a route of the unmanned aerial vehicle on the shaped layer, collecting surface image data for the way points from the shaped layer, analyzing a change in image resolution according to a distance from the object through the collected surface image data and extracting altitude values on each way point, and generating flight path information of the unmanned aerial vehicle including at least one of the shaped layer, way points, the altitude values, and a flight path which is a line of connecting the way points.

Herein, each of the way points may indicate a location of a ground object which exists on the earth's surface of a point where the unmanned aerial vehicle performs autonomous flight above the layer or may indicate a location where the unmanned aerial vehicle performs a mission.

The generating of the flight path information of the unmanned aerial vehicle may include, if it is necessary for the unmanned aerial vehicle to move from a departure layer which is an initially assigned layer to another layer, determining an arrival layer to which the unmanned aerial vehicle will move, and generating layer movement information for moving from the departure layer to the arrival layer.

The layer movement information may include at least one of a layer changeable zone, including a way point zone for changing a layer in a route for autonomous flight of the unmanned aerial vehicle, a layer movement time, a change zone entry time, and a change zone entry angle.

Hereinafter, a description will be given in detail of an example of the method for establishing the route of the unmanned aerial vehicle.

Figure 39:
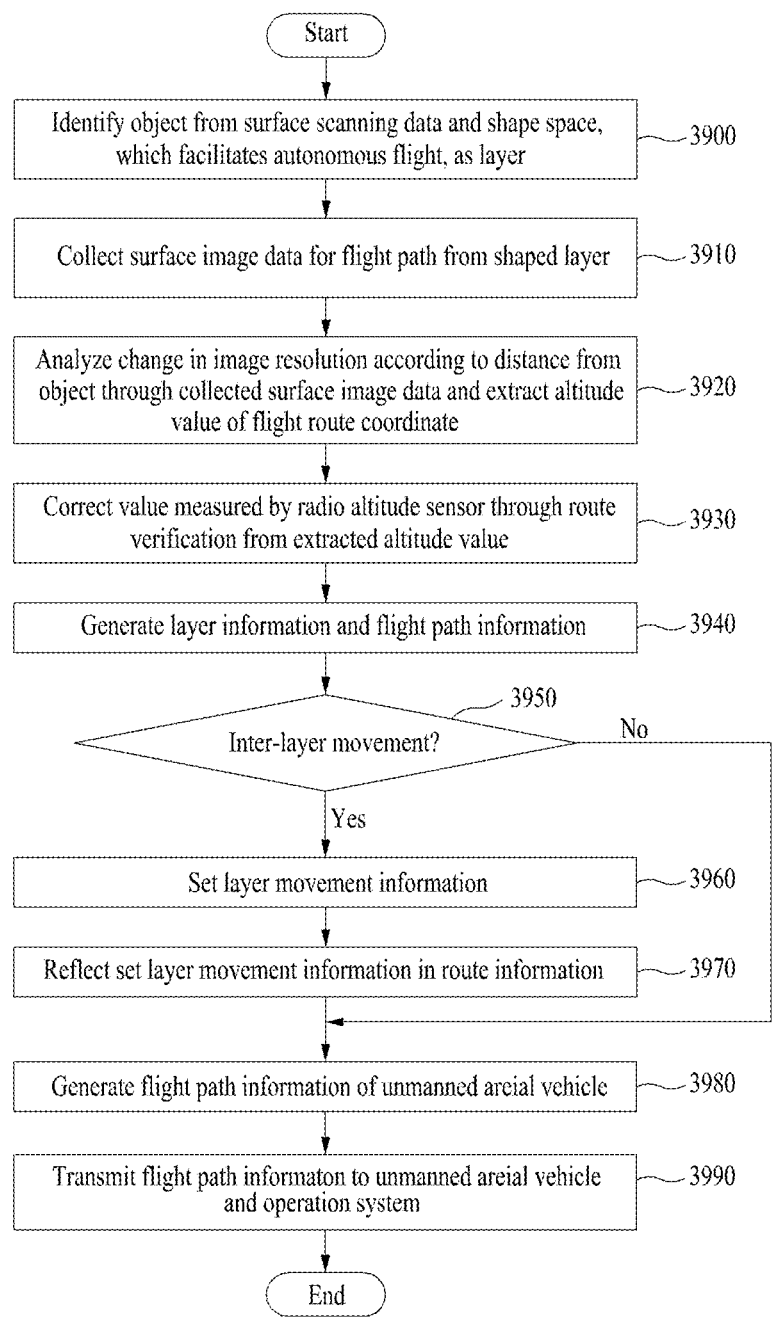
FIG. 39 is a flowchart illustrating a method for generating flight path information of an unmanned aerial vehicle for inter-layer autonomous flight of the unmanned aerial vehicle according to an embodiment.

FIG. 39 is a flowchart illustrating a method for generating flight path information of an unmanned aerial vehicle for autonomous flight between layers of the unmanned aerial vehicle according to an embodiment.

Referring to FIG. 39, the method for generating the flight path information of the unmanned aerial vehicle for interlayer autonomous flight of the unmanned aerial vehicle may be performed by an unmanned aerial vehicle route establishment system. The unmanned aerial vehicle route establishment system may comply with embodiments and may be an unmanned aerial vehicle route establishment system which is described above or will be described below.

In operation 3900, the unmanned aerial vehicle route establishment system may identify an object from surface scanning data and may shape a space, which facilitates autonomous flight, as a layer. In operation 3910, the unmanned aerial vehicle route establishment system may collect surface image data for a flight path from the shaped layer. In operation 3920, the unmanned aerial vehicle route establishment system may analyze a change in image resolution according to a distance between a camera which scans the earth's surface and the object through the collected surface image data and may extract an altitude value on a flight route. In operation 3930, the unmanned aerial vehicle route establishment system may correct a value measured by a radio altitude sensor through route verification from the extracted altitude value. Operation 3930 may be optionally performed.

In operation 3940, the unmanned aerial vehicle route establishment system may generate information about a layer and route where the unmanned aerial vehicle will fly for autonomous flight of the unmanned aerial vehicle. Herein, the layer information may include information for identifying a layer assigned for flight among a plurality of layers where the unmanned aerial vehicle may fly and information about a layer height, a layer area, and the like. The flight path information may include a location of each of way points which exist on a flight path of the unmanned aerial vehicle above each layer, an altitude value of each of the way points, a flight path which is a line of connecting the way points, and the like. Herein, the flight path and the route may be used as the same meaning indicating a path for flying on a 3D space.

In operation 3950, the unmanned aerial vehicle route establishment system may determine whether it is possible for inter-layer movement, based on fuselage information or mission information of the unmanned aerial vehicle. For example, if the unmanned aerial vehicle is an unmanned aerial vehicle with performance where it is possible for inter-layer movement, as a result of analyzing weight, battery, fuel, and propellant information included in the fuselage information of the unmanned aerial vehicle, the unmanned aerial vehicle route establishment system may determine that it is possible for the inter-layer movement. Also, in operation 3950, the unmanned aerial vehicle route establishment system may determine whether it is necessary for the inter-layer movement of the unmanned aerial vehicle based on mission details included in mission information of the unmanned aerial vehicle.

An example of the flight mission information may be represented as Table 4.

TABLE 4

| Field | Description |
| --- | --- |
| Takeoff and landing method | Manual, Automatic, and the others |
| Navigation device | Main/sub navigation device |
| Failure system | Alternative and procedure (move to safe zone, return to takeoff place, and unfold parachute) when it is impossible to control unmanned aerial vehicle and when fuselage is abnormal |
| Available ground control system | Fixed type, remote control, and mobile device |
| Frequency | Frequency band/output, distance range, and the number of available channels |
| Operable environment | Limit temperature, limited wind speed, and the like |
| Operation information | Flight time accumulated before registration, important performance mission before registration, failure details, the number of times of failure, damaged degree, flight start time, and flight end time |

TABLE 4-continued

| Field | Description |
| --- | --- |
| Mission purpose | Information indicating whether mission corresponds to any of missions such as delivery, crime watch, reconnaissance, forest fire observation, trace, measurement, relief operation, weathering, and measurement of air pollution |
| Change of layer during flight | Display whether it is necessary for changing layer |

Referring to FIG. 4, in operation 3950, the unmanned aerial vehicle route establishment system may determine whether it is possible for the unmanned aerial vehicle to move between layers during flight, based on the flight mission information. If it is possible for the unmanned aerial vehicle to move between the layers, in operation 3960, the unmanned aerial vehicle route establishment system may set layer movement information for the inter-layer movement of the unmanned aerial vehicle. The layer movement information may include at least one of layer changeable zone location information, including a way point zone for a change of a layer on a route for autonomous flight of the unmanned aerial vehicle, a layer movement time, a change zone entry time, and a change zone entry angle. In operation 3970, the unmanned aerial vehicle route establishment system may reflect the layer movement information set in operation 3960 in an autonomous flight route of the unmanned aerial vehicle. In operation 3980, the unmanned aerial vehicle route establishment system may generate flight path information of the unmanned aerial vehicle in which the layer movement information is reflected. In operation 3990, the unmanned aerial vehicle route establishment system may transmit the flight path information to the unmanned aerial vehicle or an operation system of the unmanned aerial vehicle. In this case, if there is no operation system of the unmanned aerial vehicle, the unmanned aerial vehicle route establishment system may transmit an established route map to only the unmanned aerial vehicle. Also, in a method for transmitting the route map at the unmanned aerial vehicle route establishment system, the route map may be transmitted over a wired or wireless communication network or may be transmitted via a storage medium.

In contrast, if it is impossible for the unmanned aerial vehicle to move between the layers in operation 3950, in operation 3980, the unmanned aerial vehicle route establishment system may generate flight path information of the unmanned aerial vehicle, which does not include layer movement information.

Figure 40:
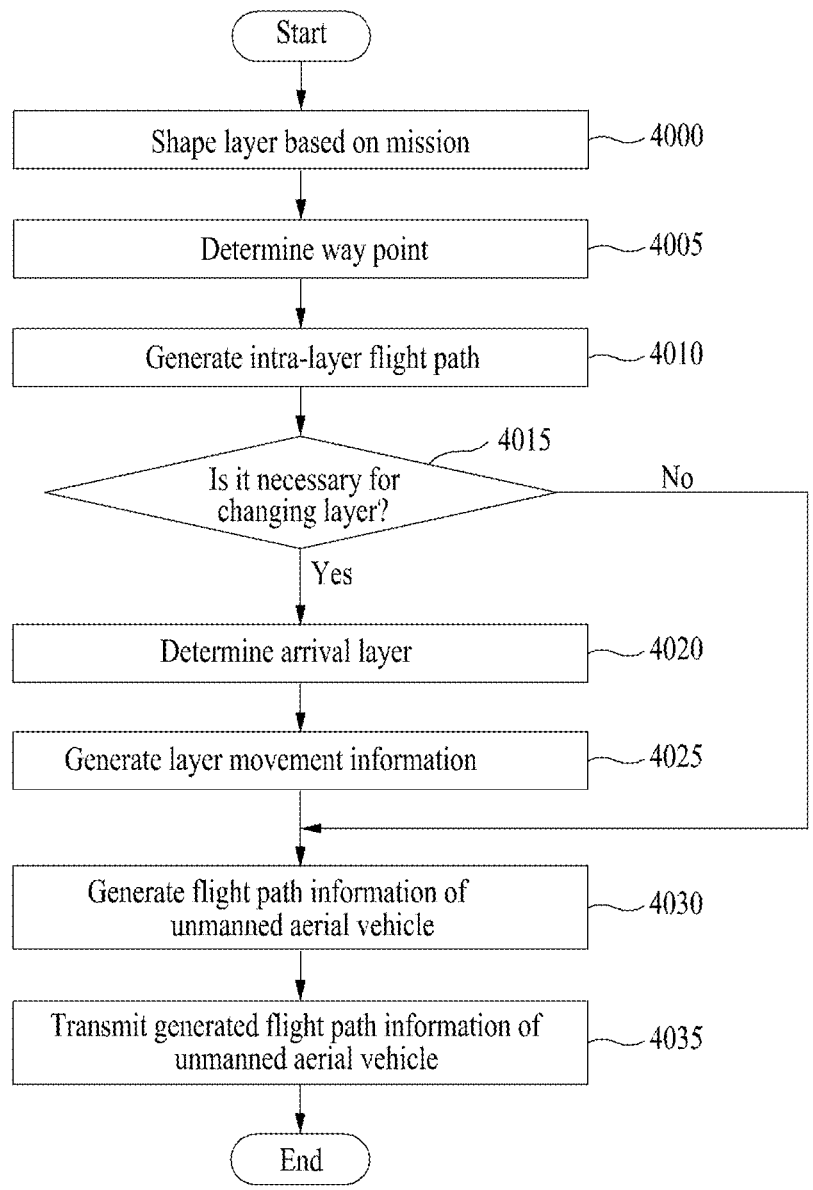
FIG. 40 is a flowchart illustrating a method for generating flight path information of an unmanned aerial vehicle for inter-layer autonomous flight of the unmanned aerial vehicle according to another embodiment.

FIG. 40 is a flowchart illustrating a method for generating flight path information of an unmanned aerial vehicle for inter-layer autonomous flight of the unmanned aerial vehicle according to another embodiment.

Referring to FIG. 40, the method for generating the flight path information of the unmanned aerial vehicle for the inter-layer autonomous flight of the unmanned aerial vehicle according to another embodiment may be shown and may be performed by an unmanned aerial vehicle route establishment system. In operation 4000, the unmanned aerial vehicle route establishment system may shape a layer based on a mission of the unmanned aerial vehicle. Herein, a method for shaping the layer may be performed according to the embodiments described above. Information about the mission of the unmanned aerial vehicle may be obtained from an operation system which requests to generate flight path information for the unmanned aerial vehicle and may be directly obtained from the unmanned aerial vehicle.

If the layer is shaped, in operation 4005, the unmanned aerial vehicle route establishment system may determine way points for flight of the unmanned aerial vehicle on the shaped layer. Since a procedure of setting each way point is described in detail above, a detailed description for this will be omitted.

In operation 4010, the unmanned aerial vehicle route establishment system may generate an intra-layer flight path which connects the determined way points. In operation 4015, the unmanned aerial vehicle route establishment system may verify whether it is necessary for change the layer while the unmanned aerial vehicle flies. Whether it is necessary for changing the layer may be determined based on mission information or fuselage information of the unmanned aerial vehicle and may be verified based on whether a request from the operation system or the unmanned aerial vehicle is received.

If it is necessary for changing the layer, in operation 4020, the unmanned aerial vehicle route establishment system may determine an arrival layer to which the unmanned aerial vehicle will move. In operation 4025, the unmanned aerial vehicle route establishment system may generate layer movement information for moving to the arrival layer. In operation 4030, the unmanned aerial vehicle route establishment system may generate flight path information of the unmanned aerial vehicle, including the generated flight path and the generated layer movement information. In this case, the flight path information of the unmanned aerial vehicle, generated in operation 4030, may include flight path information on the arrival layer.

In contrast, if it is unnecessary for changing the layer, in operation 4030, the unmanned aerial vehicle route establishment system may generate a flight path of the unmanned aerial vehicle, including the intra-layer flight path.

In operation 4035, the unmanned aerial vehicle route establishment system may transmit the generated flight path information of the unmanned aerial vehicle to at least one of an operation system, a control system, and the unmanned aerial vehicle.

Figure 41:
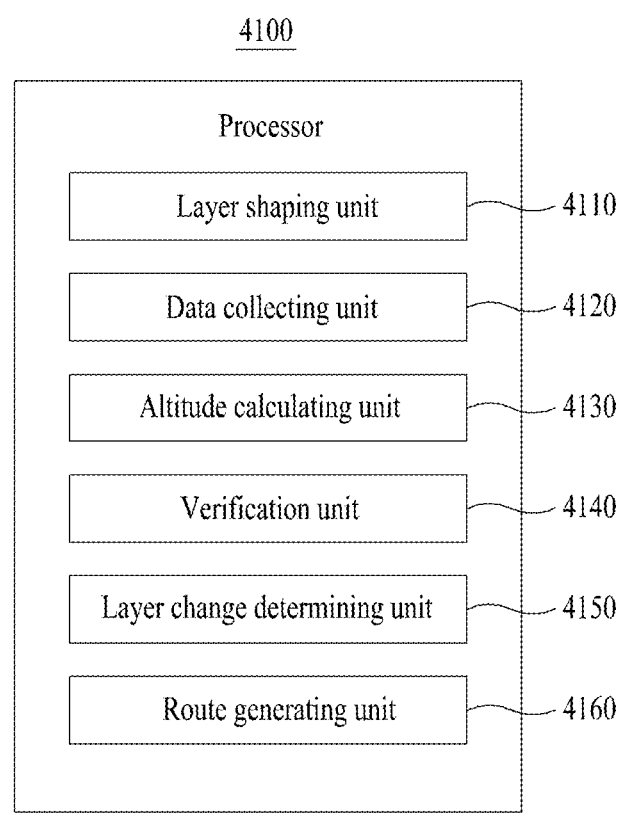
FIG. 41 is a block diagram illustrating a configuration of an unmanned aerial vehicle route establishment system for establishing a route for inter-layer movement of an unmanned aerial vehicle according to another embodiment.

FIG. 41 is a block diagram illustrating a configuration of an unmanned aerial vehicle route establishment system for establishing a route for inter-layer movement of an unmanned aerial vehicle according to another embodiment.

As shown in FIG. 41, an unmanned aerial vehicle route establishment system 4100 according to another embodiment may include a layer shaping unit 4110, a data collecting unit 4120, an altitude calculating unit 4130, a verification unit 4140, a layer change determining unit 4150, and a route generating unit 4160. The components of this unmanned aerial vehicle route establishment system 4100 may be included in a processor included in a server. These components may be implemented to execute operations 3900 to 3990 included in a method of FIG. 39 or operations 4000 to 4035 included in a method of FIG. 40 through an OS and at least one program code included in a memory.

The layer shaping unit 4110 may shape a plurality of 2D layers on a 3D space by calculating a height of an object identified from scan data with respect to a surface altitude of a corresponding coordinate and connecting heights of specific points. The 2D layers may be vertically and separately established.

The data collecting unit 4120 may initially collect surface image data from a layer of a flight height restriction height. The data collecting unit 4120 may obtain surface image data using an imaging device, in which a calibration value is set at a specific altitude, loaded into an aircraft which captures the earth's surface.

The data collecting unit 4120 may verify spatial geographic information to collect surface image data, may scan a safe path for flight, may generate a detailed fight path, thus collecting the surface image data for the corresponding path. Particularly, the initial collection of the surface image data necessary for analyzing a route to establish the route may be for permitting only flight within a visible area of a pilot having qualifications and maximally obtaining safety.

The data collecting unit 4120 may set a height value of flight altitude restriction and may verify a value measured by a radio altitude sensor (e.g., a radio altimeter or the like) through an object which facilitates verification of a height of flight altitude restriction. Herein, the object which facilitates verification of the height of flight altitude restriction may be a ground structure and the like which is the same or higher than the height of flight altitude restriction.

In addition, the data collecting unit 4120 may verify information such as a calibration parameter according to specifications, such as resolution and an image acquisition scheme of the imaging device, and an incident angle and may verify flight information of a fuselage, recorded in an FDR loaded into the unmanned aerial vehicle.

The altitude calculating unit 4130 may analyze a change in image resolution according to a distance between a camera and an object through the collected surface image data and may extract an altitude value on a flight route.

The verification unit 4140 may correct a value measured by the radio altitude sensor through route verification from the extracted altitude value. Also, the verification unit 4140 may verify route information to be assigned to the unmanned aerial vehicle necessary for changing a layer in advance through a simulation.

The layer change determining unit 4150 may determine whether it is necessary for the unmanned aerial vehicle to change a layer while the unmanned aerial vehicle performs autonomous flight. If it is necessary for the unmanned aerial vehicle to change the layer, the layer change determining unit 4150 may define layer movement information for changing the layer and may reflect the layer movement information in flight path information for the unmanned aerial vehicle.

Herein, the layer movement information may include at least one of layer changeable zone location information, a changeable zone entry time, a layer movement time (a layer movement start time and a layer movement end time), and a changeable zone entry angle. The layer change determining unit 4150 may determine whether it is possible for the unmanned aerial vehicle to fly between layers, may generate layer movement information for each unmanned aerial vehicle to prevent the unmanned aerial vehicle from colliding with other unmanned aerial vehicles which perform autonomous flight, and may include the layer movement information in a route map. Also, the layer change determining unit 4150 may generate layer movement information when the unmanned aerial vehicle requests to generate the layer movement information, without generating the layer movement information upon establishing a route.

The route generating unit 4160 may generate a route by defining way points for flight of the unmanned aerial vehicle on a layer generated for autonomous flight of the unmanned aerial vehicle and connecting the defined way points. Also, if it is determined that it is necessary for changing the layer while the unmanned aerial vehicle flies by the layer change determining unit 4150, the route generating unit 4160 may generate a route of the unmanned aerial vehicle, including intra-layer flight path information and inter-layer flight path information including layer movement information for changing a layer. However, the route generating unit 4160 may preset a layer changeable zone which is a zone such that the unmanned aerial vehicle moves between layers. In this case, the route generating unit 4160 may set a zone with the relatively fewest number of times unmanned aerial vehicles fly for each layer and may connect the zones, thus setting the connected zone to a layer changeable zone. Also, if the route generating unit 4160 generates a route for the unmanned aerial vehicle in which it is necessary to change a layer, it may use flight inter-layer path information simulated by the verification unit 4140. A description will be given in detail of layer movement information and a procedure of performing flight for movement between layers at the unmanned aerial vehicle with reference to FIGS. 44 to 48.

Figure 42:
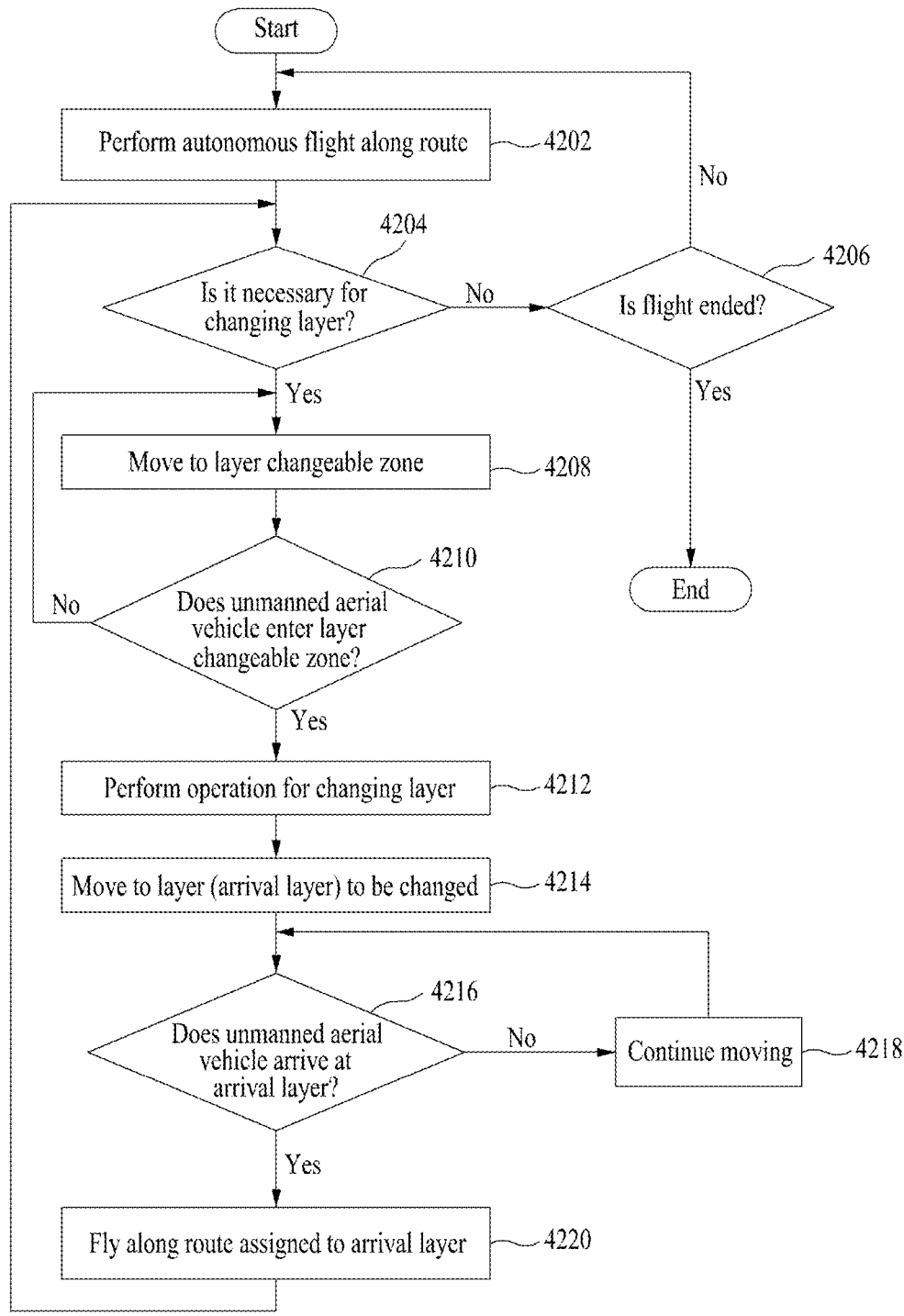
FIG. 42 is a flowchart illustrating an operation method of an unmanned aerial vehicle for movement between layers according to an embodiment.

FIG. 42 is a flowchart illustrating an operation method of an unmanned aerial vehicle for movement between layers according to an embodiment.

Referring to FIG. 42, in operation 4202, the unmanned aerial vehicle may perform autonomous flight along a route. In this case, the autonomous flight of the unmanned aerial vehicle may be performed according to the embodiments described above. In operation 4204, the unmanned aerial vehicle may determine whether it is necessary for changing a layer during the autonomous flight. The unmanned aerial vehicle may determine whether it is necessary for changing a layer based on previously stored route information, a previously defined program, or a control command from a control system or an operation system.

For example, if there is a layer movement route for movement to layer B while the unmanned aerial vehicle performs autonomous flight above layer A along a route previously stored in the unmanned aerial vehicle, in operation 4204, the unmanned aerial vehicle may determine that it is necessary for changing the layer. For example, the unmanned aerial vehicle may fly once along a route on layer A based on a previously defined program and may move to layer B through a layer movement route. The unmanned aerial vehicle may repeatedly fly along a route on layer A and may move to layer B through a layer movement route. Procedures for layer movement of this unmanned aerial vehicle may be defined on a route previously established by a route establishment system.

As another example, if a layer movement command is received from the control system or the operation system, in operation 4204, the unmanned aerial vehicle may determine that it is necessary for changing a layer and may perform inter-layer movement. In this case, if a layer movement command is received from the control system or the operation system, the unmanned aerial vehicle may move to a layer changeable zone and may move to another layer through a layer movement route.

As another example, in operation 4204, the unmanned aerial vehicle may determine whether it is necessary for changing a layer based on a previously defined program. In this case, the previously stored program may be a previously stored operation command, for example, "the unmanned aerial vehicle repeatedly flies a number of times along a route on layer A and moves to layer B".

If it is unnecessary for changing the layer, in operation 4206, the unmanned aerial vehicle may determine whether the autonomous flight is ended. If the autonomous flight is not ended, in operation 4202, the unmanned aerial vehicle may perform autonomous flight along a route.

In contrast, if it is necessary for changing the layer, in operation 4208, the unmanned aerial vehicle may move to a layer changeable zone. In operation 4210, the unmanned aerial vehicle may verify whether it enters the layer changeable zone. Whether the unmanned aerial vehicle enters the layer changeable zone may be verified by comparing GPS information and current location information of the unmanned aerial vehicle, ascertained by an altitude sensor and the like, with layer changeable zone location information. If the unmanned aerial vehicle does not enter the layer changeable zone, in operation 4208, it may continue moving to the layer changeable zone. In operation 4208, the unmanned aerial vehicle may move to the layer changeable zone using at least one of layer changeable zone information (layer changeable zone location information, height information, and size information) included in layer movement information, a layer changeable time, entry point information for moving to another layer, entry angle information, entry speed information, arrival layer identification information, route information in an arrival layer, changeable zone information, and another unmanned aerial vehicle information in a changeable zone.

In contrast, if the unmanned aerial vehicle enters the layer changeable zone in operation 4210, in operation 4212, it may perform an operation for changing a layer. In operation 4214, the unmanned aerial vehicle may move to a layer (arrival layer) to be changed. The operation of the unmanned aerial vehicle may include a series of operations of controlling a flight actuation unit at a controller or a processor to adjust a lift force or a flight force for altitude rising or falling. Herein, the unmanned aerial vehicle may avoid colliding with another aerial vehicle while moving to a layer using at least one of layer changeable zone information included in layer movement information, a layer changeable time, entry point information for moving to another layer, entry angle information, entry speed information, arrival layer identification information, route information in an arrival layer, changeable zone information, and another unmanned aerial vehicle information in a changeable zone. In operation 4214, the unmanned aerial vehicle may pass through at least one layer to move from a currently located layer to an arrival layer.

If the unmanned aerial vehicle arrives at the layer (arrival layer) to be changed in operation 4216, in operation 4220, it may fly along a route assigned to the arrival layer. In contrast, if the unmanned aerial vehicle does not arrive at the arrival layer, in operation 4218, it may continue moving until it arrives at the arrival layer. In operation 4220, the unmanned aerial vehicle may receive route information assigned to the arrival layer through a wireless communication unit. Also, in operation 4220, the route information assigned to the arrival layer may be previously stored in a memory of the unmanned aerial vehicle.

Figure 43:
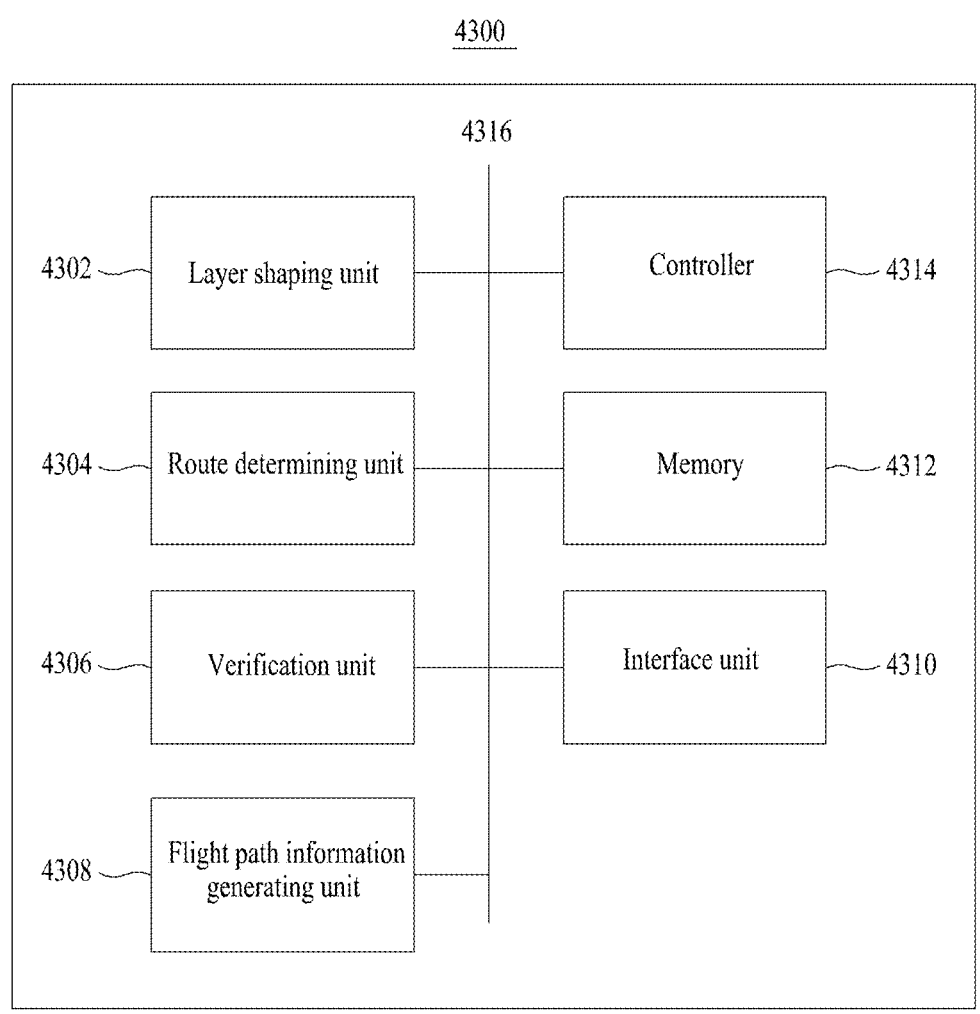
FIG. 43 is a block diagram illustrating a configuration of a route establishment system for establishing a route of an unmanned aerial vehicle for movement between layers according to another embodiment.

FIG. 43 is a block diagram illustrating a configuration of a route establishment system for establishing a route of an unmanned aerial vehicle for movement between layers according to another embodiment.

Referring to FIG. 43, a layer shaping unit 4302, a route determining unit 4304, a verification unit 4306, a flight path information generating unit 4308, an interface unit 4310, a memory 4312, and a controller 4314, included in a route establishment system 4300, may be connected via an electrically connected bus interface 4316 to communicate data and a control signal with each other.

As described above, the layer shaping unit 4302 may shape layers for autonomous flight of each unmanned aerial vehicle. In detail, the layer shaping unit 4302 may identify an object from surface scanning data obtained through an aerial photograph and the like, may shape a space, which facilitates autonomous flight, as a layer, and may collect surface image data for a flight path (route) from the shaped layer. The layer shaping unit 4302 may analyze a change in image resolution according to a distance from the object through the collected surface image data, may extract an altitude value of a flight route coordinate, and may set a flight altitude value at a way point of each route. Herein, the route may include a line connected between way points located on the same layer and may include a line connected between way points located on different layers.

The route determining unit 4304 may determine a route along which the unmanned aerial vehicle will fly, based on a mission of the unmanned aerial vehicle or a purpose requested by an operation system and may transmit the determined path information to the controller 4314. In this case, the route determining unit 4304 may determine a route for autonomous flight of the unmanned aerial vehicle among a plurality of way points (intra-layer way points) which exist on a layer shaped by the layer shaping unit 4302. If the unmanned aerial vehicle should perform inter-layer movement, the route determining unit 4304 may generate layer movement information including a route connecting inter-layer way points to which the unmanned aerial vehicle will move. A description will be given of a procedure of determining a route of inter-layer movement of the unmanned aerial vehicle at the route determining unit 4304 with reference to FIGS. 44 to 48.

The verification unit 4306 may correct a value measured by an altitude sensor using a measurement altitude value obtained through route verification with respect to an altitude value included in the layer generated by the layer shaping unit 4302 and may transmit the corrected value to the route path information generating unit 4308, thus using the value upon making a flight map later or upon establishing a route later.

The interface unit 4310 may communicate with a control system (not shown), an operation system (not shown), or the unmanned aerial vehicle over a wireless/wired network to communicate data information and control information.

The memory 4312 may store the layers generated by the layer shaping unit 4302 and the route information determined by the route determining unit 4304 for autonomous flight of the unmanned aerial vehicle and may store flight path information of the unmanned aerial vehicle, generated by the flight path information generating unit 4308. Also, the memory 4312 may store unmanned aerial vehicle identifiers for identifying unmanned aerial vehicles, layer identifiers, and flight path information assigned to each unmanned aerial vehicle. In addition, the flight path information generating unit 4308 may preset a layer changeable zone which is a zone for movement between layers at the unmanned aerial vehicle like a route generating unit 4160 of FIG. 41. The controller 4314 may communicate a control signal and a data signal with the layer shaping unit 4302, the route determining unit 4304, the verification unit 4306, the flight path information generating unit 4308, the interface unit 4310, and the memory 43123 via the bus interface 4316. If a flight path information request necessary for autonomous flight of the unmanned aerial vehicle is received and if there is no the requested flight path information in the memory 4312, the controller 4314 may control the layer shaping unit 4302, the route determining unit 4304, the verification unit 4306, and the flight path information generating unit 4308 to generate flight path information.

In contrast, if there is the requested flight path information in the memory 4312, the controller 4314 may read out flight path information previously stored in the memory 4312 and may transmit the flight path information to the operation system, the control system, or the unmanned aerial vehicle via the interface unit 4310.

Figure 44:
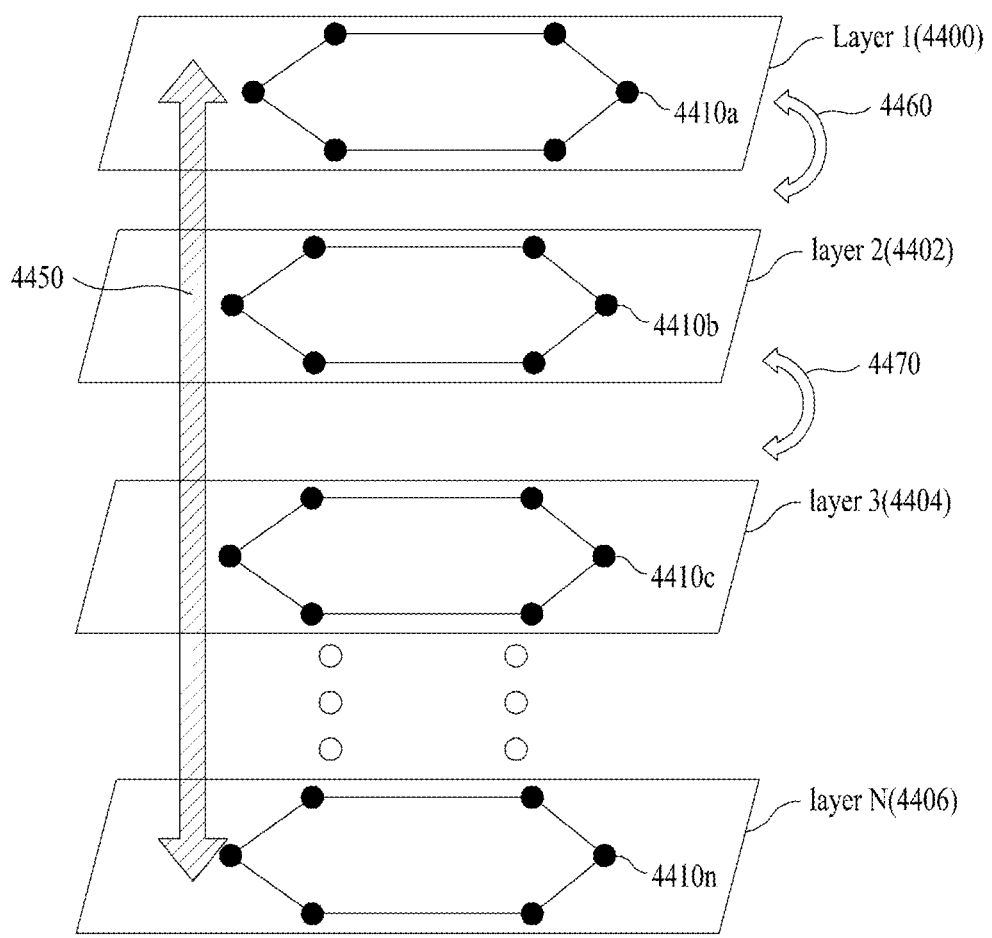
FIG. 44 is a drawing illustrating a process of performing autonomous flight between layers at an unmanned aerial vehicle according to an embodiment.

FIG. 44 is a drawing illustrating a process of performing autonomous flight between layers at an unmanned aerial vehicle according to an embodiment.

Referring to FIG. 44, it is assumed that there are N layers from layer 1 4400 to layer N 4406. Herein, reference numerals 4410a, 4410b, 4410c, to 4410n may indicate way points which exist on each layer and a flight path of connecting the way points.

In a method for performing autonomous flight between layers at an unmanned aerial vehicle according to an embodiment, the unmanned aerial vehicle may fly between layers from layer 1 4400 to layer N 4406 through layer 2 4402 and layer 3 4404 (see reference numeral 4450). The unmanned aerial vehicle may move between layer 1 4400 and layer 2 4402 through a movement path 4460. The unmanned aerial vehicle may move between layer 2 4405 and layer 3 4404 through a layer movement path 4470.

In other words, the unmanned aerial vehicle may move between layers based on layer movement information and may move to an arrival layer through a plurality of layers.

Figure 45:
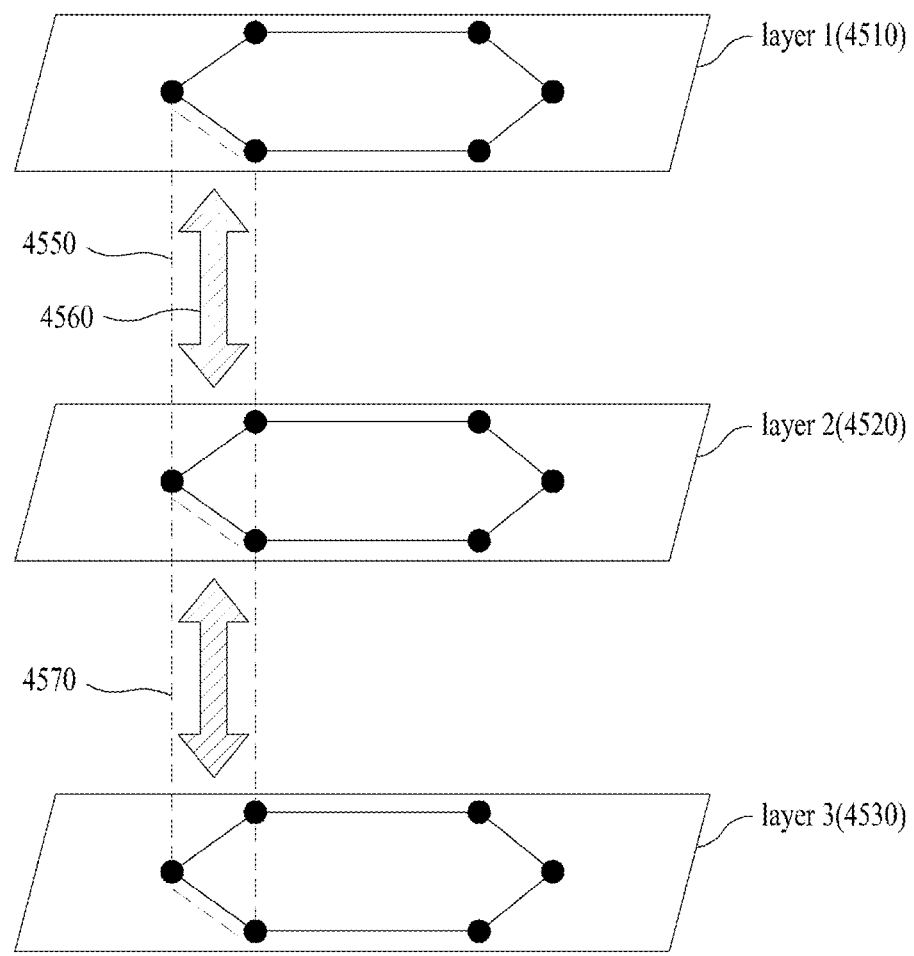
FIG. 45 is a drawing illustrating a layer changeable zone set such that an unmanned aerial vehicle moves between layers according to an embodiment.

FIG. 45 is a drawing illustrating a layer changeable zone set such that an unmanned aerial vehicle moves between layers according to an embodiment.

Referring to FIG. 45, a process where the unmanned aerial vehicle moves to layer 3 4530 through layer 2 4520 while flying along a route on layer 1 4510 may be verified. For convenience of description, in FIG. 45, layer 1 4510 to depart to move to another layer while the unmanned aerial vehicle performs autonomous flight may be referred to as a departure layer. Destination layer 3 4530 to the unmanned aerial vehicle want to move may be referred to as an arrival layer. Layer 2 4520 through which the unmanned aerial vehicle passes to arrive at layer 3 4530 may referred to as a stop layer. Layer 2 4520 which is the stop layer may be a layer which exists between the departure layer and the arrival layer. There may be no layer 2 4520 if there is no layer through the unmanned aerial vehicle passes.

In FIG. 45, it may be verified that there is a layer changeable zone 4550 for movement from layer 1 4510 to layer 3 4530 at the unmanned aerial vehicle. The layer changeable zone 4550 may be a zone preset to prevent the unmanned aerial vehicle from colliding with other unmanned aerial vehicles when the unmanned aerial vehicle moves between layers and may be defined as a zone which should be followed by all aerial vehicles which move between layers. In other words, the layer changeable zone 4550 may be a zone used for only flight of the unmanned aerial vehicle wants to use another layer. The layer changeable zone 4550 may be determined at a route generating unit 4160 of FIG. 41 or a flight path information generating unit 4308 of FIG. 43. Reference numerals 4560 and 4570 may show that the unmanned aerial vehicle moves between layers through rising flight or falling flight in the layer changeable zone 4550. Also, to prevent the unmanned aerial vehicle from colliding with another aerial vehicle upon changing a layer, the layer changeable zone 4550 may be classified as a rising area where the unmanned aerial vehicle is permitted to perform only rising flight or a falling area where the unmanned aerial vehicle is permitted to perform only falling flight.

In FIG. 45, the unmanned aerial vehicle may enter the layer changeable zone 4550 using at least one of a layer changeable time included in layer movement information generated by a route establishment system, entry point information for moving to another layer, entry angle information, entry speed information, arrival layer identification information, route information in an arrival layer, changeable zone information, and another unmanned aerial vehicle information in a changeable zone. The unmanned aerial vehicle may perform flight for movement to another layer while preventing the unmanned aerial vehicle from colliding with another aerial vehicle.

Table 5 below may represent information included in layer movement information according to an embodiment.

TABLE 5

| Field | Description |
|---|---|
| Layer changeable time | Time information where the unmanned aerial vehicle may enter the layer changeable zone for layer movement |
| Entry point information for moving to another layer | Coordinate information of point where the unmanned aerial vehicle which is performing autonomous flight should enter the layer changeable zone to move to another layer |
| Entry angle information | Entry angle information where the unmanned aerial vehicle enters the layer changeable zone while maintaining a lift force |
| Entry speed information | Entry speed information where the unmanned aerial vehicle enters the layer changeable zone while maintaining the lift force |
| Departure layer, stop layer, and arrival layer identification information | Identification information of a departure layer from which the unmanned aerial vehicle departs, a stop layer through which the unmanned aerial vehicle passes, and an arrival layer to which the unmanned aerial vehicle moves |
| Route information in arrival layer | Route information necessary for autonomous flight after the unmanned aerial vehicle arrives at the arrival layer |
| Changeable zone information | Coordinate value and area of the layer changeable zone and layer ID included in the layer changeable zone |
| Another unmanned aerial vehicle information in changeable zone | The number of different unmanned aerial vehicles which exist in the changeable zone and ID information of the different unmanned aerial vehicles |

Figure 46:
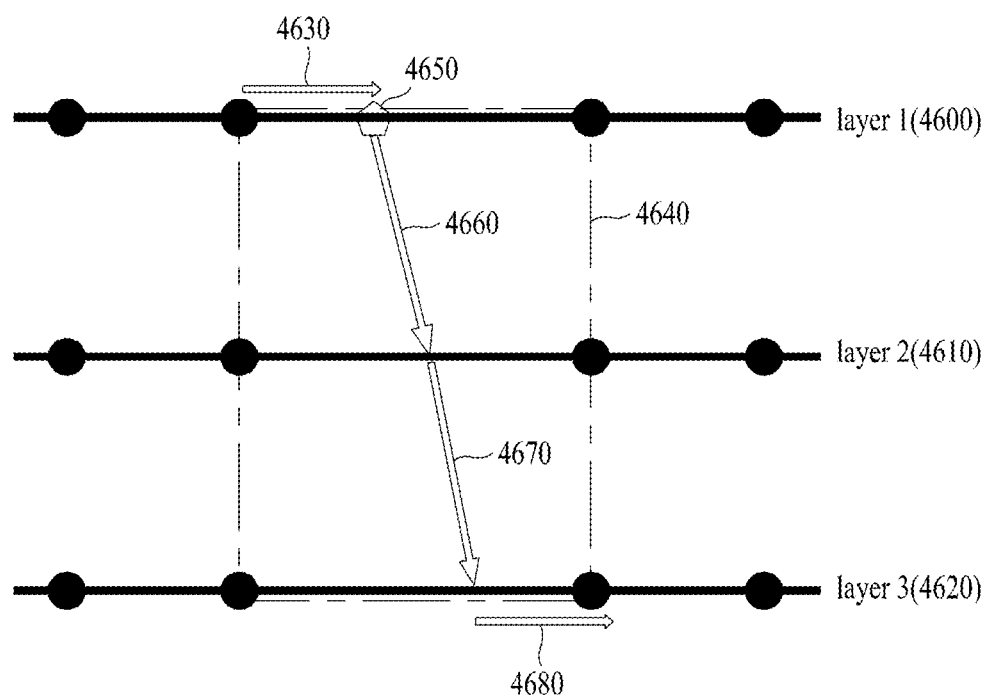
FIG. 46 is a vertical sectional view illustrating a procedure where an unmanned aerial vehicle moves between layers according to an embodiment.

FIG. 46 is a vertical sectional view illustrating a procedure where an unmanned aerial vehicle moves between layers according to an embodiment.

Reference numeral 4640 may represent a layer changeable zone where an unmanned aerial vehicle 4650 moves from layer 1 4600 to layer 3 4620 through layer 2 4610. Referring to FIG. 46, reference 4630 may show that the unmanned aerial vehicle 4650 moves from layer 1 4600 to layer 3 4620 based on layer changeable zone information included in layer movement information, a layer changeable time, entry point information for moving to another layer, entry angle information, and entry speed information, while flying along a route on layer 1 4600. Reference numeral 4660 may indicate a route moving from layer 1 4600 to layer 2 4610. Reference numeral 4670 may indicate a route moving from layer 2 4610 to layer 3 4620. Reference numeral 4680 may show that the unmanned aerial vehicle 4650 which arrives at layer 3 4620 which is an arrival layer performs autonomous flight along a route on layer 3 4620.

Figure 47:
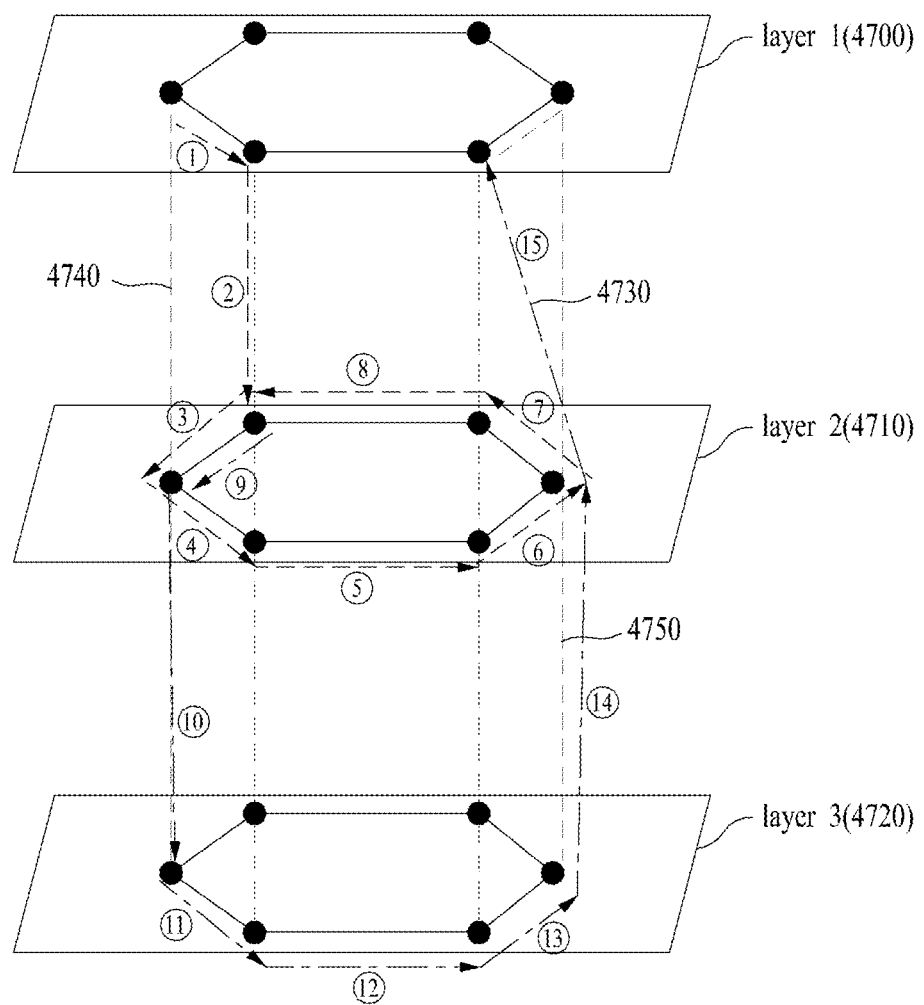
FIG. 47 is a drawing illustrating a procedure where an unmanned aerial vehicle moves between layers according to another embodiment.

FIG. 47 is a drawing illustrating a procedure where an unmanned aerial vehicle moves between layers according to another embodiment.

FIG. 47 shows that the unmanned aerial vehicle performs flight along a route on layer 2 4710 which is a stop layer while moving between layers and moves to another layer. In other words, in FIG. 47, reference numeral 4730 may show that the unmanned aerial vehicle departs from layer 1 4700, performs flight along a route on layer 2 4710 which is a stop layer, and move to layer 3 4720. Reference numeral 4730 may show that the unmanned aerial vehicle which flies along a route on layer 3 4730 passes through layer 2 4710 and returns to layer 1 4700 which is a departure layer. FIG. 47 shows that a layer changeable zone is classified as a zone 4740 where the unmanned aerial vehicle performs falling flight as a zone 4750 where the unmanned aerial vehicle performs rising flight. In other words, reference numeral 4740 may be a zone set for the purpose of layer movement through falling flight. Reference numeral 4750 may be a zone set for the purpose of layer movement through rising flight.

Figure 48:
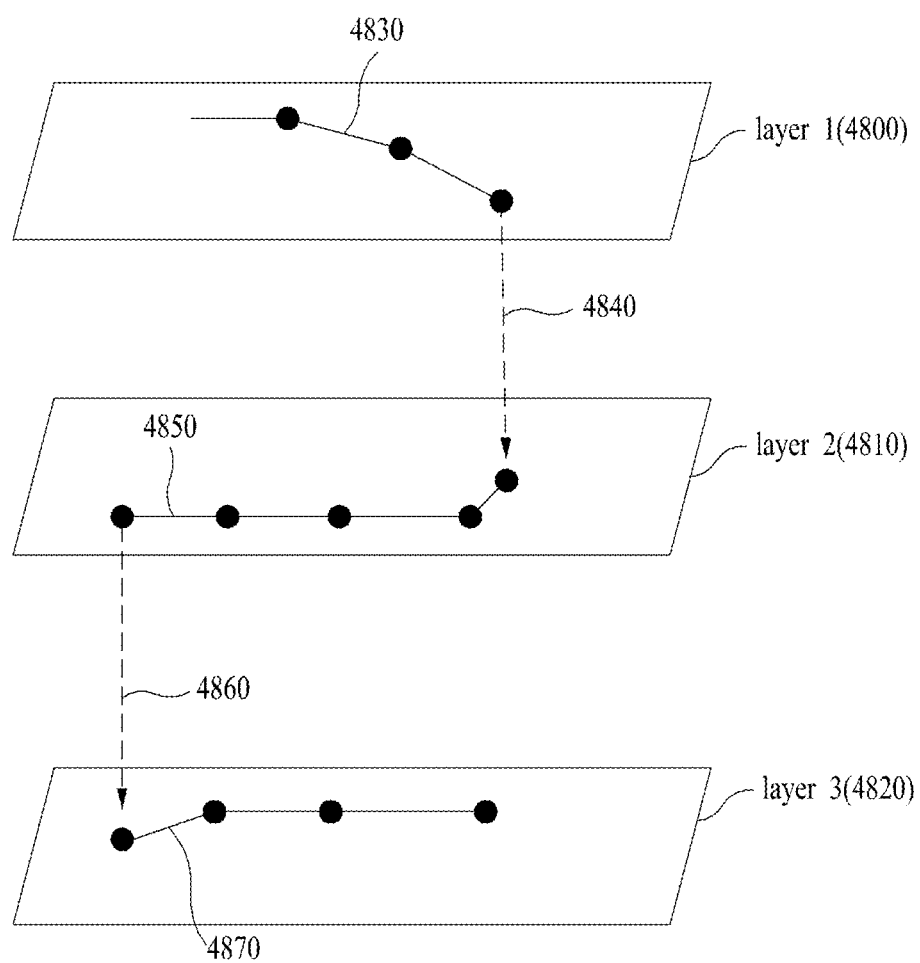
FIG. 48 is a drawing illustrating a procedure where an unmanned aerial vehicle moves between layers according to another embodiment.

FIG. 48 is a drawing illustrating a procedure where an unmanned aerial vehicle moves between layers according to another embodiment.

Contrary to FIG. 47, FIG. 48 shows that a zone for rising flight and a zone for falling flight for layer movement are not separately present. FIG. 48 shows that an unmanned aerial vehicle flies along a route 4830 on layer 1 4800, performs falling flight 4840 for moving to layer 2 4810 on the last way point, performs falling flight 4860 for moving to layer 3 4820 on the last way point while flying along a route 4850 on layer 2 4810, and flies along a route 4870 on layer 3 4820. The flight in FIG. 48 may be used in the unmanned aerial vehicle which flies for the purpose of patrol and monitoring tasks.

As shown in FIGS. 47 and 48, a procedure of performing autonomous flight while the unmanned aerial vehicle moves between layers may be previously defined upon establishing a route and may progress based on a control command from a control system and an operation system during flight of the unmanned aerial vehicle.

Figure 49:
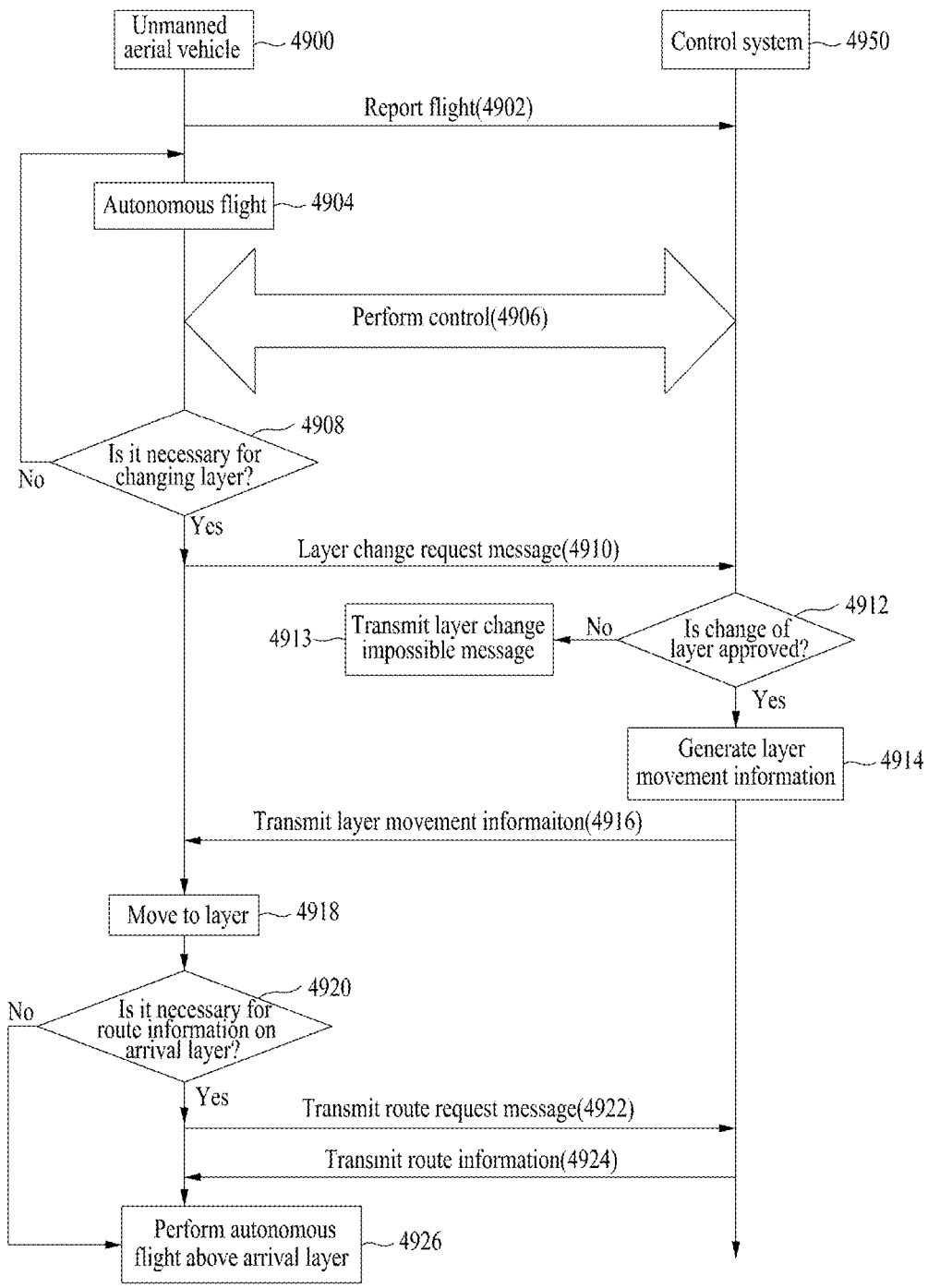
FIG. 49 is a signal sequence diagram illustrating a method of an unmanned aerial vehicle and a control system for layer movement of the unmanned aerial vehicle according to another embodiment.

FIG. 49 is a signal sequence diagram illustrating a method of an unmanned aerial vehicle and a control system for layer movement of the unmanned aerial vehicle according to another embodiment.

In operation 4902, an unmanned aerial vehicle 4900 may provide a flight report for autonomous flight to a control system 4950. In operation 4904, the unmanned aerial vehicle 4900 may perform autonomous flight.

In operation 4906, the control system 4950 may control the unmanned aerial vehicle 4900, and the unmanned aerial vehicle 4900 may report information obtained based on control of the control system 4950, may perform operations such as a monitoring task, a delivery task, and a rescue task, and may report its state information on a periodic period.

In operation 4908, the unmanned aerial vehicle 4900 may determine whether it is necessary for changing a layer. If it is necessary for changing the layer, in operation 4910, the unmanned aerial vehicle 4900 may transmit a layer change request message to the control system 4950.

In operation 4912, the control system 4950 may determine whether to approve a change of the layer for the unmanned aerial vehicle 4900. In this case, the control system 4950 may determine whether to approve a layer change request in consideration of a possibility that the unmanned aerial vehicle 4900 will collide with another unmanned aerial vehicle which exists in a layer changeable zone and fuselage information and mission information of the unmanned aerial vehicle 4900.

If the change of the layer is not approved in operation 4912, in operation 4913, the control system 4950 may transmit a layer changeable impossible message. In contrast, if the change of the layer is approved in operation 4912, in operation 4914, the control system 4950 may generate layer movement information. In operation 4916, the control system 4950 may transmit the layer movement information to the unmanned aerial vehicle 4900.

In operation 4918, the unmanned aerial vehicle 4900 which receives the layer movement information may move to a layer changeable zone based on the layer movement information and may perform movement flight to an arrival layer.

In operation 4920, the unmanned aerial vehicle 4900 which arrives at the arrival layer may determine whether it is necessary for route information on the arrival layer to perform autonomous flight on the arrival layer. If it is necessary for the route information on the arrival layer in operation 4920, in operation 4922, the unmanned aerial vehicle 4900 may transmit a route request message to the control system 4950.

In operation 4924, the control system 4950 which receives the route request message may transmit route information on the arrival layer where the unmanned aerial vehicle 4900 arrives to the unmanned aerial vehicle 4900. In operation 4926, the unmanned aerial vehicle 4900 may perform autonomous flight on the arrival layer based on route information received from the control system 4950.

In contrast, if it is unnecessary for the route information on the arrival layer in operation 4920, in operation 4926, the unmanned aerial vehicle 4900 may perform autonomous flight based on previously stored route information.

Table 6 below represents information included in a layer change request message transmitted to the control system 4950 at the unmanned aerial vehicle 4900.

TABLE 6

| Field | Description |
| --- | --- |
| Unmanned aerial vehicle ID | Information for identifying the unmanned aerial vehicle at the control system and unique information for each unmanned aerial vehicle |
| Departure ID | Identification information of a layer where the unmanned aerial vehicle currently flies |
| Arrival layer ID | Identification information of a layer where the unmanned aerial vehicle wants to move |
| Route information on arrival layer | Information indicating whether the unmanned aerial vehicle possesses route information on the arrival layer |

The above-mentioned embodiments are exemplified as the unmanned aerial vehicle performs layer movement on a changeable zone. However, if a route on a departure layer is not overlapped with a route on an arrival layer, the unmanned aerial vehicle may fail to move to the changeable zone and may perform a flight procedure for layer movement.

As such, according to an embodiment, an autonomous flight route of an invisible area may be provided to overcome a limit of an operation in a visible range of a pilot to an area where it is difficult to keep an altitude value constant due to a ground object and the like.

Also, according to an embodiment, the system for establishing a route of the unmanned aerial vehicle may establish a safe autonomous flight route of the unmanned aerial vehicle by extracting height information of an elevation and an obstacle using scanning data, analyzing a change in image resolution of surface image data, correcting calibration verification and a value measured by a radio altitude sensor of the unmanned aerial vehicle using extracted height information of a ground object.

In addition, an embodiment is exemplified as the establishment of the autonomous flight route may be performed on a previously established layer through ground scanning data. However, if a layer is set in advance without ground scanning data and if a safe flight altitude is determined using resolution height information obtained by only test flight of a real unmanned aerial vehicle with respect to an autonomous flight route established on the set layer, it is possible to establish an autonomous flight route using the safe flight altitude.

Safety of a route may be verified by correcting a value measured by an ultrasonic altitude sensor with respect to a ground object using a height value of resolution of the ground object to verify a layer set using a point cloud scanned for the conventional ground object and an extracted DTM and DSM. Therefore, a route with a new layer may be set through a simulation without additional scanning data for a new route. Also, the unmanned aerial vehicle may be prevented from colliding with a manned aerial vehicle by setting a maximum flight restriction altitude of the unmanned aerial vehicle.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments, an autonomous flight route of an invisible area may be provided to overcome a limit of an operation in a visible range of a pilot to an area where it is difficult to keep an altitude value constant due to a ground object and the like.

According to embodiments, a method and system for establishing the route of the unmanned aerial vehicle to establish a safe autonomous flight route of the unmanned aerial vehicle by extracting height information of an elevation and an obstacle using scanning data, analyzing a change in image resolution of surface image data, and correcting calibration verification and a value measured by a radio altitude sensor of the unmanned aerial vehicle using extracted height information of a ground object may be provided.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for establishing a flight route for an unmanned aerial vehicle, the method comprising:
    identifying an object from surface scanning data captured from a camera of an aircraft and shaping a space, which facilitates autonomous flight of the unmanned aerial vehicle, as a layer;
    collecting surface image data for a flight route from the shaped layer;
    analyzing a change in image resolution associated with the surface image data according to a distance from the object by analyzing resolution values of the surface image data varying with the flight of the aircraft and extracting an altitude value on the flight route; and
    establishing an optimal flight route for the unmanned aerial vehicle based on the extracted altitude value,
    wherein the unmanned aerial vehicle performs the autonomous flight along the optimal flight route established for the unmanned aerial vehicle.

2. The method of claim 1, further comprising:
    correcting a value measured by a radio altitude sensor of the unmanned aerial vehicle through route verification from the extracted altitude value.

3. The method of claim 1, wherein the shaping of the space, which facilitates the autonomous flight, as the layer comprises:
    obtaining a point cloud of the object scanned by a surface scanning device loaded into the aircraft;
    identifying the object by analyzing the collected point cloud;
    extracting height values of specific points of the object identified using terrain altitude data; and
    shaping an area and altitude, which facilitates autonomous flight of the unmanned aerial vehicle, as the layer on a space by connecting the extracted height values of the specific points of the object.

4. The method of claim 3, wherein the obtaining of the point cloud comprises:
    obtaining the point cloud of the object onto which a light detection and ranging (LiDAR) pulse is projected via a LiDAR device loaded into the aircraft.

5. The method of claim 1, wherein the shaping of the space, which facilitates the autonomous flight, as the layer comprises:
    generating a plurality of two-dimensional (2D) layers on the space.

6. The method of claim 1, wherein
    a calibration value of the camera is preset at an specific altitude.

7. The method of claim 1, wherein the collecting of the surface image data comprises:
    verifying spatial geographic information and scanning a safe path for flight; and
    generating a flight path by reflecting the safe path, and collecting the surface image data for the flight route.

8. The method of claim 2, wherein the correcting of the value measured by the radio altitude sensor comprises:
    extracting an altitude value from an object which exists on a route, substituting the altitude value into a route coordinate of the unmanned aerial vehicle at a constant interval, and if the unmanned aerial vehicle arrives at the route coordinate, recognizing a resolution height of an image corresponding to a coordinate which is in contact with the object; and
    correcting the value measured by the radio altitude sensor of the unmanned aerial vehicle based on the resolution height.

9. The method of claim 2, wherein the correcting of the value measured by the radio altitude sensor comprises:
    repeatedly collecting the surface image data through autonomous flight of the unmanned aerial vehicle and generating or verifying a new route by reflecting the collected surface image data in route control, ground control, and route map data through an analysis of a change in resolution.

10. A system for establishing a flight route for an unmanned aerial vehicle, the system comprising:
    a layer shaping unit configured to identify an object from surface scanning data captured from a camera of an aircraft and shape a space, which facilitates autonomous flight of the unmanned aerial vehicle, as a layer;
    a data collecting unit configured to collect surface image data for a flight route from the shaped layer; and
    an altitude calculating unit configured to analyze a change in image resolution associated with the surface image data according to a distance from the object by analyzing resolution values of the surface image data varying with the flight of the aircraft and extract an altitude value of the flight route coordinate,
    wherein an optimal flight route for the unmanned aerial vehicle is established based on the extracted altitude value, wherein the unmanned aerial vehicle performs the autonomous flight along the optimal flight route established for the unmanned aerial vehicle.

11. The system of claim 10, further comprising:
a verification unit configured to correct a value measured by a radio altitude sensor of the unmanned aerial vehicle through route verification from the extracted altitude value.

12. The system of claim 10, wherein the layer shaping unit comprises:
a collection unit configured to obtain a point cloud of the object scanned by a surface scanning device loaded into the aircraft;
an identification unit configured to identify the object by analyzing the collected point cloud;
an extraction unit configured to extract height values of specific points of the object identified using terrain altitude data; and
a layer unit configured to shape an area and altitude, which facilitates autonomous flight of the unmanned aerial vehicle, as the layer on a space by connecting the extracted height values of the specific points of the object.

13. The system of claim 10, wherein the data collecting unit verifies spatial geographic information and scans a safe path for flight, generates a flight path by reflecting the safe path and collects the surface image data for the flight route, and a calibration value of the camera is preset at an specific altitude.

14. The system of claim 10, wherein the data collecting unit verifies calibration information of an imaging device and verifies flight information recorded in a flight data recorder (FDR) loaded into the unmanned aerial vehicle, and
wherein the altitude calculating unit matches at least one of coordinate, altitude, attitude, and time information from the FDR loaded into the unmanned aerial vehicle with the surface image data and calculates an altitude value on the flight route through distortion correction of an image and the analysis of the change in image resolution with reference to calibration information of the imaging device.

15. The system of claim 11, wherein the verification unit extracts an altitude value from an object which exists on a route, substitutes the altitude value into a route coordinate of the unmanned aerial vehicle at a constant interval, and if the unmanned aerial vehicle arrives at the route coordinate, recognizes a resolution height of an image corresponding to a coordinate which is in contact with the object and corrects the value measured by the radio altitude sensor of the unmanned aerial vehicle based on the resolution height.

16. The system of claim 11, wherein the verification unit repeatedly collects the surface image data through autonomous flight of the unmanned aerial vehicle and generates or verifies a new route by reflecting the collected surface image data in route control, ground control, and route map data through an analysis of a change in resolution.

17. A method for establishing a flight route for an unmanned aerial vehicle, the method comprising:
identifying an object from surface scanning data captured from a camera of an aircraft and shaping a space, which facilitates autonomous flight of the unmanned aerial vehicle, as a layer;
determining way points for generating a route of the unmanned aerial vehicle on the shaped layer;
collecting surface image data for the way points from the shaped layer;
analyzing a change in image resolution associated with the surface image data according to a distance from the object by analyzing resolution values of the surface image data varying with the aircraft and extracting altitude values on the way points;
generating flight path information of the unmanned aerial vehicle, including at least one of the shaped layer, the way points, the altitude values, and a flight path which is a line of connecting the way points; and
establishing an optimal flight route for the unmanned aerial vehicle based on the generated flight path information,
wherein the unmanned aerial vehicle performs the autonomous flight along the optimal flight route established for the unmanned aerial vehicle.

18. The method of claim 17, wherein each of the way points indicates a point of a ground object which exists on Earth's surface of a point where the unmanned aerial vehicle performs autonomous flight on the layer or indicates a location where the unmanned aerial vehicle performs a mission.

19. The method of claim 17, wherein the generating of the flight path information of the unmanned aerial vehicle comprises:
if it is necessary for the unmanned aerial vehicle to move from a departure layer which is an initially assigned layer to another layer, determining an arrival layer to which the unmanned aerial vehicle will move; and
generating layer movement information for moving from the departure layer to the arrival layer.

20. The method of claim 19, wherein the layer movement information comprises at least one of a layer changeable zone, including a way point zone for changing a layer in a route for autonomous flight of the unmanned aerial vehicle, a layer movement time, a change zone entry time, and a change zone entry angle.

* * * * *